(12) United States Patent
Kim et al.

(10) Patent No.: US 7,077,554 B2
(45) Date of Patent: Jul. 18, 2006

(54) LIGHT GUIDE PLATE WITH STEPPED EDGE AND DISPLAY DEVICE HAVING THE SAME

(75) Inventors: Dong-Hoon Kim, Suwon-si (KR); Jong-Dae Park, Seoul (KR); Kyu-Seok Kim, Yongin-si (KR); Jeong-Hwan Lee, Suwon-si (KR); Jae-Ho Jung, Yongin-si (KR); Byung-Woong Han, Incheon-si (KR); Min-Gyu Kim, Seoul (KR); Hyoung-Joo Kim, Uiwang-si (KR); Tae-Jin Lee, Gyeonggi-do (KR); Seok-Won Lee, Yongin-si (KR); Sang-Hoon Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 255 days.

(21) Appl. No.: 10/631,615

(22) Filed: Jul. 31, 2003

(65) Prior Publication Data

US 2004/0114345 A1    Jun. 17, 2004

(30) Foreign Application Priority Data

Dec. 12, 2002  (KR) .................. 10-2002-0079142
Mar. 4, 2003   (KR) .................. 10-2003-0013283
Mar. 6, 2003   (KR) .................. 10-2003-0014025
Mar. 6, 2003   (KR) .................. 10-2003-0014032
Mar. 7, 2003   (KR) .................. 10-2003-0014271

(51) Int. Cl.
    *G02F 1/1335*  (2006.01)
    *F21V 7/04*    (2006.01)

(52) U.S. Cl. .............. 362/603; 362/615; 362/621; 362/623; 362/628; 362/29

(58) Field of Classification Search ........... 362/600, 362/603, 609, 608, 615, 622, 628, 632, 633, 362/634, 29, 30; 349/65, 67, 61
    See application file for complete search history.

(56) References Cited

U.S. PATENT DOCUMENTS 5,886,759 A * 3/1999 Mashino et al. .............. 349/65

(Continued)

*Primary Examiner*—Thomas M. Sember
(74) *Attorney, Agent, or Firm*—Cantor Colburn LLP

(57) ABSTRACT

A light guide plate includes a first surface having a light incident surface and a light reflect surface, a second surface facing the first surface, through which the reflected light exits, a first edge surface connected between edges of the light reflect surface and the second surface, and a second edge surface connected between edges of the light incident surface and the second surface, being opposite to the first edge surface. A light source is disposed on the light incident surface. A light guide plate may also include a stepped edge portion formed at a marginal area of the light guide plate on which a light source is combined. The stepped edge portion includes a light incident surface, a light reflect surface, an upper surface through which the reflected light exits the light guide plate, and a first edge surface connected between edges of the light reflect surface and the upper surface, being opposite to the stepped edge portion. A backlight assembly includes the light guide plate, a lamp unit including lamps and a lamp reflector that are disposed on the light incident surface, and a mold frame for receiving the stepped edge portion and the lamp unit.

10 Claims, 41 Drawing Sheets

U.S. PATENT DOCUMENTS

| | | | |
|---|---|---|---|
| 5,957,561 A * | 9/1999 | Ono et al. | 362/617 |
| 5,986,727 A * | 11/1999 | Fukui et al. | 349/65 |
| 5,988,827 A * | 11/1999 | Lee | 362/633 |
| 6,179,430 B1 * | 1/2001 | Le Du | 362/29 |
| 6,210,011 B1 * | 4/2001 | Ikeuchi et al. | 362/26 |
| 6,471,388 B1 * | 10/2002 | Marsh | 362/559 |
| 6,626,550 B1 * | 9/2003 | Choi | 362/632 |
| 6,856,363 B1 * | 2/2005 | Kim | 349/65 |

\* cited by examiner

770

LIGHT GUIDE PLATE WITH STEPPED EDGE AND DISPLAY DEVICE HAVING THE SAME

BACKGROUND OF THE INVENTION

1. Field of the Invention

The present invention relates to an image display device and a lighting device for providing uniform light in the display device, and more particularly, to a light guide plate having a stepped edge and a backlight assembly having the light guide plate, and also to a liquid crystal display device employing the backlight assembly.

2. Description of the Related Art

Image display devices such as liquid crystal display (LCD) devices basically have a light assembly for providing light, a display assembly for processing image data and displaying images thereon, and various types of optical means for converting the light from the light assembly into light more appropriate for the display assembly. Such optical means generally include a light guide plate that guides the light from the light assembly to provide the display assembly with light having uniform distribution, and one or more optical sheets that enhance the luminance at the display assembly by adjusting paths of the light provided from the light assembly through the light guide plate.

There have been developments in reducing the size of LCD devices while improving their functions and performance. One of such developments has been made on fabrication of the light guide plates. Various types of light guide plates have been introduced for a light assembly providing the light with uniform luminance distribution in an LCD device. Since a light guide plate and a light assembly in an LCD device have a close relationship in the aspects of their structure and function, the light assembly would need to be modified in association with the light guide plate when the light guide plate is newly designed to provide better quality light to a display unit.

However, there have been difficulties in reducing the size of LCD devices by modifying the light guide plates and the light assemblies, and drawbacks exist in the conventional light guide plates and light assemblies developed for the purpose of reducing the size of the LCD devices. Also, there has been a demand of display devices with a compact and slim size. Especially, for the portable electronic products with display features, the size of products is an important factor to attract the customers and lead to a success in the market.

Therefore, a need exists for a display device having a reduced overall size, especially a narrow bezel, and a light assembly with light guide plate having structure contributing to the reduction of the device size.

SUMMARY OF THE INVENTION

These and other objects, features and advantages of the present invention will become apparent from the following detailed description of the exemplary embodiments thereof, which is to be read in conjunction with the accompanying drawings, wherein like elements are designated by identical reference numbers throughout the several views.

In one embodiment, a light guide plate includes a first surface having a light incident surface on which the light source is disposed and the light is incident and a light reflect surface for reflecting the light provided through the light incident surface, a second surface facing the first surface, where the light reflected by the light reflect surface exits the second surface, a first edge surface connected between edges of the light reflect surface and the second surface, and a second edge surface connected between edges of the light incident surface and the second surface, where the second edge surface is opposite to the first edge surface. The light guide plate may have a wedge shape such that a thickness at an area proximate the light incident surface is larger than a thickness at an area proximate the first edge surface. The second edge surface may also be slant toward the first surface such that an acute angle is formed between the second edge surface and the light incident surface. The second edge surface may include a straight surface extend from the edge of the light incident surface in a direction substantially perpendicular to the light incident surface, and an inclined surface extended from the edge of the second surface to be connected to a longitudinal edge of the straight surface, the longitudinal edge connected to the straight surface being opposite to a longitudinal edge connected to the second surface in the inclined surface, the inclined surface being slant toward the first surface such that the a slope connecting the longitudinal edges of the inclined surface has an acute angle with respect to the first surface and an obtuse angle with respect to the second surface.

In another embodiment, a backlight assembly for providing the light includes the above described light guide plate, a lamp unit including lamps for generating the light and a lamp reflector for reflecting the light, and a mold frame including a channel space for receiving the lamp unit and a groove for receiving an electrical line electrically connected to the lamp unit. The mold frame also has a bottom, a first wall extended from an edge of the bottom along the second edge surface of the light guide plate, and a second wall opposing to the first wall and extended from the other edge of the bottom toward the light reflect surface of the light guide plate, wherein a groove for receiving the electrical line is formed at the bottom or the side wall of the mold frame.

In another embodiment, a light guide plate includes a stepped edge portion formed at a marginal area of the light guide plate on which a light source is combined. The stepped edge portion includes a light incident surface on which the light from the light source is incident, a light reflect surface for reflecting the light provided through the light incident surface, an upper surface facing the light reflect surface, where the light reflected by the light reflect surface exits the upper surface, and a first edge surface connected between edges of the light reflect surface and the upper surface, where the first edge surface is opposite to the stepped edge portion. The light source may include a cover combined on the stepped edge portion such that one of opposing sides of the cover is in contact with one of the longitudinal edges of the light incident surface and the other of the opposing sides of the cover is in contact with the other of the longitudinal edges of the light incident surface. The light incident surface may include a first inclined surface extended from an edge of the light reflect surface toward the upper surface and a second inclined surface extended from an edge of the upper surface toward the first inclined surface so that the first and second inclined surfaces form a convex edge, where the lamps are disposed on the first and second inclined surfaces. A cover for receiving the lamps may be combined on the light incident surface such that one of opposing sides of the cover is in contact with a longitudinal edge of the first inclined surface proximate the light reflect surface and the other of the opposing sides of the cover is in contact with a longitudinal edge of the second inclined surface proximate the upper surface.

In another embodiment, a light guide plate includes a light incident surface having a plane surface extended from an edge of the light reflect surface in a direction opposite to the first edge surface, where the plane surface is substantially parallel with the upper surface, and an inclined surface extended from a longitudinal edge of the plane surface toward the upper surface, where the inclined surface is slant such that a slope line connecting longitudinal edges of the inclined surface forms an obtuse angle with respect to the plane surface and an acute angle with respect to the upper surface. A cover receiving the lamps may be combined on the light guide plate such that one of opposing sides of the cover is in contact with a longitudinal edge of the plane surface proximate the light reflect surface and the other of the opposing sides of the cover is in contact with a longitudinal edge of the inclined surface proximate the upper surface.

In another embodiment, a light guide plate includes a stepped edge portion having first and second step portions for receiving lamps and being formed concavely inward the light guide plate and adjacent to each other. The first and second step portions each have a rise substantially perpendicular to an upper surface of the light guide plate and a run substantially parallel with the upper surface, where the rise has a width smaller than that of the run. The first and second step portions may have a slope such that a line connecting longitudinal axes of the lamps received in the first and second step portions forms an obtuse angle with respect to the light reflect surface and an acute angle with respect to the upper surface. The first and second step portions may also be corrugated to each have a round valley for receiving a lamp, where a peak is formed between the round valleys of the first and second step portions.

In anther embodiment, a backlight assembly for providing the light includes the light guide plate above described, a lamp unit having lamps for generating the light and a lamp reflector for receiving the lamps and reflecting the light, and a mold frame having a bottom disposed under the lamp unit and being substantially parallel with the upper surface and a side wall extended from a longitudinal edge of the bottom in a direction substantially perpendicular to the bottom, where the bottom and the side wall receive the stepped edge portion of the light guide plate and the lamp unit. The lamp reflector may include a first reflect portion for receiving a first lamp and reflecting light from the first lamp, a second reflect portion for receiving a second lamp and reflecting light from the second lamp, and a flat peak connected between the first and second reflect portions to form a channel space under the lamp reflector, where an electrical line connected to the lamp unit is drawn out through the channel space.

In another embodiment, the lamp reflector may include a first reflect panel disposed on a stepped edge portion of the light guide plate such that the a lamp is securely received between the light incident surface of the light guide plate and the first reflect panel, and a second reflect panel extended from a longitudinal edge of the first reflect panel under the light reflect surface of the light guide plate toward first edge surface of the light guide plate. The stepped edge portion of the light guide plate may receive two or more lamps that are arranged such that a line connecting longitudinal axes of the lamps is substantially perpendicular to the upper surface, where the first reflect panel is substantially parallel to the line connecting the axes of the lamps and the second reflect panel is substantially perpendicular to the first reflect panel.

In another embodiment, a liquid crystal display device includes a display unit for displaying images by processing image data externally provided, and the above described backlight assembly for providing the light to the display unit.

These and other objects, features and advantages of the present invention will become apparent from the following detailed description of the exemplary embodiments thereof, which is to be read in conjunction with the accompanying drawings, wherein like elements are designated by identical reference numbers throughout the several views.

BRIEF DESCRIPTION OF THE DRAWINGS

This disclosure will present in detail the following description of exemplary embodiments with reference to the following figures wherein.

DETAILED DESCRIPTION OF THE INVENTION

Detailed illustrative embodiments of the present invention are disclosed herein. However, specific structural and functional details disclosed herein are merely representative for purposes of describing exemplary embodiments of the present invention.

Figure 1:
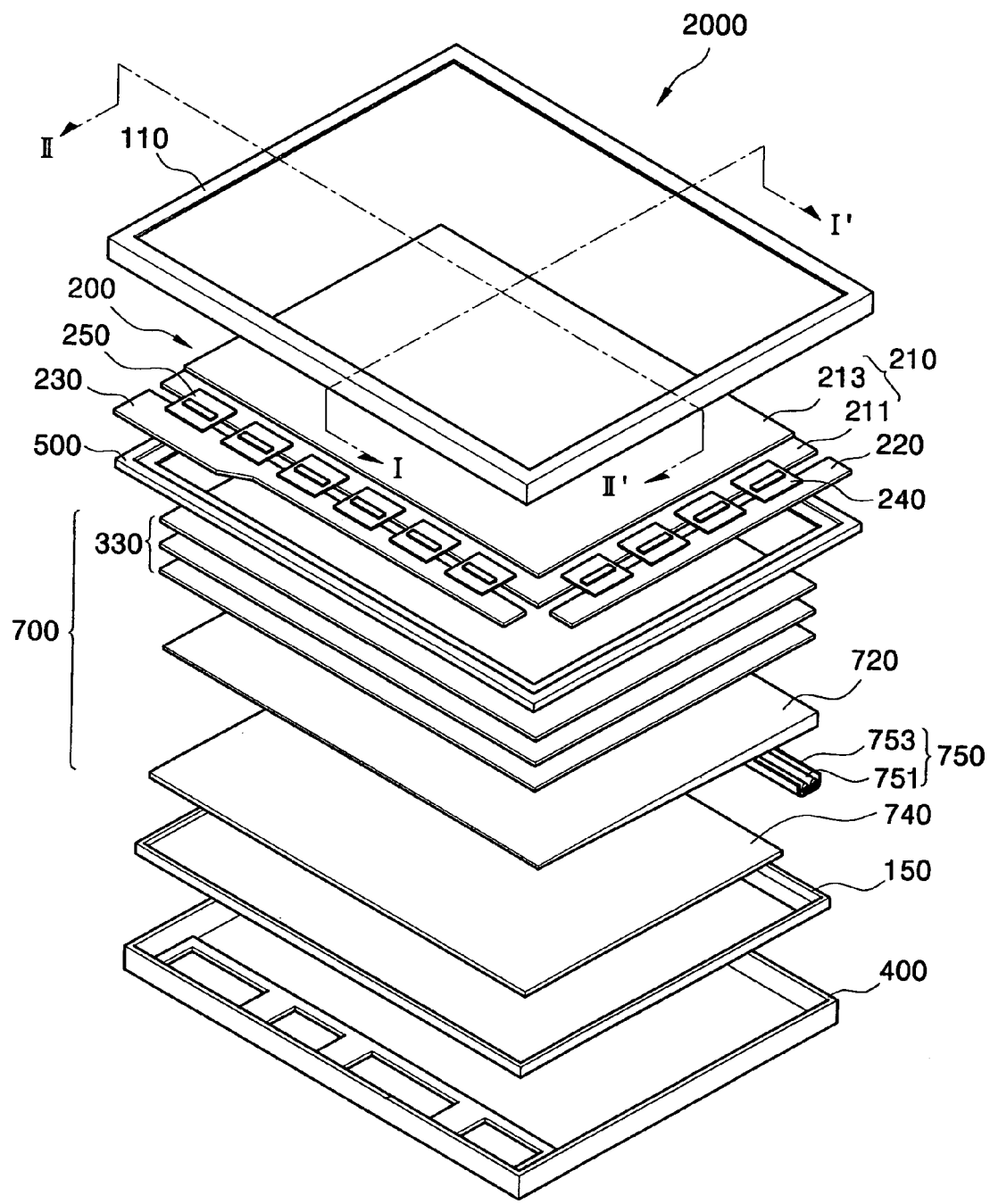
FIG. 1 is an exploded perspective view of a liquid crystal display (LCD) device according to a first embodiment of the present invention.

FIG. 1 is an exploded perspective view of a liquid crystal display (LCD) device according to a first embodiment of the present invention. The LCD device 2000 includes a display unit 200 for processing image data externally provided to display images thereon, and a backlight assembly 700 for providing light to the display unit 200. The display unit 200 has an LCD panel 210 in which liquid crystal is disposed. Arrangement of the liquid crystal molecules is controlled by adjusting electric field applied to the liquid crystal, so that light transmissivity of the liquid crystal is controlled as well. Images are displayed by controlling the light transmissivity of the liquid crystal in the display panel.

The backlight assembly 700 has a light source and optical plates to produce light with uniform luminance distribution. In particular, the backlight assembly 700 has a lamp unit 750, a light guide plate 720, optical sheets 330 disposed over the light guide plate 720, and a light reflect plate 740. The lamp unit 750 has one or more lamps 751 generating light and a lamp reflector 753 surrounding the lamps 751.

The light guide plate 720 guides the light generated from the lamp unit 750 toward the display unit 200. The optical sheets 330 adjust paths of the light exiting the light guide plate 720 to improve the luminance and viewing angle at the display unit 200. The light reflect plate 740 is disposed under the light guide plate 720 to reflect the light leaked from the light guide plate 720. The light reflected from the light reflect plate 740 travels back to the light guide plate 720.

The light generated from the lamps 751 is incident onto the light guide plate 720. The lamp reflector 753 may have a light reflection member on its interior surface to facilitate the light reflection, which leads to improvement on the light efficiency of the LCD device 2000. The lamps 751 may be, for example, cold cathode fluorescent lamps.

Figure 2:
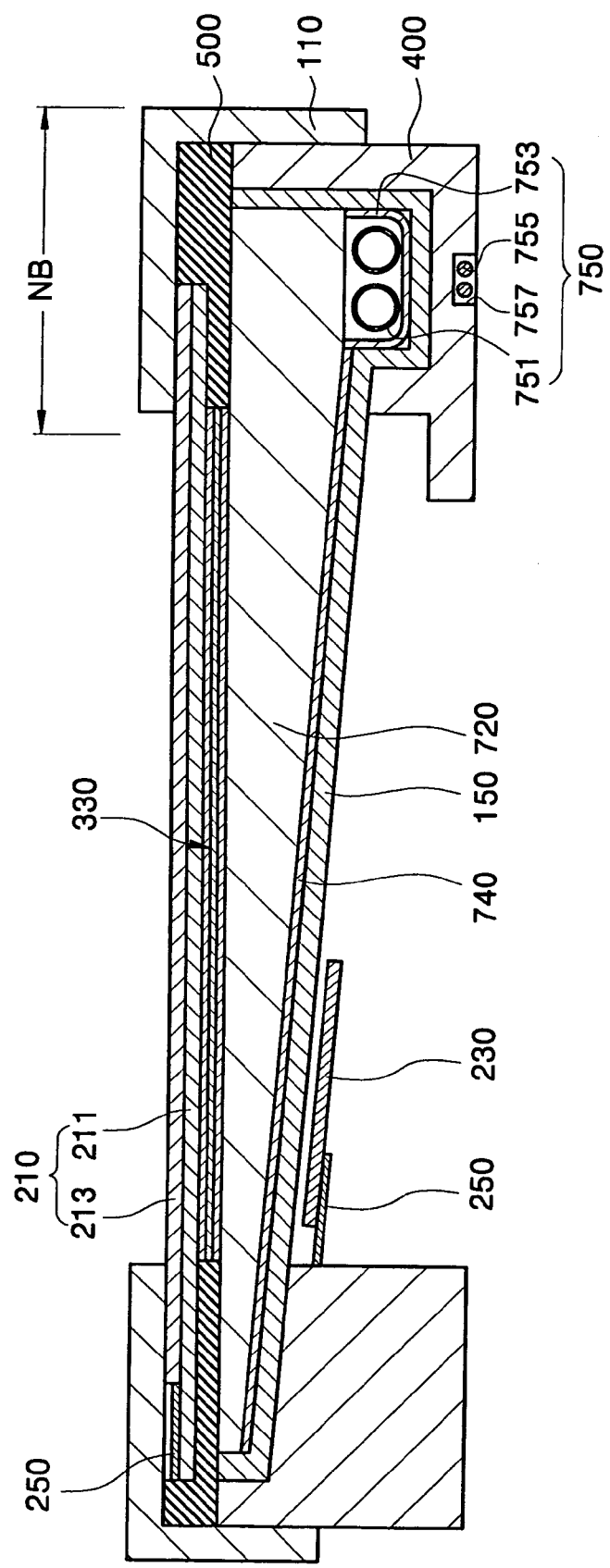
FIG. 2 is a cross-sectional view of the LCD device taken along line I–I' in FIG. 1.
Figure 3:
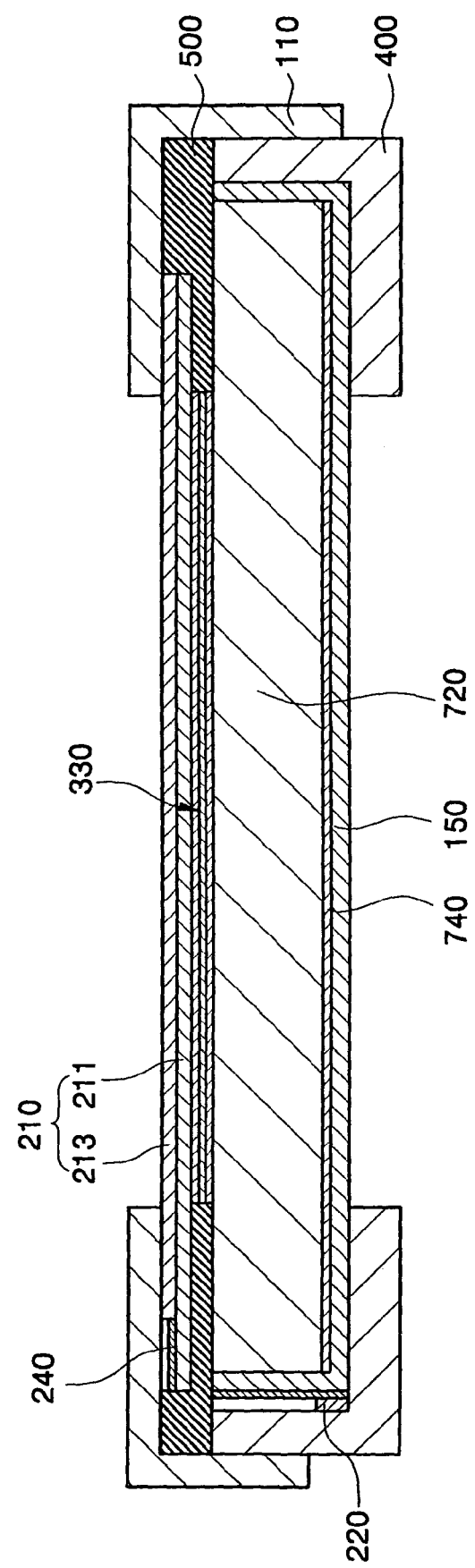
FIG. 3 is a cross-sectional view of the LCD device taken along line II–II' of FIG. 1.

FIG. 2 is a cross-sectional view of the LCD device taken along line I–I' in FIG. 1, and FIG. 3 is a cross-sectional view of the LCD device taken along line II–II' in FIG. 1. The LCD device with this configuration has a narrow bezel NB because no space is necessary for lamps at the side of the light guide plate 720. In other words, compared with a conventional LCD device having lamps disposed at the side of a light guide plate, the LCD device in this embodiment has the lamps 751 under the light guide plate 720 so that it is not necessary to provide a space for the lamps 751 at the side of the light guide plate 720.

Referring to FIGS. 1 to 3, the display unit 200 includes an LCD panel 210 for displaying images thereon and driving circuit boards, such as a data printed circuit board 220 and a gate printed circuit board 230, for driving the LCD panel 210. The display unit 200 also includes a data tape carrier package 240 and a gate tape carrier package 250 connected between the LCD panel 210 and the data and gate printed circuit boards 220, 230, respectively.

The LCD panel 210 has a thin film transistor (TFT) substrate 211, a color filter substrate 213, and a liquid crystal layer (not shown) interposed between the TFT substrate 211 and the color filter substrate 213. The TFT substrate 211 has thin film transistors and pixel electrodes, and the color filter substrate 213 has red-green-blue (RGB) pixels and a common electrode. The TFT substrate 211 is a transparent glass substrate on which thin film transistors are arranged in a matrix shape.

The thin film transistors on the TFT substrate 211 each has a source electrode electrically connected to a data line, a gate electrode electrically connected to a gate line, and a drain electrode electrically connected to a pixel electrode. The pixel electrode may be made of material that is electrically conductive and transparent, such as indium tin oxide. When an electrical signal is applied to the data line and the gate line, the electrical signal is transferred to the source electrode and the gate electrode of the TFT. The TFT is activated or inactivated in accordance with the electrical signal. As a result, electrical signals are output from the drain electrode to the pixel electrode of the TFT to control the pixels.

The color filter substrate 213 is disposed facing the TFT substrate 211 in the LCD panel 210. The color filter substrate 213 has RGB pixels through which light passes so as to display various colors on the LCD panel 210. The color filter substrate 213 may be formed with the RGB pixels through a thin film fabricating process. The common electrode made of, for example indium tin oxide, is formed on a selected area of the color filter substrate 213.

When an electric signal is applied to the gate electrode and the source electrode of a TFT, the TFT is activated so that electric field is formed between a pixel electrode corresponding to the TFT and the common electrode. The array angles of molecules of the liquid crystal are controlled by the electric field so that the light transmissivity of the liquid crystal layer varies.

The data tape carrier package 240 is connected to the source electrodes on the TFT substrate 211, and the gate tape carrier package 250 is connected to the gate electrodes on the TFT substrate 211. The data tape carrier package 240 determines timing of supplying a data driving signal, and the gate tape carrier package 250 determines timing of supplying a gate driving signal. The data printed circuit board 220 electrically connected to the data tape carrier package 240 generates, upon receiving image signals externally provided, the data driving signal to the data line under the timing control of the data tape carrier package 240. The gate printed circuit board 230 electrically connected to the gate tape carrier package 250 also generates the gate driving signal to the gate line under the timing control of the gate tape carrier package 250.

In this embodiment, as shown in FIG. 2, the gate tape carrier package 250 is folded to be disposed under the bottom chassis 150, so that the gate printed circuit board 230 and a portion of the gate tape carrier package 250, which is connected with the gate printed circuit board 230, are disposed under the bottom chassis 150 and parallel with the bottom surface of the light guide plate 720. It is advantageous in this embodiment that the size of the LCD device 2000 is reduced by disposing the gate printed circuit board 230 in the space under the light guide plate 720, which is formed owing to placing the lamp unit 750 under a marginal area of the light guide plate 720. In other words, such configuration of the gate printed circuit board 230 prevents the LCD device from providing another space that would be otherwise necessary for receiving the gate printed circuit board 230.

The data tape carrier package 240 is bent at the side edge of the TFT substrate 211, so that the data printed circuit board 220 is disposed at the side surface of the bottom chassis 150, as shown in FIG. 3. Since such configuration of the data printed circuit board 220 and the data tape carrier package 240 reduces the width of the ineffective display region of the display unit, the LCD device may have a further reduced size or the narrower bezel.

In this embodiment, the data and gate printed circuit boards 220, 230 are formed separately and then electrically connected with each other. However, the data and gate printed circuit boards 220, 230 may be formed in the shape of a unified printed circuit board (not shown) that still has the same function. Also, the gate printed circuit board 230 is disposed under the light guide plate 720 and the data printed circuit board 220 is disposed at the side of the light guide plate 720 in this embodiment. It should be noted, however, that there would be other changes in the configuration of the data and gate printed circuit boards 220, 230. For example, the gate printed circuit board 230 may be disposed at the side of the light guide plate 720, or the unified printed circuit board may be disposed under the light guide plate 720.

The lamp unit 750 includes the lamp reflector 753 for receiving the lamps 751 disposed under the light guide plate 720. The lamp unit 750 is described in detail below. The light reflect plate 740 is disposed under the light guide plate 720 to reflect the light leaked from the light guide plate 720. The reflected light then travels back to the light guide plate 720. The optical sheets 330 are disposed over the light guide plate 720 to adjust paths of the light exiting the light guide plate 720. By passing through the optical sheets 330, the light having non-uniform luminance distribution is converted to the light having uniform luminance distribution.

The light guide plate 720, the lamp unit 750, the optical sheets 330 and the light reflect plate 740 are received in the bottom chassis 150, which is received in a mold frame 400. The optical sheets 330 are disposed within a middle chassis 500 that is placed on the light guide plate. The LCD panel 210 is disposed on the optical sheets 330 and secured by a step edge of the middle chassis 500. A top chassis 110 is provided to be combined with the mold frame 400 such that the top chassis 110 and the mold frame 400 contain the display unit 200 and the backlight assembly 700. In particular, the top chassis 110 is disposed on the LCD panel 210 to secure the display unit 200 and optical sheets 330 within the mold frame 400. The mold frame 400 has a groove 757 on its bottom surface, so that an electrical line 755 connected to the lamp unit 750 is drawn out through the groove.

The LCD device may further have a rear case (not shown) and a front case (not shown) to receive all the above-described components. For example, one of the rear and front cases has a protrusion and the other has a slot, so that the rear and front cases are combined together by inserting the protrusion into the slot.

Figure 4A:
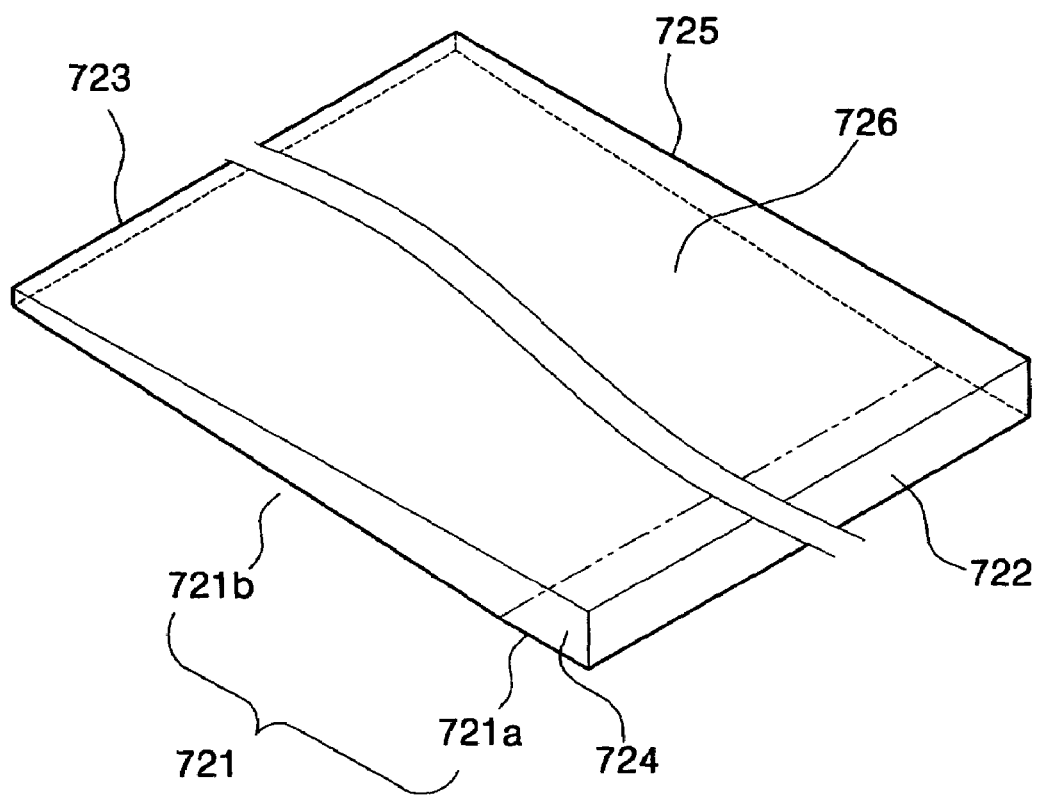
FIG. 4A is a perspective view of the light guide plate in FIG. 1.
Figure 4B:
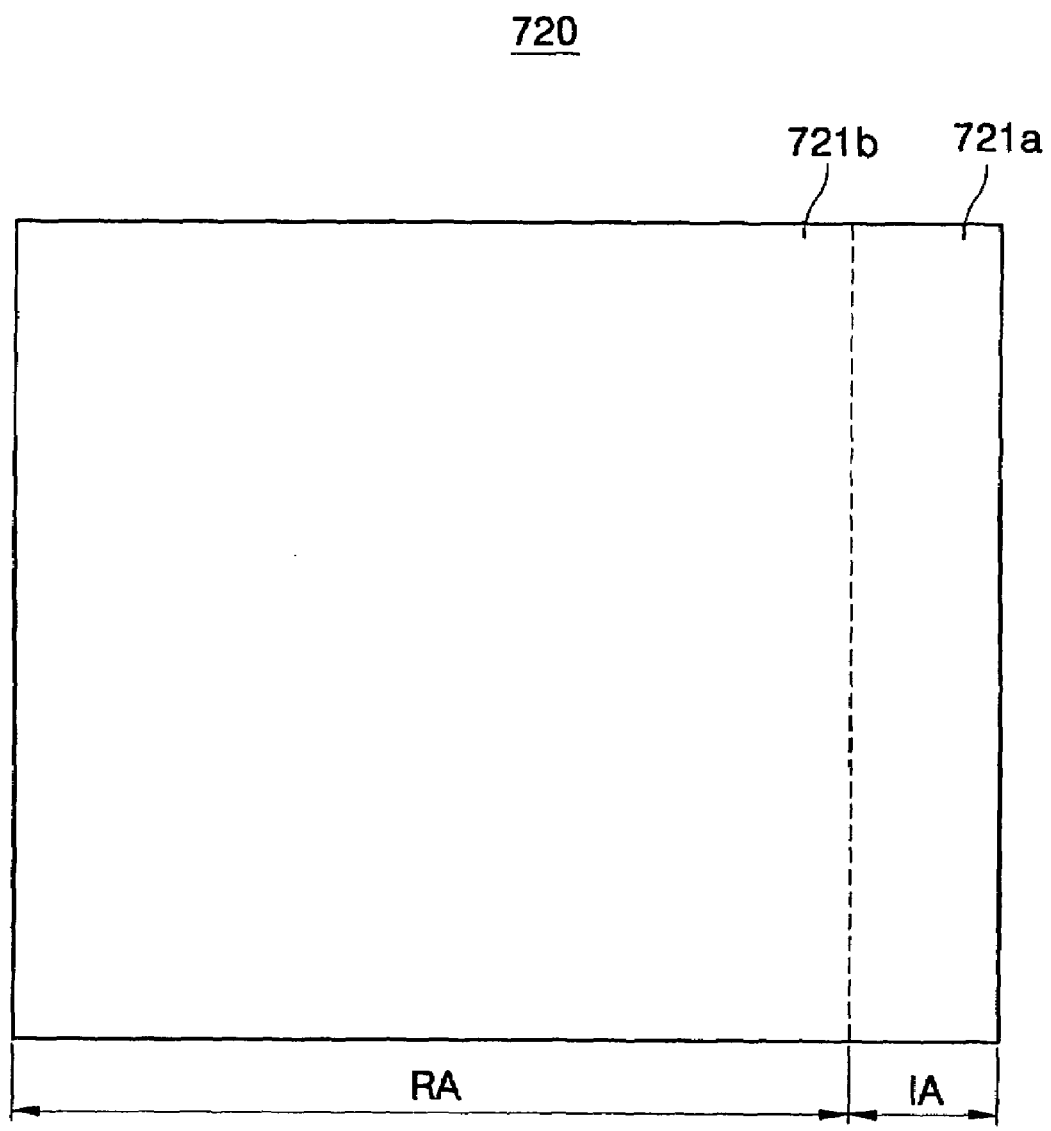
FIG. 4B is a bottom view of the light guide plate in FIG. 4.

FIG. 4A is a perspective view of the light guide plate 720 in FIG. 1, and FIG. 4B is a bottom view of the light guide plate 720 in FIG. 4A. Referring to FIGS. 4A and 4B, the light guide plate 720 has a lower surface 721, an upper surface 726 facing the lower surface 721, a first edge surface 722 extended between edges of the lower surface 721 and the upper surface, a second edge surface 723 opposing the first edge surface 722, a first side surface 724, and a second side surface 725 opposing the first side surface 724. The lower surface 721 includes a light incident surface 721a (IA in FIG. 4B) onto which light is provided from the lamp unit, and a light reflect surface 721b (RA in FIG. 4B) for reflecting the light from the lamp unit through the light incident surface 721a. In this embodiment, the lamp unit is disposed at a marginal area of the lower surface 721, (i.e., the light incident surface 721a) so that the LCD device may have a narrow bezel owing to such configuration of the lamp unit. In particular, the lamps of the lamp unit are disposed under the light incident surface 721a and received in the lamp reflector. The light reflected on the light reflect surface 721b travels in the light guide plate 720 and exits the upper surface 726 toward the LCD panel.

The first and second edge surfaces 722, 723 are substantially parallel with each other, and the first and second side surfaces 724, 725 are also substantially parallel with each other. The first and second side surfaces 724, 725 are each tapered such that a width proximate the first edge surface is larger than a width proximate the second edge surface. Thus, the areal size of the first edge surface 722 is larger than that of the second edge surface 723.

Figure 5:
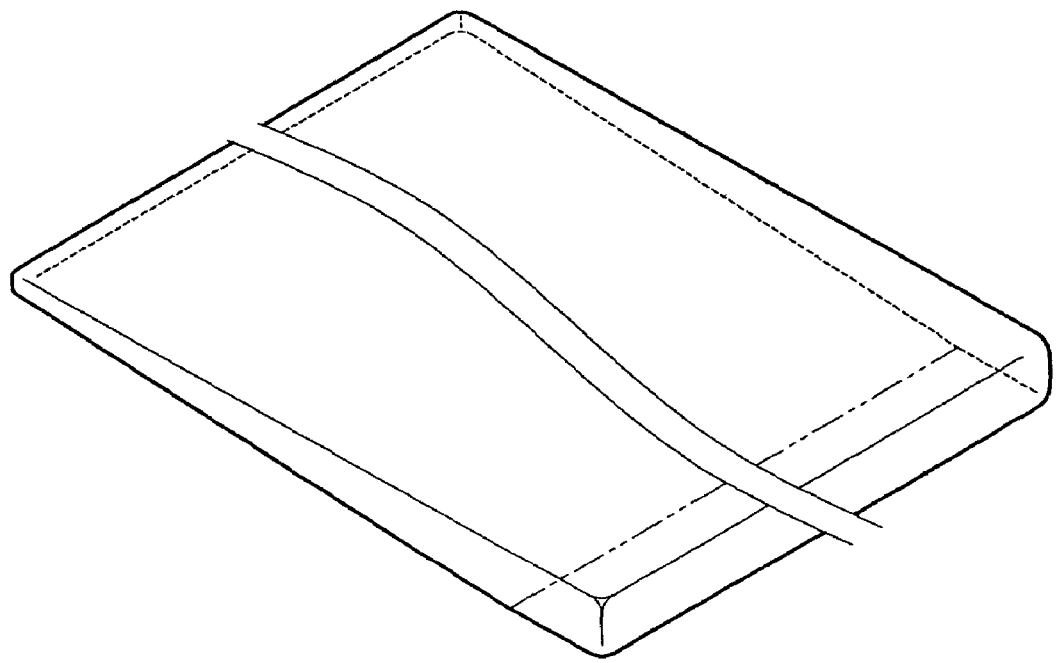
FIG. 5 is a perspective view of a light guide plate having rounded corners and edges.

When a light guide plate has the edged corners, the use efficiency of the light exiting the light guide plate may be reduced due to accumulation of light at the edged corners. Thus, to prevent a decrease in the light efficiency, the light guide plate 770 may be formed to have rounded corners as shown in FIG. 5. The light guide plate 770 in FIG. 5 has rounded edges where the lower surface respectively meets the first edge surface, the second edge surface, the first side surface and the second side surface, and the upper surface respectively meets the first edge surface, the second edge surface, the first side surface and the second side surface. The light guide plate 770 also has rounded corners where the lower surface respectively meets the first edge and first side surfaces, the first edge and second side surfaces, the first side and second edge surfaces, and the second edge and second side surfaces, and the upper surface respectively meets the first edge and first side surfaces, the first edge and second side surfaces, the first side and second edge surfaces, and the second edge and second side surfaces.

Figure 6:
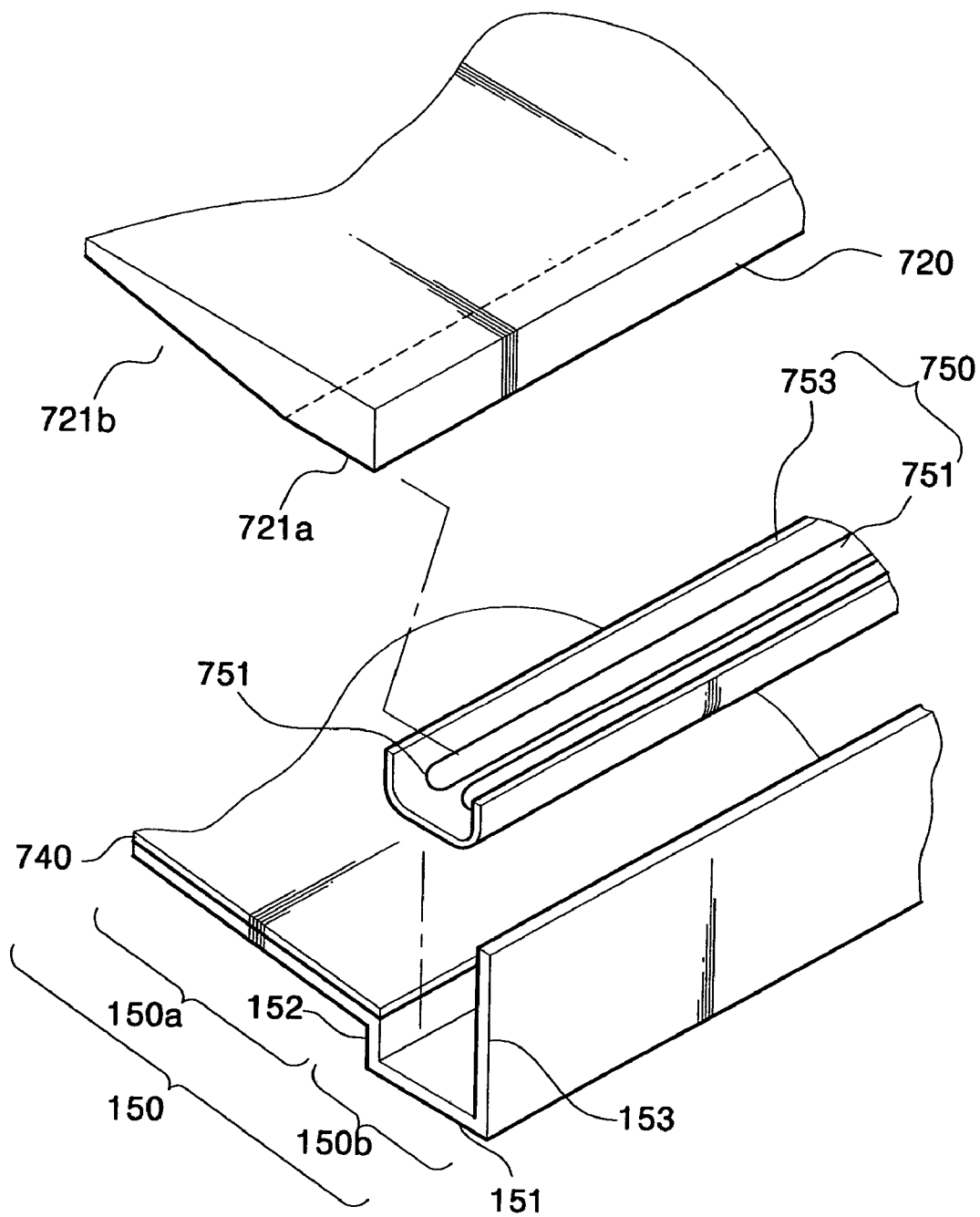
FIG. 6 is an exploded perspective view of the backlight assembly in FIG. 1.

FIG. 6 is an exploded perspective view illustrating a part of the backlight assembly 700 in FIG. 1. The light reflect plate 740 and the lamp unit 750 are disposed under the light guide plate 720. In particular, the light reflect plate 740 is disposed under the light reflect surface 721b of the light guide plate 720, and the lamp unit 750 is disposed under the light incident surface 721a of the light guide plate 720. Under the light incident surface 721a, the lamps 751 are disposed and the lamp reflector 753 is disposed to receive the lamps 751 therein. In this embodiment, the lamp reflector 753 has a U-shape and includes a bottom and opposing sides extended from longitudinal edges of the bottom in a direction substantially perpendicular to the bottom. Although this embodiment shows the U-shaped lamp reflector, the lamp reflector 753 may have one of a V-shape, a rectangular shape, etc. It is noted that modifications on the lamp reflector 753 would be readily made by those skilled in this art. The bottom and the opposing sides form a channel space in which the lamps are received. The opposing sides each have a longitudinal edge that is in contact with a corresponding region of the light incident surface 721a.

The light reflect plate 740 reflects light leaked from the light reflect surface 721b of the light guide plate 720, and the lamp reflector 753 reflects light generated from the lamps 751 and/or light leaked from the light incident surface 721a of the light guide plate 720. The light reflect plate 740 and the lamp unit 750 are disposed on the bottom chassis 150. The bottom chassis 150 has a first receiving portion 150a and a second receiving portion 150b, which are connected with each other. The first receiving portion 150a receives the light reflect plate 740, and the second receiving portion 150b receives the lamp unit 750. The first receiving portion 150a is substantially parallel with the light reflect plate 740 and the light reflect surface 721b of the light guide plate 720.

The second receiving portion 150b has a bottom 151 on which the bottom of the lamp reflector 753 is disposed, a first wall 152 extended from a longitudinal edge of the bottom upward to be connected with a longitudinal edge of the first receiving portion 150a, and a second wall 153 opposing to the first wall 152 and extended from the other longitudinal edge of the bottom 151 upward to be in contact with the middle chassis (referring to FIG. 2). The first and second walls 152, 153 of the bottom chassis 150 are substantially parallel with each other and substantially perpendicular to the bottom 151. The first wall 152 of the bottom chassis 150 has a width substantially identical to that of the opposing sides of the lamp reflector 153. The second wall 153 of the bottom chassis 150 has a width enough to cover one of the opposing sides and the first edge surface of the light guide plate 720.

Figure 7:
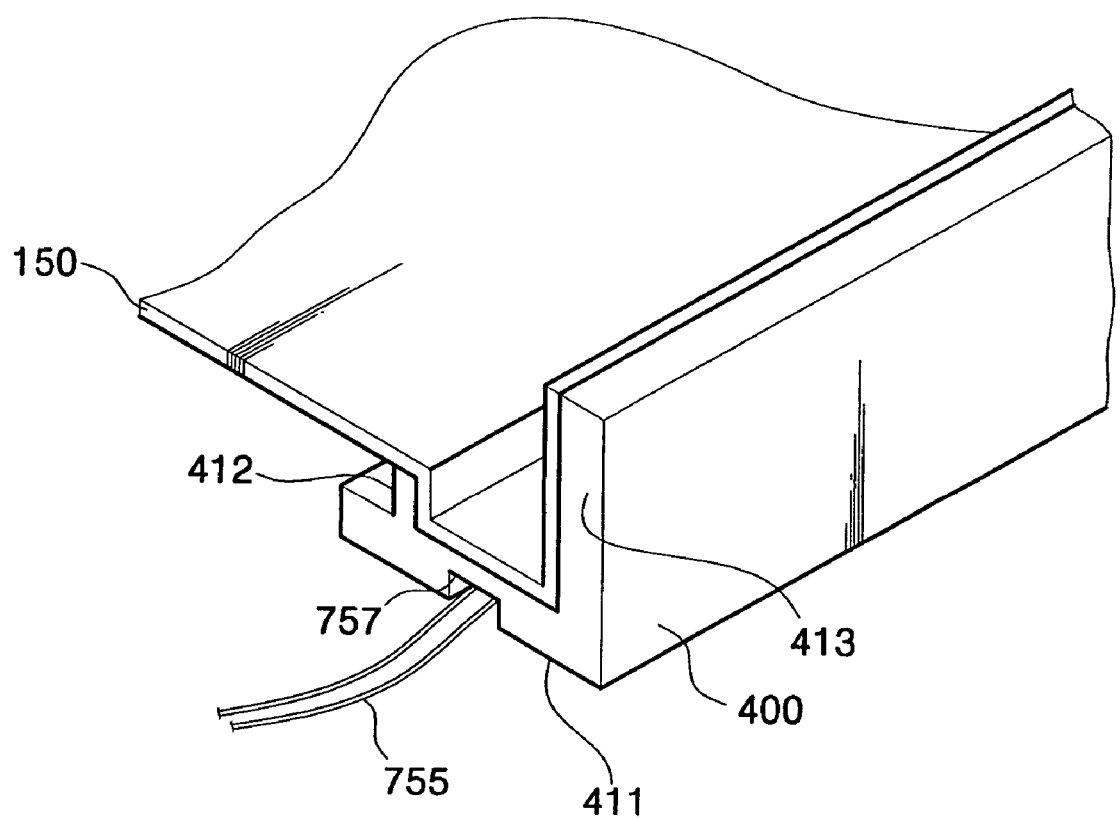
FIG. 7 is a perspective view of the mold frame in FIG. 1.

Under the bottom chassis 150, the mold frame 400 is disposed to securely containing the backlight assembly. As shown in FIG. 7, the mold frame 400 has a bottom 411 and first and second walls 412, 413, which are configured to receive the second receiving portion 150b of the bottom chassis 150. In other words, the bottom and the first and second walls of the second receiving portion 150b of the bottom chassis 150 are disposed on the bottom 411 and the first and second walls 412, 413 of the mold frame 400, respectively. The first and second walls 412, 413 of the mold frame 400 are substantially perpendicular to the bottom 411 and extended from the longitudinal edges of the bottom 411 of the mold frame 400. The first and second walls 412, 413 of the mold frame 400 also have widths approximately identical to the widths of the first and second walls of the bottom chassis 150, respectfully.

The bottom 411 of the mold frame 400 also has a groove 757 at its under surface, through which the ground electrode line and a hot electrode line 755 (not shown) of the LCD device may be drawn out so as to be electrically connected to an external power source. The hot electrode line provides a high voltage and emits high heat and electromagnetic field, which may cause malfunction of electrical circuits. Thus, to prevent such a problem, the ground electrode line needs to be provided in the LCD device. Although the groove 757 has an elongated rectangular shape in this embodiment, it may have a different shape such as U-shape, V-shape, etc.

Figure 8:
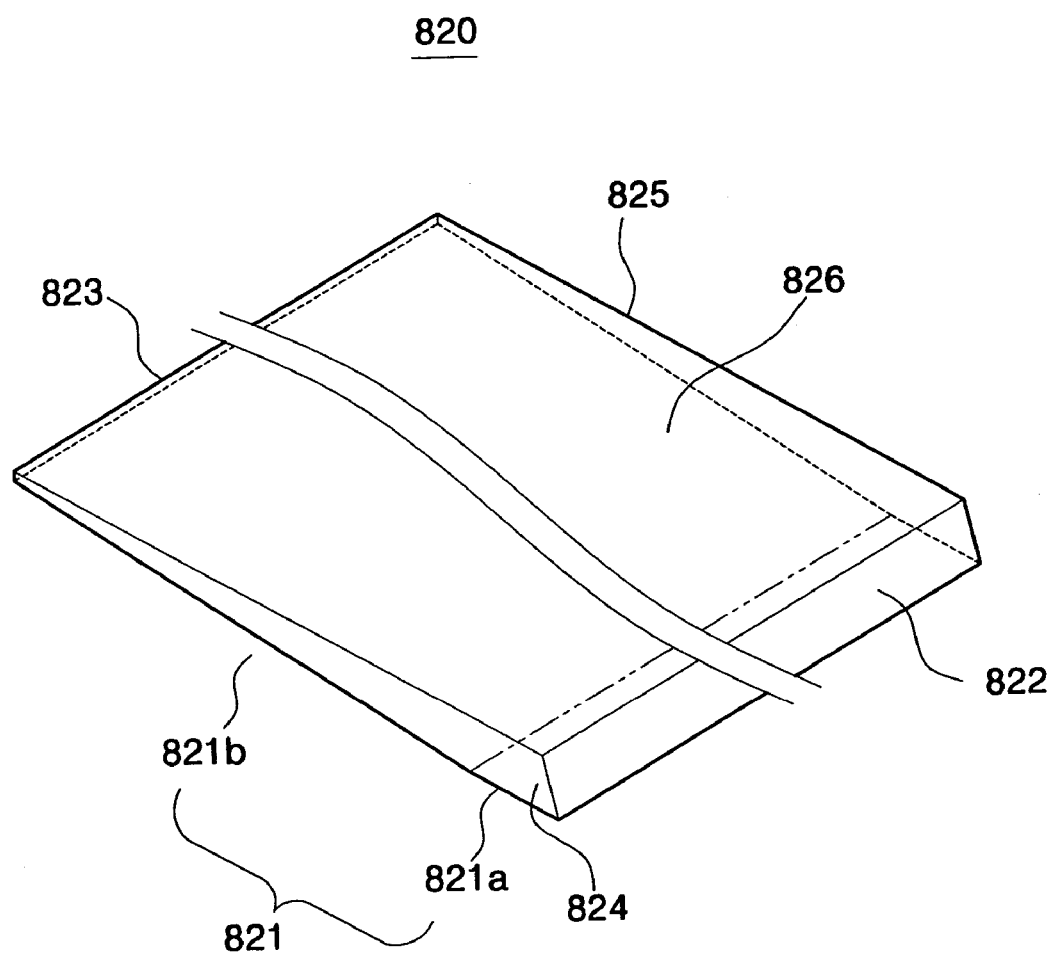
FIG. 8 is a perspective view of a light guide plate according to a second embodiment of the present invention.

FIG. 8 is a perspective view of a light guide plate according to a second embodiment of the present invention. The light guide plate 820 includes a lower surface 821, an upper surface 826 facing the lower surface 821, first and second edge surfaces 822, 823 opposing to each other, and first and second side surfaces 824, 825 opposing to each other. Since the light guide plate 820 has a wedge shape, the first and second side surfaces 824, 825 are tapered down from an area proximate the first edge surface 822 to an area proximate the second edge surface 823, and the first edge surface 822 has a larger areal size than the second edge surface 823.

The lower surface 821 has a light incident surface 821a and a light reflect surface 821b. Under the light incident surface 821a, a lamp unit (not shown) is disposed to generate light that is incident on the light incident surface 821a and travels in the light guide plate 820. The light reflect surface 821b reflects the light provided from the lamp unit through the light incident surface 821a.

In this embodiment, the first edge surface 822 is slant toward the lower surface 821. In particular, the first edge surface 822 is slant toward the light reflect surface 821b such that an acute angle (or an angle less than 90°) is formed between the first edge surface 822 and the light incident surface 821a. Since the first edge surface 822 is slant toward the light reflect surface 821b, the light provided through the light incident surface 821a is guided to the light reflect surface 821b by the first edge surface 822. The light reflect surface 821b then reflects toward the upper surface 826 the light guided by the first edge surface 822 as well as the light provided through the light incident surface 821a. Accordingly, more amount of light exits the upper surface 826 in the light guide plate 820 than in a conventional light guide plate, so that use efficiency of the light provided from the lamp unit and luminance at a display panel are further improved in this by employing the light guide plate 820 in an LCD device.

Figure 9:
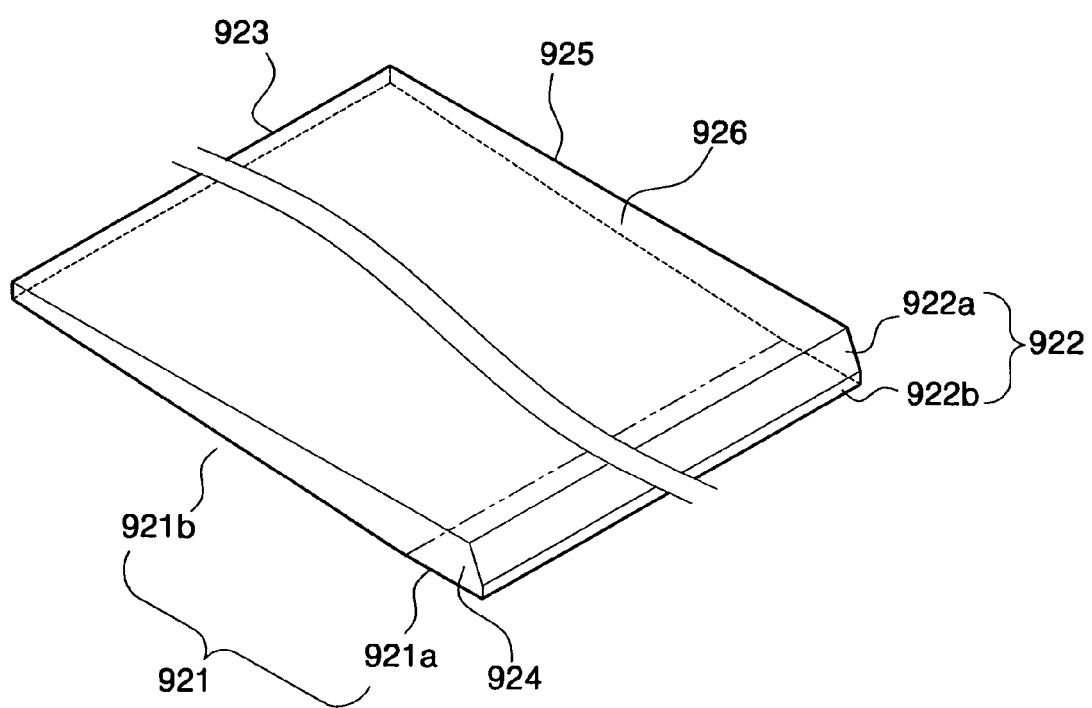
FIG. 9 is a perspective view of a light guide plate according to a third embodiment of the present invention.

FIG. 9 is a perspective view illustrating a light guide plate according to a third embodiment of the present invention. The light guide plate 920 includes a lower surface 921, an upper surface 926 facing the lower surface 921, first and second edge surfaces 922, 923 opposing to each other, and first and second side surfaces 924, 925 opposing to each other. The light guide plate 920 in this embodiment has a wedge shape, so that the first and second side surfaces 924, 925 are tapered down from the first edge surface 922 to the second edge surface 923.

The lower surface 921 has a light incident surface 921a for receiving light generated from a lamp unit (not shown) that is disposed under the light incident surface 921a, and a light reflect surface 921b for reflecting light provided through the light incident surface n921a. The light reflected on the light reflect surface 921*b* then exits the upper surface 926 toward a display panel (not shown).

In this embodiment, the first edge surface 922 has an inclined surface 922*a* and a straight surface 922*b*. The straight surface 922*b* is extended from a longitudinal edge of the light incident surface 921*a*. The inclined surface is angularly extended from a longitudinal edge of the straight surface 922*b*, which is opposite to the other longitudinal edge connected with the light incident surface 921*a*. The inclined surface 922*a* is connected with a longitudinal edge of the upper surface 926 at its longitudinal edge opposing to the other longitudinal edge connected with the straight surface 922*b*. The inclined surface 922*a* is slant toward the lower surface 921.

For example, the straight surface 922*b* is substantially perpendicular to the light incident surface 921*a* or substantially parallel with the second edge surface 923, and the inclined surface 922*b* is slant to have a slope such that an obtuse angle (or an angle larger than 90°) is formed with respect to the straight surface 922*b* and an acute angle with respect to the light incident surface 921*a*. Also, an obtuse angle is formed between the inclined surface 922*a* and the upper surface 926. Since the inclined surface 922*a* is slant toward the light reflect surface 946, the light provided through the light incident surface 921*a* is guided by the inclined surface 922*a* toward the light reflect surface 921*b*. Thus, the light reflect surface 921*b* reflects the light guided by the inclined surface 922*a* as well as the light provided though the light incident surface 921*a*. The reflected light then travels in the light guide plate 920 and exits the upper surface 926 toward a display panel (not shown).

Figure 10:
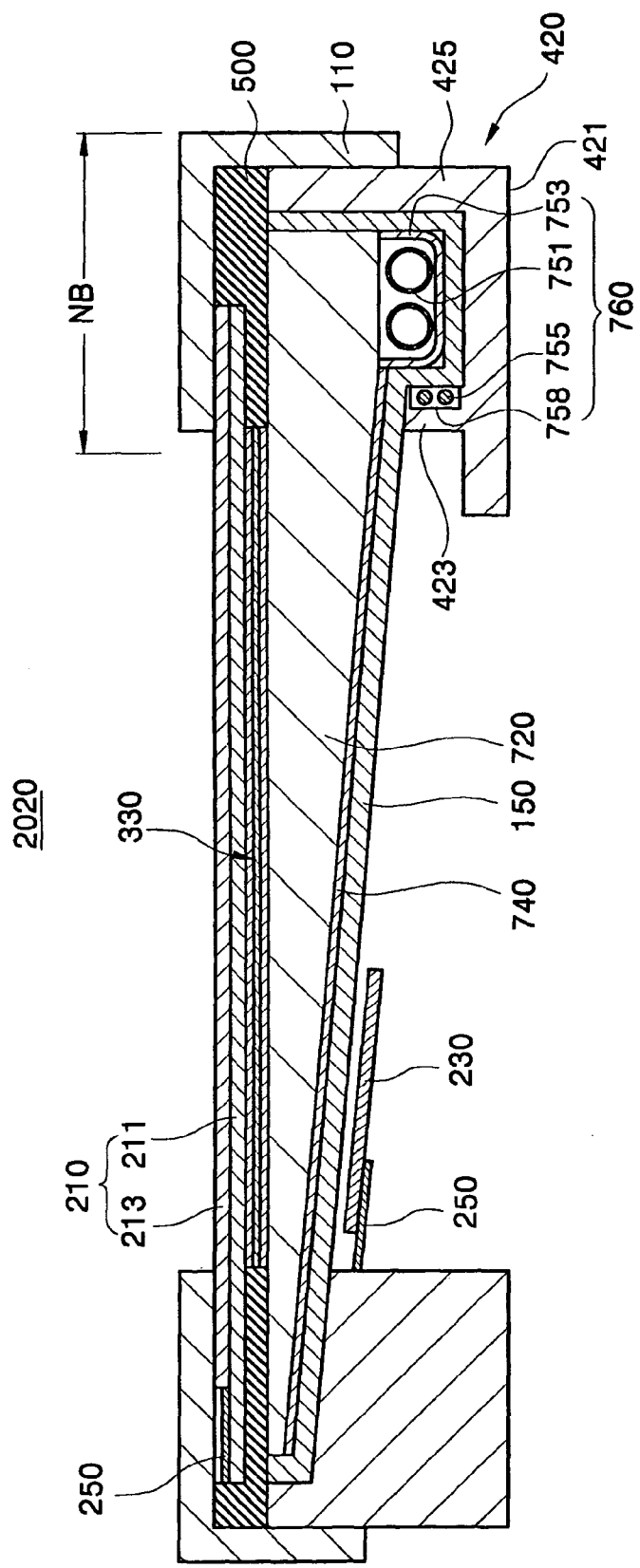
FIG. 10 is a cross-sectional view of an LCD device according to a fourth embodiment of the present invention.

FIG. 10 is a cross-sectional view of an LCD device according to a fourth embodiment of the present invention. In FIG. 10, the same parts as those shown in FIG. 2 are represented with like reference numerals and to avoid description duplication, accordingly, their explanation will be omitted. In the embodiment of FIG. 10, a lamp unit 760 is disposed under the light incident surface of the light guide plate 720 and includes the lamps 751, the lamp reflector 753, and the ground electrode line 755. The lamps 751 disposed under the light incident surface are received in the lamp reflector 753 that is received in the bottom chassis 150. The portion receiving the lamp unit 760 of the bottom chassis 150 is disposed in a concave channel of a mold frame 420, which is configured with a bottom 421 and first and second walls 423, 425.

Figure 11:
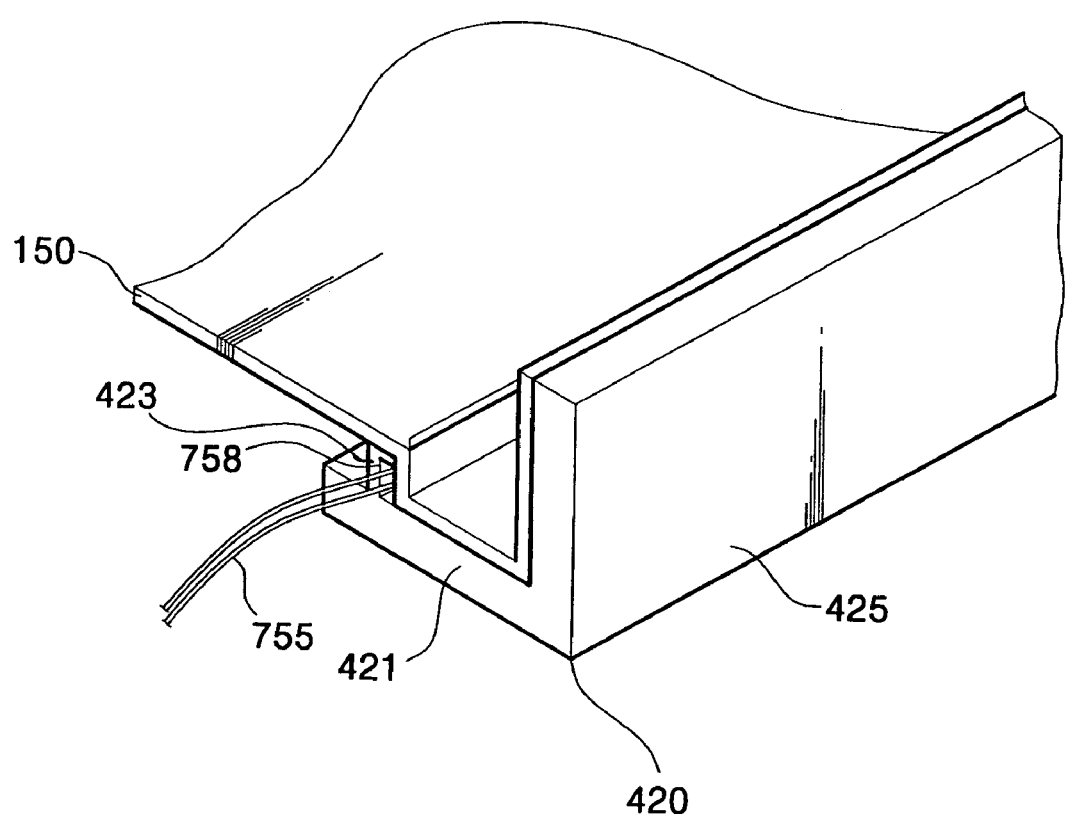
FIG. 11 is a perspective view of the light guide plate in FIG. 10.

A perspective view of the bottom chassis 150 and the mold frame 420 is shown in FIG. 11. The mold frame 420 has the bottom 421 substantially parallel with the light incident surface of the light guide plate 720, the first wall 423 extended from a longitudinal edge of the bottom 421 toward the bottom chassis 150 receiving the light reflect surface of the light guide plate, and the second wall 425 opposing to the first wall 423 and extended from the other longitudinal edge of the bottom 421 along the first edge surface of the light guide plate. The first and second walls 423, 425 are substantially parallel with each other and also substantially perpendicular to the bottom 421. The first wall 423 is formed, for example, to have a width substantially identical to that of the opposing sides of the lamp reflector 753. The second wall 425 is, for example, extended upward to completely cover the first edge of the light guide plate 720.

The first wall 423 of the mold frame 420 has a groove 758 on its surface. In this embodiment, the groove 758 has a rectangular shape and is formed in the longitudinal direction of the mold frame 420 between the first wall 423 and the portion of the bottom chassis 150 that is received in the mold frame 420, as shown in FIG. 11. It should be noted that the groove 758 may have a different shape, such as U-shape, V-shape, etc., and be formed on a different surface of the first wall 423.

Through the groove 758, the electrical line 755 for supplying the lamp unit with power is drawn out and connected to an external power source. Since the electrical line 755 is drawn out through the groove 758 that is a space formed under the light guide plate 720 owing to placing the lamp unit 760 under the marginal area (i.e., the light incident surface) of the light guide plate 720, the overall size of the LCD device may be further reduced. In other words, compared with a conventional LCD device that provides a separate space for carrying the electrical line, the LCD device of the present invention advantageously provides the groove 758 for receiving the electrical line 755 at the space under the light guide plate 720, which would be otherwise unused.

Figure 12:
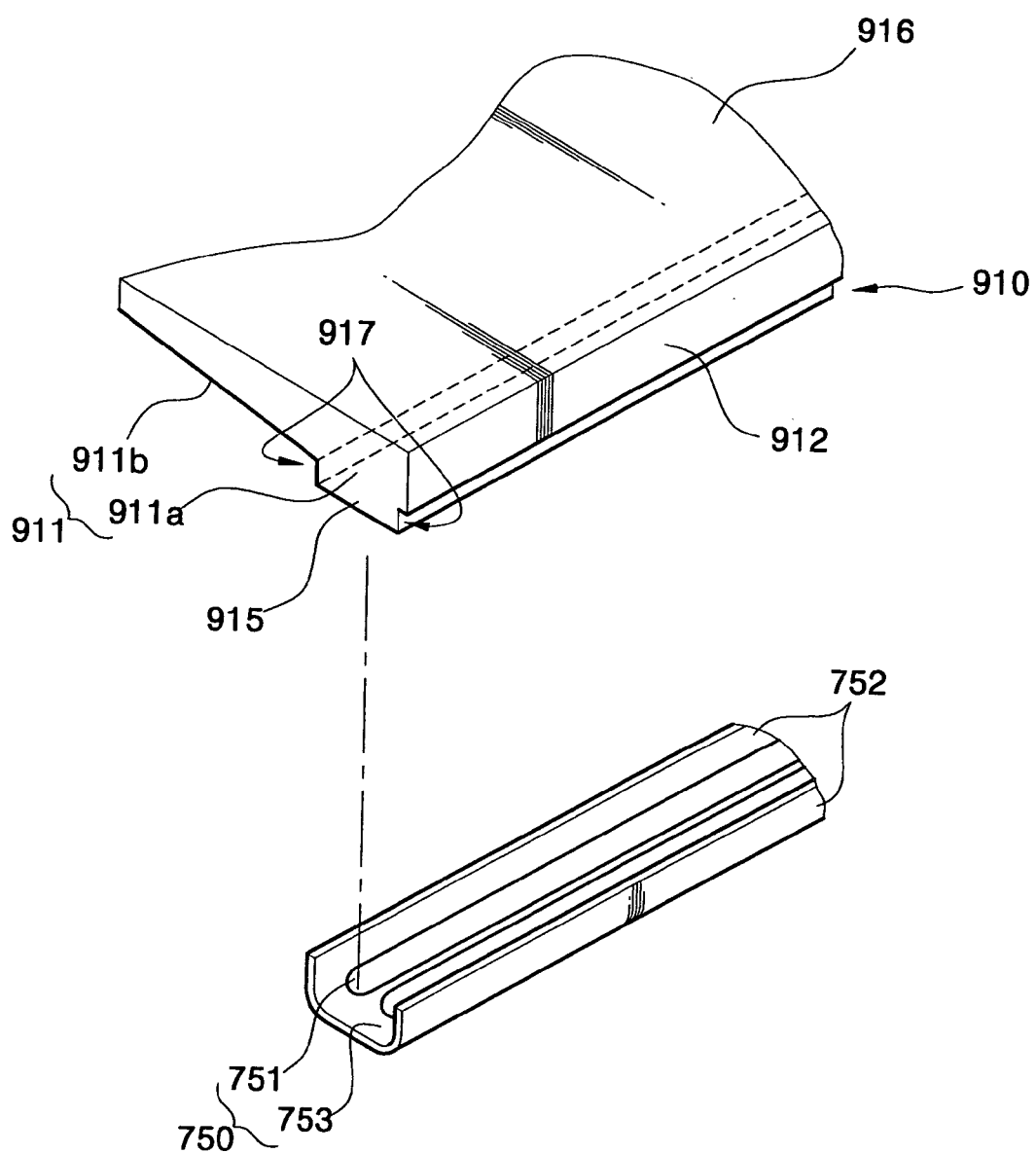
FIG. 12 is an exploded perspective view of a light guide plate according to a fifth embodiment of the present invention.

FIG. 12 is a exploded perspective view of a light guide plate according to a fifth embodiment of the present invention. The light guide plate 910 includes a lower surface 911 and an upper surface 916 facing the lower surface 911. The lower surface 911 has a light incident surface 911*a* for receiving light and a light reflect surface 911*b* for reflecting the light. The lamp unit 750 is disposed under the light incident surface 911*a* such that the lamps 751 are placed on the light incident surface 911*a* and the lamp reflector 753 enclosing the lamps 751 is securely combined on the light incident surface 911*a*.

In this embodiment, the light guide plate 910 has a protrusion 915 formed on the light incident surface 911*a*. The protrusion 915 is integrally formed on the light incident surface 911*a* and made of the same material as that of the light guide plate 910. The protrusion 915 is disposed within the opposing sides 752 of the lamp reflector 753. In particular, two shoulders 917 are each formed at a longitudinal edge between the protrusion 915 and the lower surface 911, and the opposing sides 752 of the lamp reflector 753 are combined on the shoulders 917, respectively. As shown in FIG. 12, one of the shoulders 917 is formed at the longitudinal edge between the protrusion 915 and the light incident surface 911*a*, and corresponding one of the opposing sides 752 of the lamp reflector 753 is combined with the shoulder 917 such that the exterior surface of the lamp reflector 753 and a first edge surface 912 of the light guide plate 920 form a plane surface. The other of the shoulders 917 is formed at the border between the light incident and light reflect surfaces 9110*a*, 911*b* light guide plate 910, and the other of the opposing sides 752 of the lamp reflector 753 is combined on this shoulder. Preferably, the protrusion 915 has a width substantially identical to the width of the lamp reflector 753 or the length between the opposing sides 752 of the lamp reflector 753.

The light generated from the lamps 751 is incident on the bottom surface of the protrusion 915 to travel in the light guide plate 910. Since forming the protrusion 915 on the light incident surface 911*a* increases the number of reflections of the light incident on the light guide plate 910, the light exiting the upper surface 916 of the light guide plate 910 may have more uniform luminance distribution.

Figure 13:
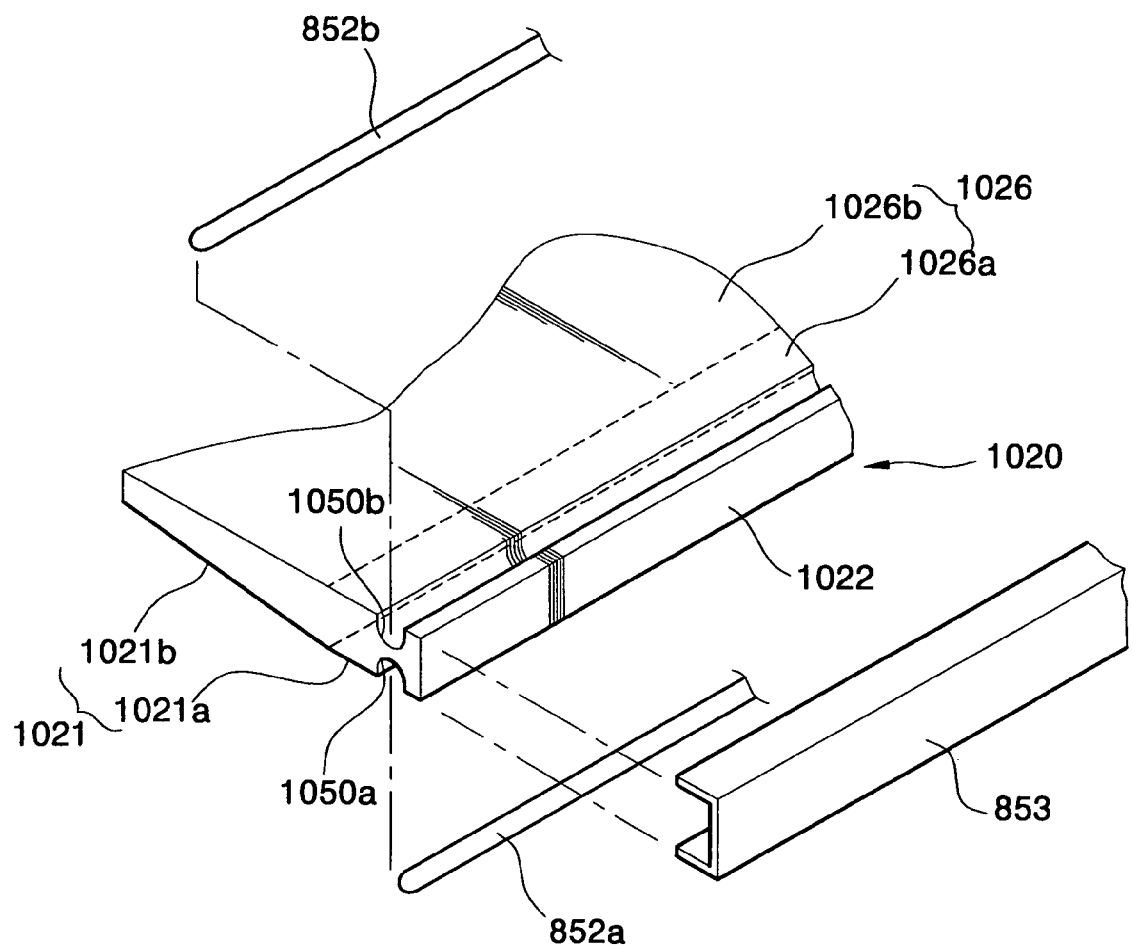
FIG. 13 is an exploded perspective view of a light guide plate according to a sixth embodiment of the present invention.

FIG. 13 is an exploded perspective view of a light guide plate and a lamp unit according to a sixth embodiment of the present invention. The light guide plate 1020 includes a lower surface 1021, an upper surface 1026 facing the lower surface 1021, and a first edge surface 1022 extended from a longitudinal edge of the lower surface 1021 to a longitudinal edge of the upper surface 1026 or vice versa. The lower surface 1021 has a first light incident surface 1021a and a first light reflect surface 1021b, and the upper surface 1026 has a second light incident surface 1026a and a second light reflect surface 1026b. In this embodiment, the light guide plate 1020 has a wedge shape such that the thickness of the light guide plate 1020 proximate the light incident surface is larger than thickness at an area proximate the second edge surface (not shown) opposite to the first edge surface 1022.

The light guide plate 1020 has first and second grooves 1050a, 1050b formed in its longitudinal direction on the first and second light incident surfaces 1021a, 1026a, respectively. The first and second grooves 1050a, 1050b are opposite with each other and receive the first and second lamps 852a, 852b, respectively. Once the lamps 852a, 852b are disposed in the grooves 1050a, 1050b, the lamp reflector 853 is combined with the edge of the light guide plate 1020 to receive the lamps 852a, 852b in the grooves 1050a, 1050b and the first edge surface 1022 of the light guide plate 1020. In particular, the first edge surface 1022 has a width substantially identical to that of the lamp reflector 853 (or the length between the opposing sides of the lamp reflector 853), so that the edge of the light guide plate 1020 having the first edge surface 1022, the marginal area of the light incident surfaces 1021a, 1026a, and the grooves 1050a, 1050b is inserted into the opposing sides of the lamp reflector 853. The grooves each have a depth substantially identical to the diameter of the corresponding lamp.

Although the light guide plate in FIG. 13 employs the U-shaped grooves, the shape of the grooves is not limited to the U-shape but may include various shapes such as V-shape, rectangular shape, etc. Also, although one lamp reflector 853 is employed in this embodiment, modifications would be readily made such as divided lamp reflectors each securely covering a corresponding lamp.

Figure 14:
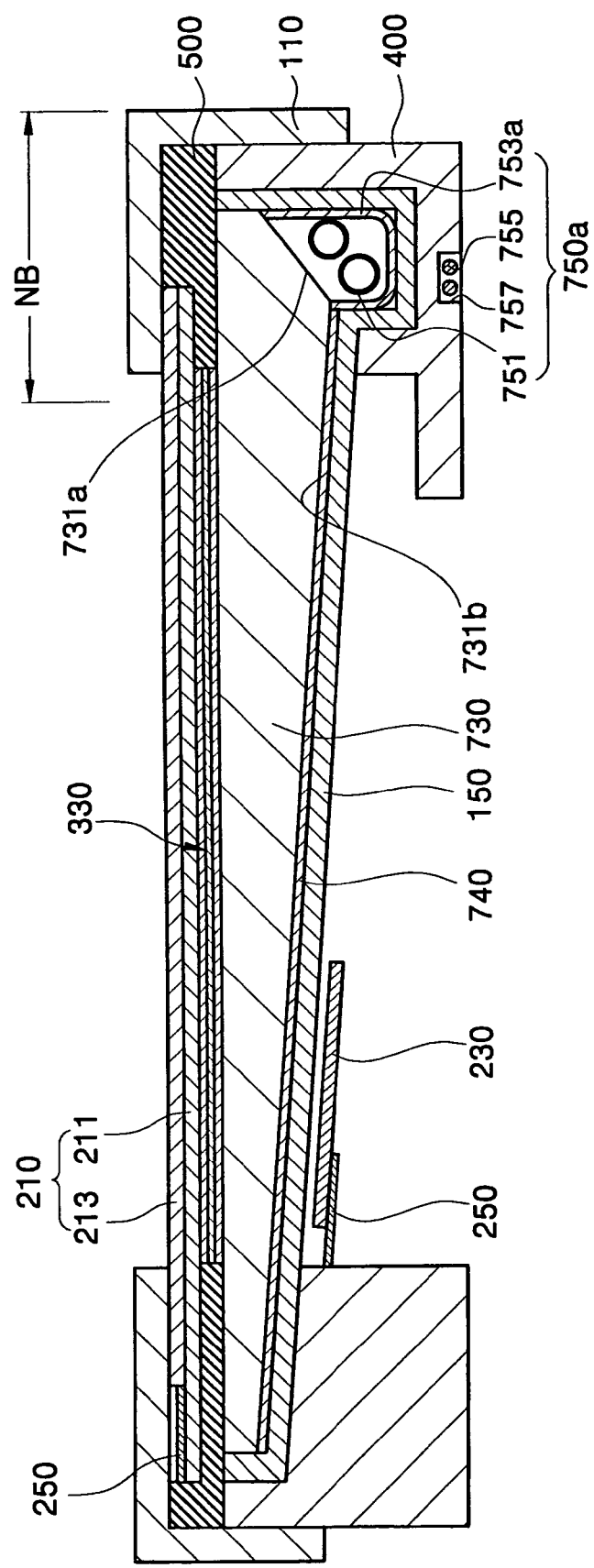
FIG. 14 is a cross-sectional view of an LCD device according to a seventh embodiment of the present invention.

FIG. 14 is a cross-sectional view of an LCD device according to a seventh embodiment of the present invention. In FIG. 14, the same parts as shown in FIG. 2 are represented with like reference numerals, and their explanation will be thus omitted to avoid description duplication.

The LCD device 2030 has a light guide plate 730 on which the LCD panel 210, the optical sheets 330 and the middle chassis 500 are disposed as described above. Under a marginal area of the light guide plate 730, a lamp unit 750a is disposed. The lamp unit 750a has a lamp reflector 753a and lamps 751 for generating the light incident onto the light guide plate 730. The lamp reflector 753a is connected, at its one longitudinal edge, with the light reflect plate 740 disposed under the light guide plate 730. The lamp unit 750a is disposed in the receiving portion of the bottom chassis 150, which is received in the channel of the mold frame 400. The mold frame 400 has the groove 757 through which the electrical line 755 is drawn out.

Figure 15:
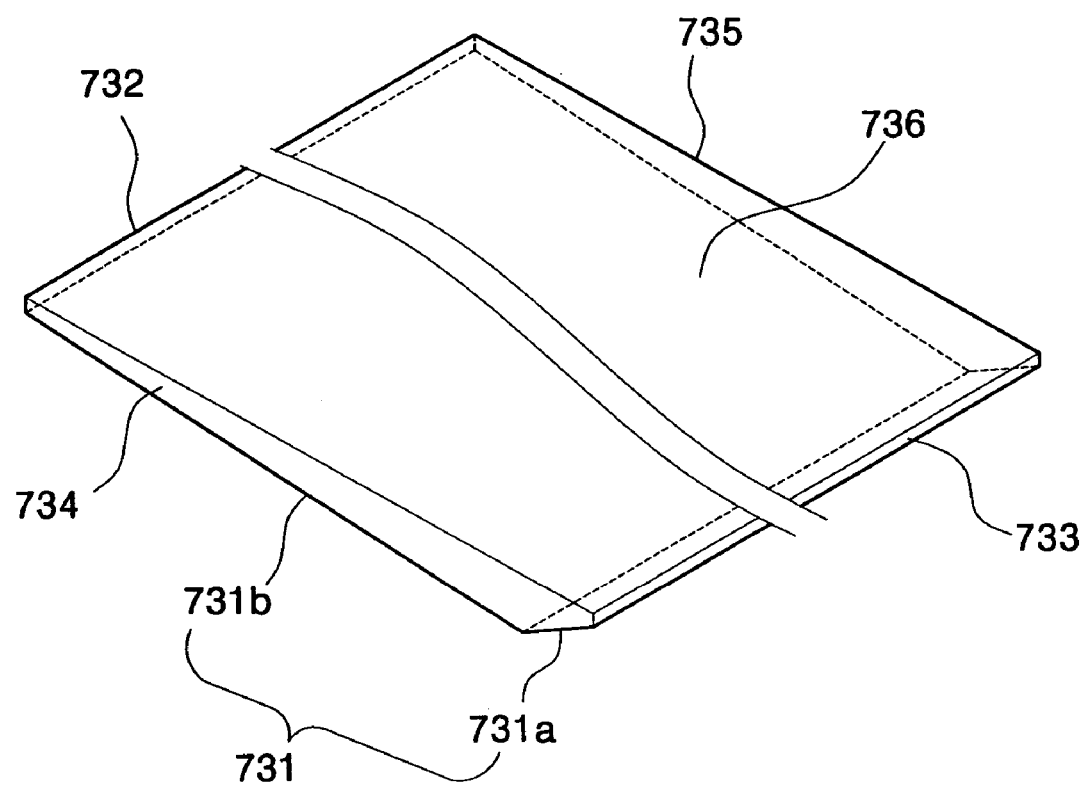
FIG. 15 is a perspective view of the light guide plate in FIG. 14.

FIG. 15 is a perspective view of the light guide plate 730 in FIG. 14. Referring to FIGS. 14 and 15, the light guide plate 730 includes a lower surface 731 having a light incident surface 731a and a light reflect surface 731b, an upper surface 736 facing the lower surface 731, and a first edge surface 732 extended from a longitudinal edge of the light reflect surface 731b upward to be connected to a longitudinal edge of the upper surface 736. The first edge surface 732 is disposed at a side opposite to the light incident surface 731a. The light guide plate 730 has first and second side surfaces 734, 735 facing each other, which are tapered down from the side proximate the light incident surface 731a to the side proximate the first edge surface 732. The light guide plate also has a second edge surface 733 extended from an longitudinal edge of the light incident surface 731a upward to be connected to an longitudinal edge of the upper surface 736. The second edge surface 733 is substantially parallel with the first edge surface 732.

The light guide plate 730 in this embodiment has a stepped edge portion having the light incident surface 731a, the second edge surface 733, and a marginal area of the upper and side surfaces 736, 734, 735. The light incident surface 731a is slant such that an obtuse angle is formed at the edge where the longitudinal edges of the light incident surface 731a and the light reflect surface 731b meet each other. The stepped edge portion is also tapered such that the light guide plate 730 of the stepped edge portion becomes thinner as more proximate the second edge surface.

The lamp unit 750a is disposed under the light incident surface 731a as shown in FIG. 14. The lamps 751 are disposed under the light incident surface 731a of the stepped edge portion, and the lamp reflector 753a is combined on the stepped edge portion to securely enclose the lamps 751. In this embodiment, the opposing sides of the lamp reflector 753a are combined on the longitudinal edges of the light incident surface 731a. In particular, one of the opposing sides is in contact with the corresponding longitudinal edge of the light incident surface 731a, which is proximate the light reflect surface 731b, and the other of the opposing sides is in contact with the corresponding longitudinal edge of the light incident surface 731a, which is proximate the upper surface 736.

Figure 16:
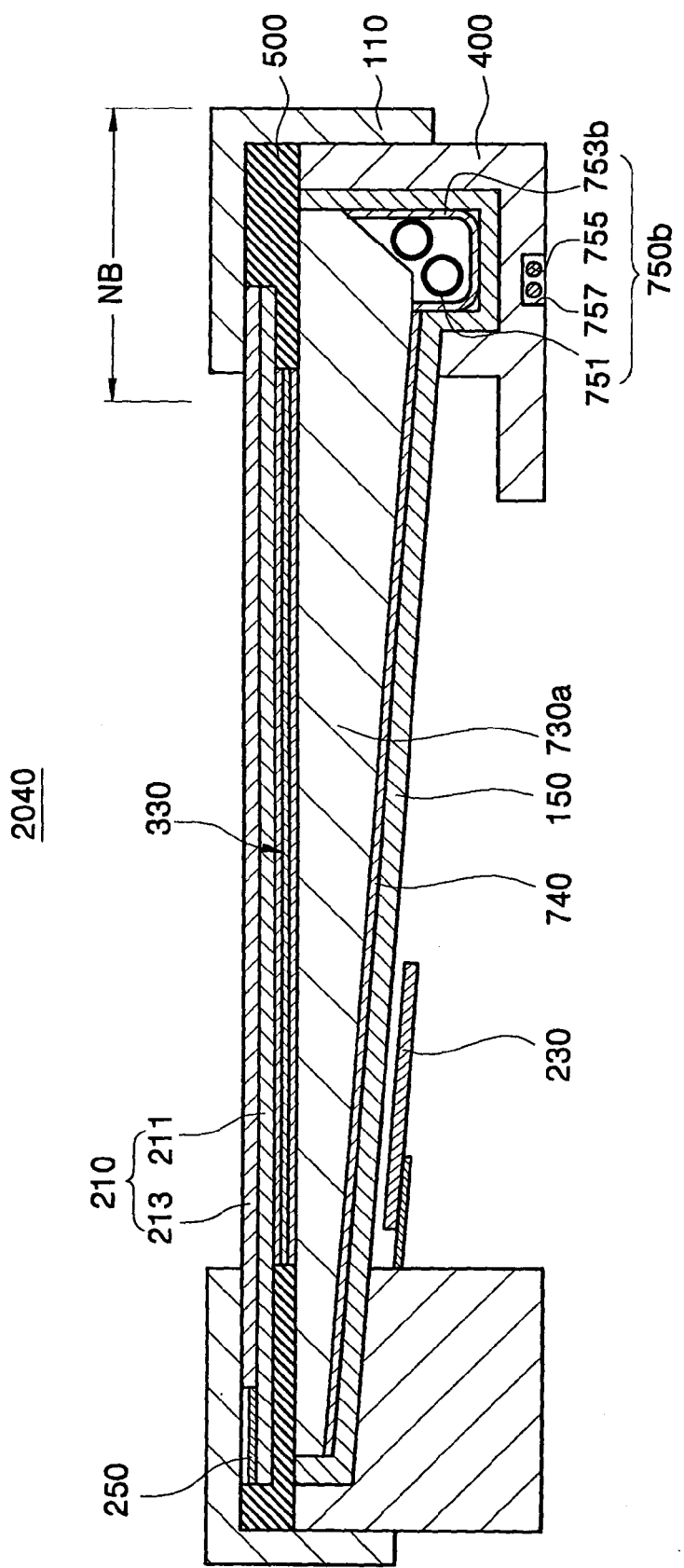
FIG. 16 is a cross-sectional view of an LCD device according to an eighth embodiment of the present invention.
Figure 17:
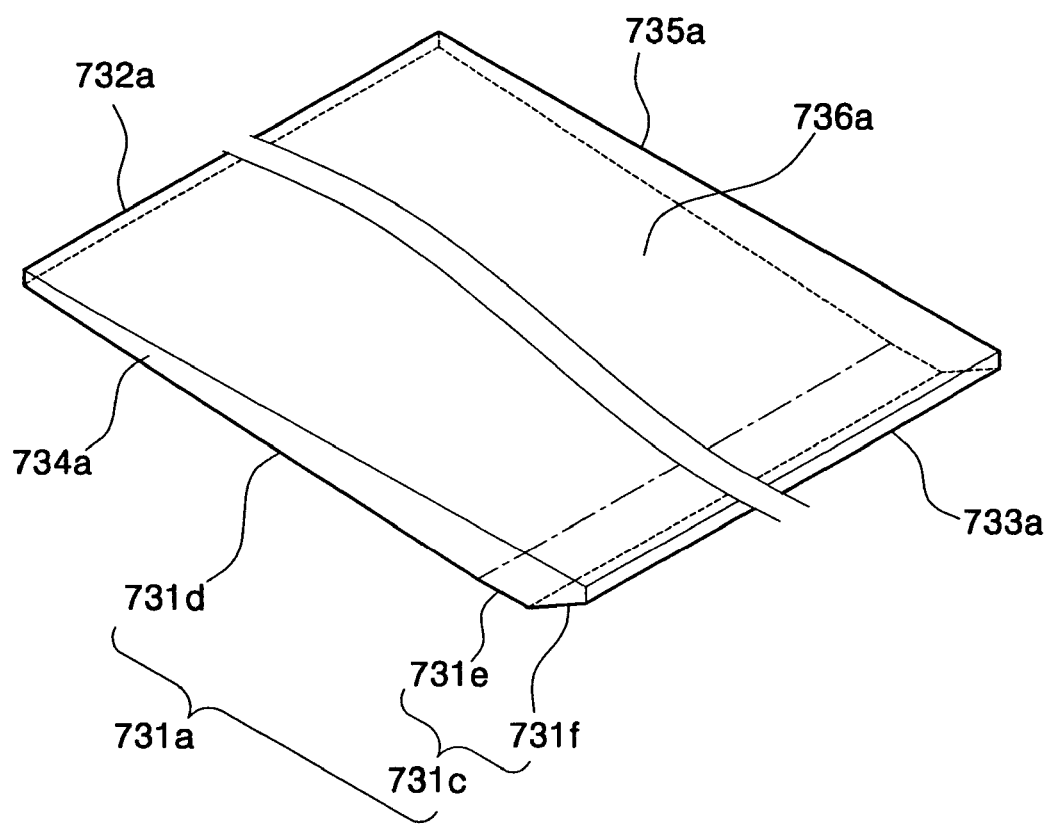
FIG. 17 is a perspective view of the light guide plate in FIG. 16.

FIG. 16 is a cross-sectional view of an LCD device according to an eighth embodiment of the present invention, and FIG. 17 is a perspective view of the light guide plate in FIG. 16. In FIG. 16, the same parts as shown in FIG. 14 are represented with like reference numerals, and their explanation will be thus omitted to avoid description duplication.

The LCD device 2040 includes the light guide plate 730a having a gradually tapered portion and a stepped edge portion. The light reflect plate 740 is disposed under the gradually tapered portion of the light guide plate 730a, and the lamp unit 750b is disposed under the stepped edge portion. The light reflect plate 740 and the lamp unit 750b are received in the bottom chassis 150, and the receiving portion of the bottom chassis 150, which receives the lamp unit 750b, is disposed in the channel of the mold frame 400.

The light guide plate 730a includes a lower surface 731a, an upper surface 736a facing the lower surface 731a, and a first edge surface 732a extended from an edge of the lower surface 731a to an edge of the upper surface 736a. The light guide plate 730a also has side surfaces 734a, 735a that are tapered such that their widths become smaller as more proximate the first edge surface. The lower surface 731a has a light incident surface 731c and a light reflect surface 731d, and the light incident surface 731c has first and second light incident surfaces 731e, 731f. The first light incident surface 731e is a plane surface extended from an edge of the light reflect surface 731d in a direction opposite to the first edge surface 732a, and the first light incident surface 731e is substantially parallel with the upper surface 736a. The second light incident surface 731f is an inclined surface extended from an edge of the first light incident surface 731e, which is opposite to the edge proximate the light reflect surface 731d, toward the upper surface 736a. The second light incident surface 731f is slant such that an obtuse angle is formed at the longitudinal edge where the first and second light incident surfaces 73e, 731f meet each other. The stepped edge portion of the light guide plate 730a also includes a second edge surface 733a extended from an edge of the second light incident surface 731f, which is opposite to the edge proximate the first light incident surface 731e, toward the upper surface 736a. The second edge surface 733a is substantially parallel with the first edge surface 732a.

In this embodiment, the two lamps of the lamp unit are disposed under the first and second light incident surfaces 731e, 731f, respectively, as shown in FIG. 16. The lamp reflector 753b of the lamp unit 750b is combined on the stepped edge portion such that the opposing sides of the lamp reflector 753b are in contact with the longitudinal edges of the light incident surface 731c. In particular, one of opposing sides of the lamp reflector 753b is in contact with a longitudinal edge of the first light incident surface 731e, which is proximate the light reflect surface 731d, and the other of the opposing sides of the lamp reflector 753b is in contact with a longitudinal edge of the second light incident surface 731f, which is proximate the second edge surface 733a.

Thus, the light provided from the lamp unit 750b is incident on the light incident surface 731c and travels in the light guide plate 730a. The light is reflected on the light reflect surface 731d and then exits the upper surface 736a of the light guide plate 730a.

Figure 18:
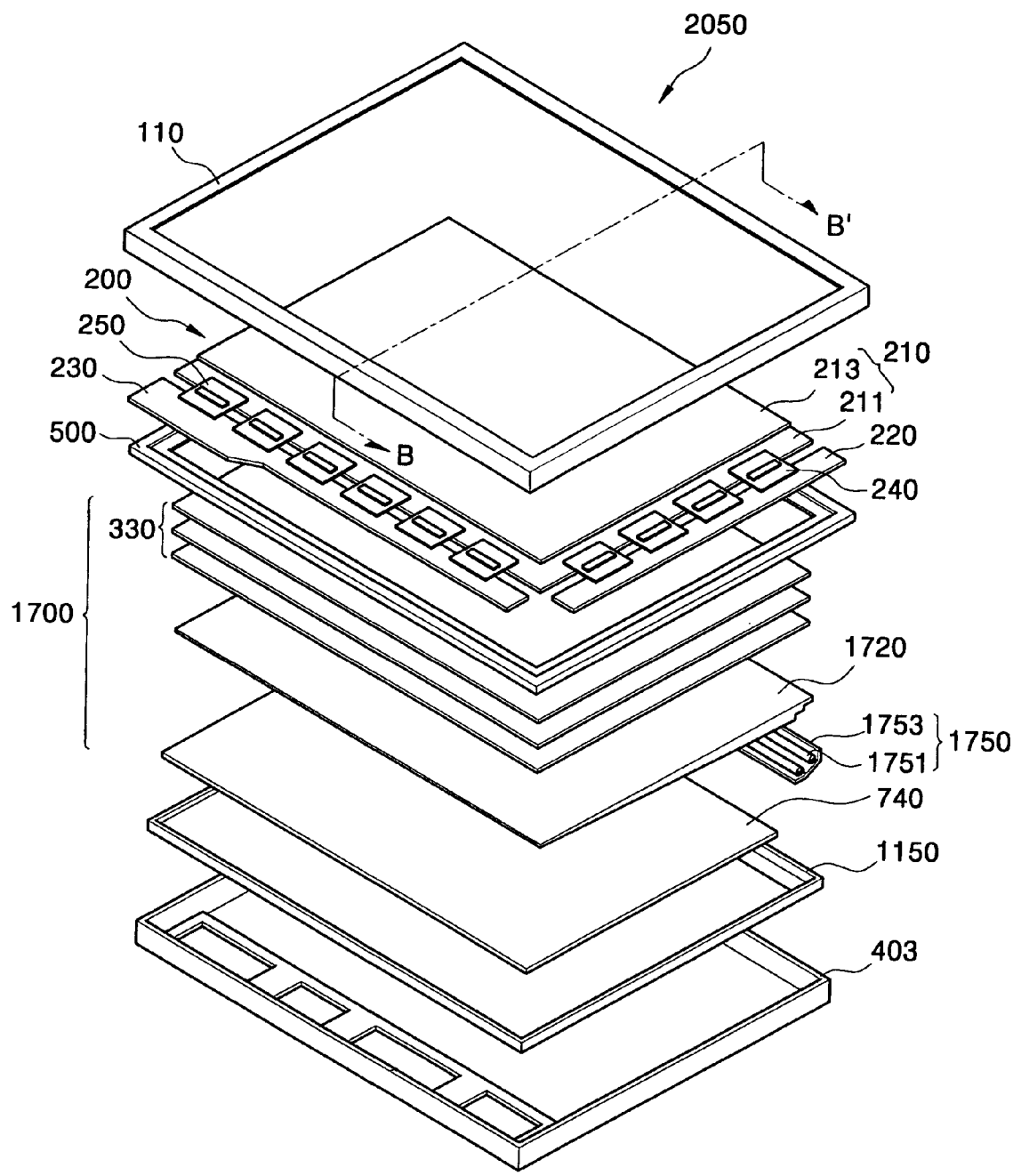
FIG. 18 is an exploded perspective view of an LCD device according to a ninth embodiment of the present invention.
Figure 19:
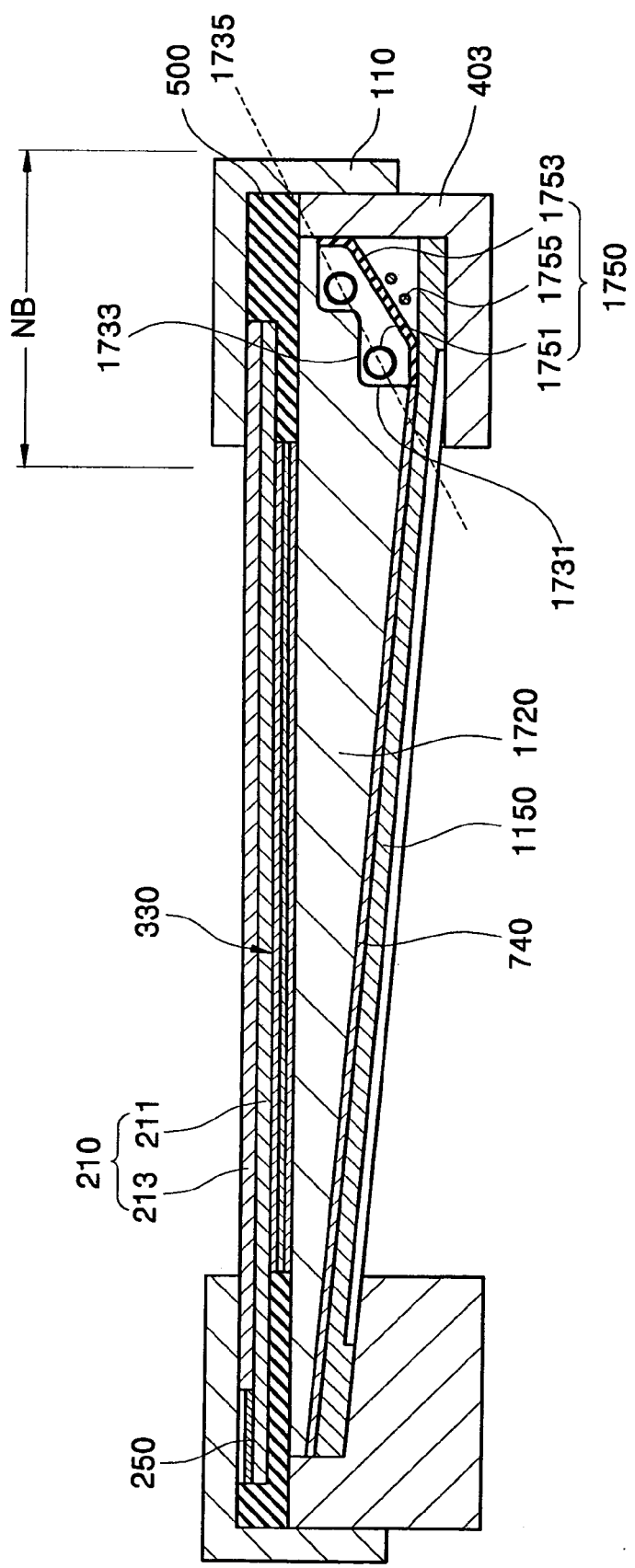
FIG. 19 is a cross-sectional view of the LCD device taken along line B–B' in FIG. 18.
Figure 20:
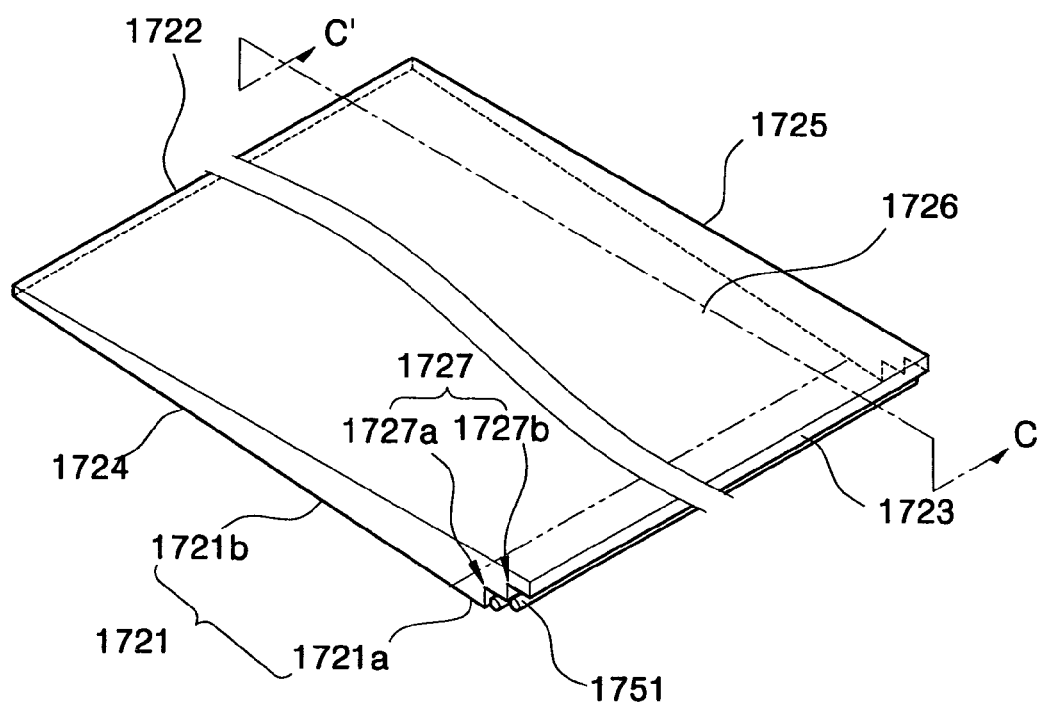
FIG. 20 is a perspective view of the light guide plate in FIG. 18.

FIG. 18 is an exploded perspective view of an LCD device according to a ninth embodiment of the present invention, FIG. 19 is a cross-sectional view of the LCD device taken along line B–B' in FIG. 18, and FIG. 20 is a perspective view of the light guide plate in FIGS. 18 and 19. In FIGS. 18 and 19, the same parts as those shown in FIGS. 1 and 2 are represented with like reference numerals and their explanation will be omitted to avoid description duplication.

Referring to FIGS. 18–20, the LCD device 2050 includes a backlight assembly 1700 having a light guide plate 1720 with a stepped edge portion at the ineffective display region NB. The backlight assembly 1700 also includes a lamp unit 1750 combined on the stepped edge portion of the light guide plate 1720. The lamp unit 1750 has lamps 1751 and a lamp reflector 1753 for receiving the lamps 1751 and reflecting light from the lamps 1751. The lamp reflector 1753 is combined on the stepped edge portion such that the opposing sides of the lamp reflector 1753 are respectively in contact with the longitudinal edges of the stepped edge portion. In particular, one of the opposing sides of the lamp reflector 1753 is in contact with corresponding one of the longitudinal edges of the stepped edge portion, and the other of the opposing sides of the lamp reflector 1753 is in offset contact with the other of the longitudinal edges of the stepped edge portion. In other words, under the light guide plate 1720, disposed is the light reflect plate 740 of which one edge is in contact with the end of the other opposing side of the lamp reflector 1753 and forms a plane surface with the other longitudinal edge of the stepped edge portion, as shown in FIG. 19.

The light guide plate 1720 has a lower surface 1721, an upper surface 1726 facing the lower surface 1721, first and second side surfaces 1724, 1725, and a first edge surface 1722 having edges connected to the lower, upper and side surfaces 1721, 1726, 1724, 1725. The lower surface 1721 includes a light incident surface 1721a and a light reflect surface 1721b. The light incident surface 1721a is formed between the light reflect surface 1721b and the upper surface 1726 in the shape of steps at the stepped edge portion. A second edge surface 1723 may be further formed between the light incident surface 1721a and the upper surface 1726. The second edge surface 1723 is substantially parallel with the first edge surface 1722.

In this embodiment, the stepped edge portion has two step portions 1727 at the light incident surface 1721a. The step portions 1727 are formed concavely inward the light guide plate 1720 to receive the lamps 1751. Each of the step portions 1727 has a shoulder for receiving at least one lamp, and the shoulder is, for example, rounded to avoid light accumulation thereabout. Although the light guide plate 1720 has two step portions 1727 each receiving one lamp in this embodiment, it should be noted that the light guide plate 1720 may have more than two step portions and each of the step portions may receive two or more lamps.

The step portions 1727 each have a rise 1731 extended in a direction substantially perpendicular to the upper surface 1726 and a run 1733 extended from a longitudinal edge of the rise 1731 in a direction substantially parallel to the upper surface 1726. The rise 1731 and run 1733 form a shoulder for receiving the lamp 1751. In this embodiment, the first step portion 1727a has a first rise extended from one longitudinal edge of the light incident surface 1721a and a first run extended from a longitudinal edge of the first rise, which is opposite to the longitudinal edge connected to the light incident surface 1721a. The second step portion 1727b has a second rise extended from a longitudinal edge of the first run, which is opposite to the longitudinal edge connected to the first rise, and a second run extended from a longitudinal edge of the second rise, which is opposite to the longitudinal edge connected to the first run. For example, the first and second rises each have a width smaller than that of the first and second runs, respectively.

The light incident surface 1721a is slant such that the step portions 1727 have a slope with respect to the lower and upper surfaces 1721, 1726. When the lamps are received in the step portions 1727 and secured by the lamp reflector 1753, the slope of the step portions 1727 may be defined by a slope line 1735 connecting the longitudinal axes of the respective lamps 1751 received in the step portions 1727. In this embodiment, the slop line 1735 has an obtuse angle with respect to the light reflect surface 1721b and an acute angle with respect to the upper surface 1726. Since the lamps 1751 are securely received in the step portions 1727 by the lamp reflector 1753, the lamp reflector 1753 is slant at the substantially same slope as that of the step portions 1727.

Figure 21:
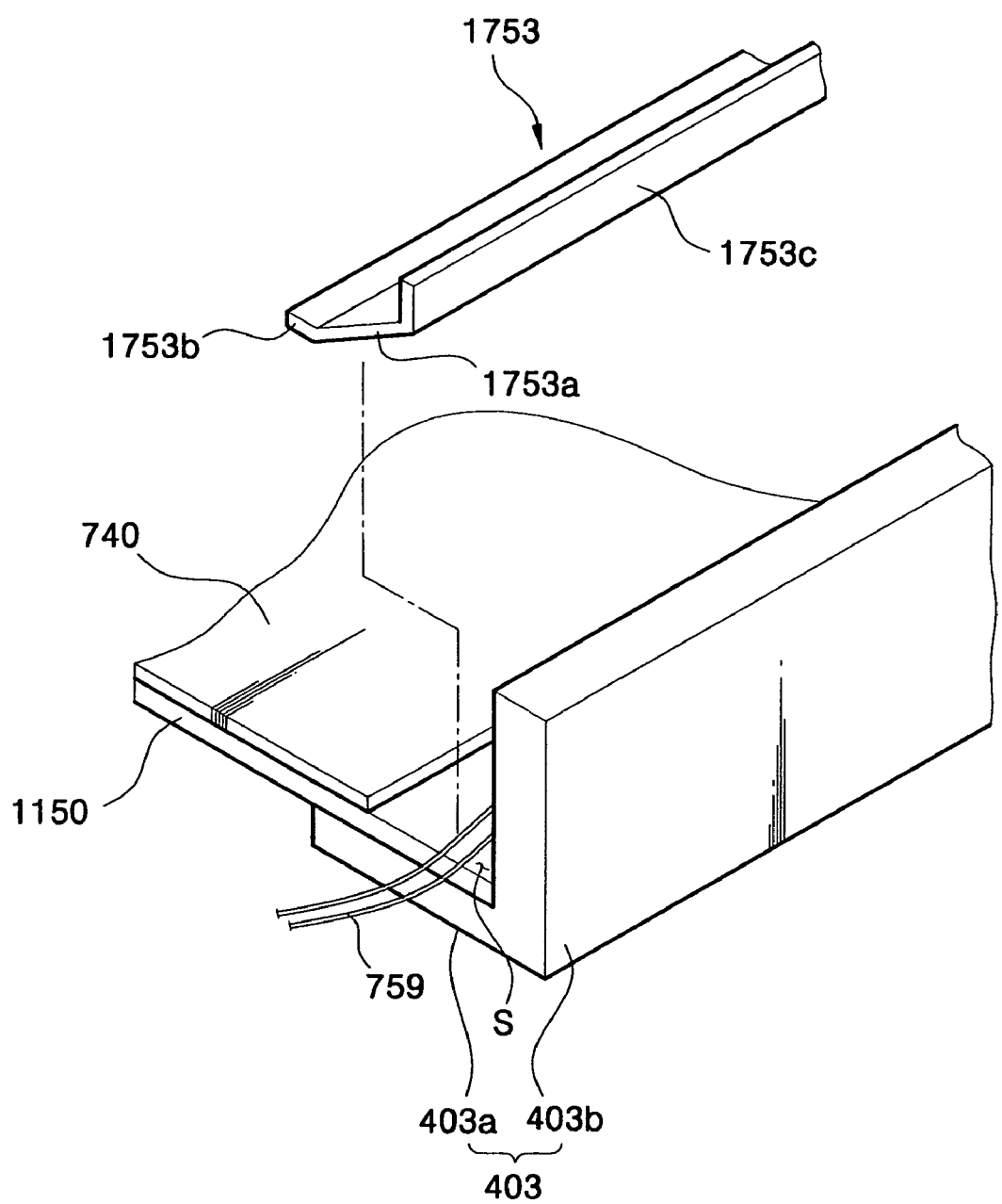
FIG. 21 is an exploded perspective view illustrating the lamp reflector and the mold frame in FIG. 18.

FIG. 21 is an exploded perspective view illustrating the lamp reflector 1753 and a mold frame 403 in FIG. 19. The light reflect plate 740 and the lamp reflector 1753 are disposed on a bottom chassis 1150, and the mold frame 403 receives the lamp reflector 1753 and a marginal portion of the bottom chassis 1150. The lamp reflector 1753 has a bottom 1753a slanting at a slope substantially same as the slope line 1735 of the step portion 1727. The bottom 1753a and the opposing sides 1753b, 1753c have interior surface appropriate for reflecting light from the lamps. The first opposing side 1753b is extended from one longitudinal edge of the bottom 1753a in a direction substantially parallel with the upper surface 1726 of the light guide plate 1720 to the extent of being in contact with the bottom chassis 1150. The second opposing side 1753c is extended from the other longitudinal edge of the bottom 1753a in a direction substantially perpendicular to the upper surface 1726 to the extent of being in contact with the second edge surface 1723 of the light guide plate 1720.

The mold frame 403 has a bottom 430a receiving the marginal portion of the bottom chassis 1150 on which the lamp reflector 1753 is disposed, and a side wall 403b extended from a longitudinal edge of the bottom in a direction substantially perpendicular to the bottom to the extent of being in contact with the middle chassis 500. Since the lamp reflector 1753 is slant with respect to the bottom 403*a* and the side wall 403*b* of the mold frame 403, a space S is formed under the bottom 1753*a* of the lamp reflector 1753 for an electrical line 759 connected to the lamp unit. The electrical line 759 is drawn out through the space formed in the longitudinal direction between the bottom 1753*a* of the lamp reflector 1753, the marginal portion of the bottom chassis 1150, and the side wall 4036 of the mold frame 403. It is advantageous in this embodiment of the present invention that no additional space is required for the electrical line to be drawn out because it is disposed in the space S that would otherwise have no use. Thus, such configuration of backlight assembly further reduces the size (including thickness) of the LCD of the present invention.

Figure 22:
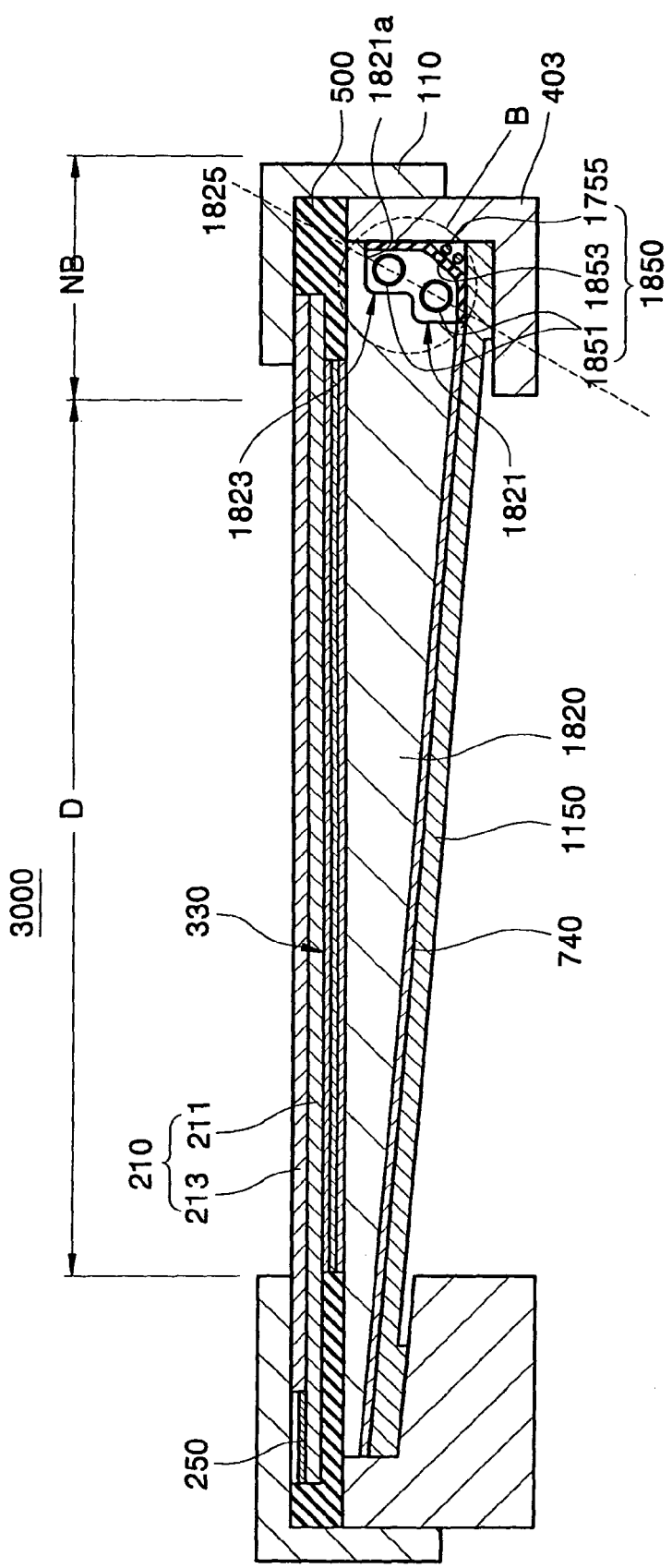
FIG. 22 is a cross-sectional view of an LCD device according to a tenth embodiment of the present invention.

FIG. 22 is a cross-sectional view showing an LCD device according to a tenth embodiment of the present invention. In FIG. 22, the same parts as those shown in FIG. 19 are represented with like reference numerals and their explanation will be omitted to avoid description duplication. The LCD device 3000 may be divided into the effective display region D on which images are displayed and the ineffective display region NB on which no image is displayed. In this embodiment, the LCD device includes a light guide plate 1820 having a stepped edge portion and a lamp unit 1850 combined on the stepped edge portion, and the stepped edge portion and the lamp unit 1850 are located at the ineffective display region NB.

The stepped edge portion of the light guide plate 1820 has, for example, two step portions 1821, 1823 formed at the edge of the light guide plate 1820. The two step portions 1821, 1823 each receive, for example, a lamp 1851 of the lamp unit 1850. A lamp reflector 1853 is provided to receive the lamps 1851 and to be combined on the stepped edge portion. The lamp unit 1850 includes a lamp reflector 1853 having a bottom and opposing sides to be combined on the longitudinal edges of the light incident surface. The opposing sides of the lamp reflector 1853 are extended from the bottom of the lamp reflector 1853 in opposite directions, respectively, such that the first opposing side is substantially parallel with the upper surface of the light guide plate 1820 and the second opposing side is substantially perpendicular to the upper surface of the light guide plate 1820. The end portion of the first opposing side of the lamp reflector 1853 is in contact with an end of the light reflect plate 740 and in offset contact with a longitudinal edge of the light incident surface of the light guide plate 1820, as shown in FIG. 22. Also, the end portion of the second opposing side of the lamp reflector 1853 is in contact with the other longitudinal edge of the light incident surface of the light guide plate 1820.

The first and second step portions 1821, 1823 have a slope such that a slope line 1825 connecting the longitudinal axes of the lamps 1851 has an obtuse angle with respect to the light reflect surface of the light guide plate 1820 and an acute angle with respect to the upper surface of the light guide plate 1820. The lamp reflector 1853 also has a bottom that is slant at the substantially same slope as that of the step portions 1821, 1823, so that a space is formed under the bottom of the lamp reflector 1853. The exterior sides of the opposing sides of the lamp reflector 1853 are in contact with the bottom chassis 1150 and the side wall of the mold frame 403, respectively, which meet each other and are substantially perpendicular to each other. Thus, such configuration of the LCD device 3000 provides the space between the bottom of the lamp reflector 1853, the bottom chassis 1150 and the side wall of the mold frame 403, and the electrical line 1755 is drawn out through the space.

Figure 23:
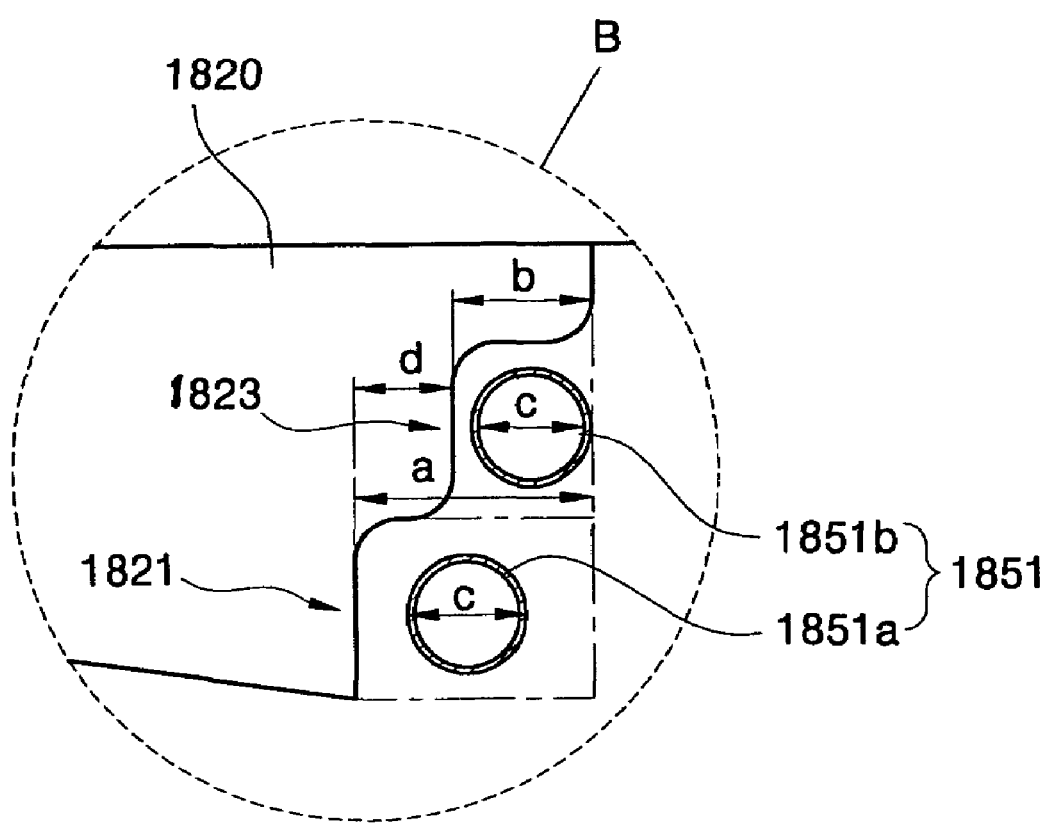
FIG. 23 is an enlarged view of portion B in FIG. 22.

FIG. 23 is an enlarged view of portion "B" in FIG. 22. As shown in FIG. 23, the first and second step portions 1821, 1823 each have a rise extended in a direction substantially perpendicular to the upper surface of the light guide plate 1820 and a run extended in a direction substantially parallel with the upper surface of the light guide plate 1820. The first step portion 1821 has a first rise extended from the longitudinal edge of the light incident surface of the light guide plate 1820 and a first run extended from a longitudinal edge of the first rise, which is opposite to the longitudinal edge connected to the edge of the light incident surface. The second step portion 1823 has a second rise extended from a longitudinal edge of the first run, which is opposite to the edge connected to the first rise of the first step portion 1821, and a second run extended from the other longitudinal edge of the second rise to the other longitudinal edge of the light incident surface. The first and second step portions 1821, 1823 receive the first and second lamps 1851*a*, 1851*b*, respectively, of the lamp unit 1850. Also the first and second step portions 1821, 1823 each have a shoulder at which its rise and run meet to each other. The shoulder may have, for example, a round shape to avoid light accumulation thereabout. Also, the light incident surface of the stepped edge portion may be embossed to further improve the uniformity of the luminance distribution of the light incident on the light guide plate 1820.

Assuming that the first step portion 1821 has first depth "a", the length from the first rise to the end of the light guide plate 1820, and the second step portion 1823 has second depth "b", the length from the second rise to the end of the light guide plate 1820, the first depth "a" is larger than the second depth "b" by the difference "d" between the first and second depths. In this embodiment, the first and second lamps 1851 each have diameter "c" that is larger than the difference "d". Thus, in the top or bottom view of the LCD device, the first and second lamps 1851 overlap with each other. As a result, the LCD device 3000 has the ineffective display region NB that is further narrowed or a narrower bezel.

Figure 24:
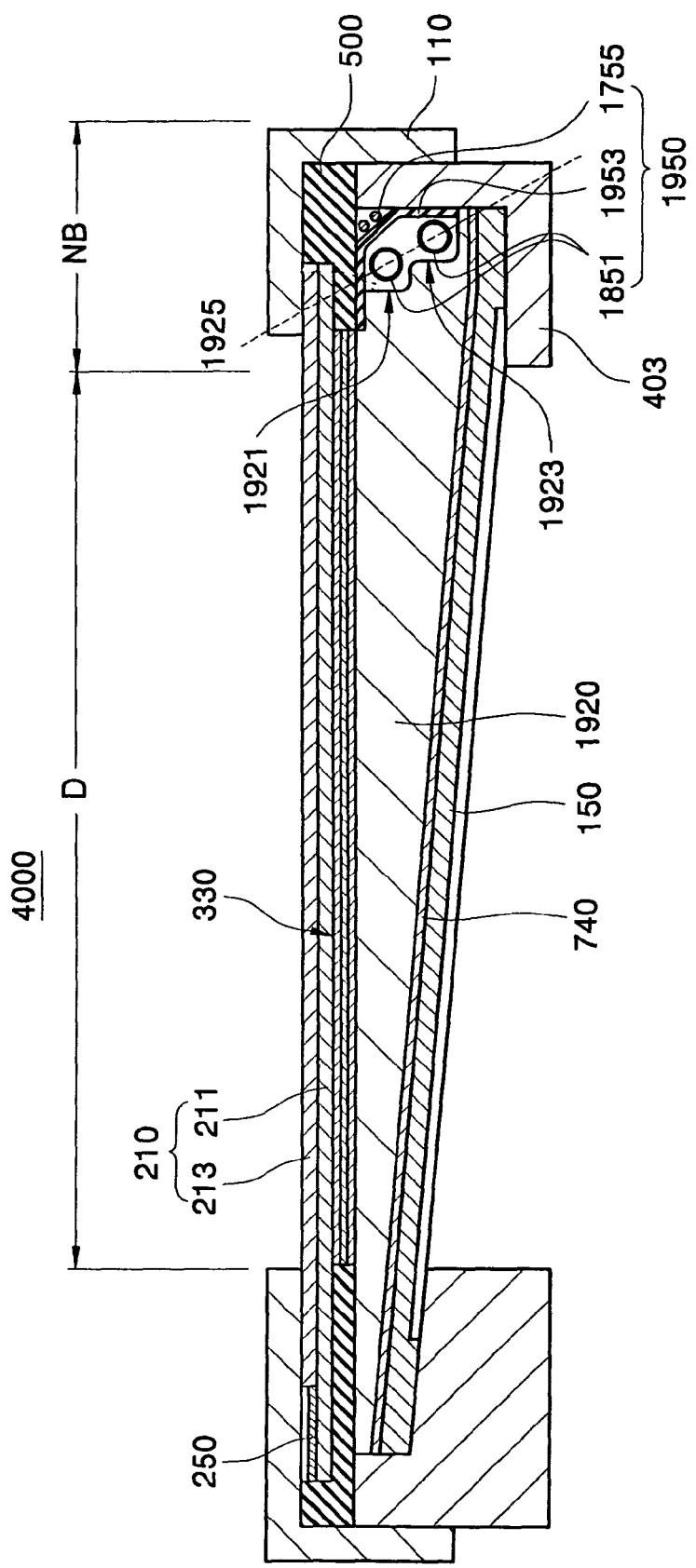
FIG. 24 is a cross-sectional view of an LCD device according to an eleventh embodiment of the present invention.

FIG. 24 is a cross-sectional view of an LCD device according to an eleventh embodiment of the present invention. Parts equivalent to those in FIG. 22 are represented with like reference numerals and a description thereof is omitted to avoid duplication. The LCD device 4000 includes a light guide plate 1920 having a stepped edge portion at its marginal area and a lamp unit 1950 combined on the stepped edge portion. The stepped edge portion has first and second step portions 1921, 1923 adjacent to each other for receiving first and second lamps 1851, respectively, of the lamp unit 1950. In this embodiment, the step portions 1921, 1923 are concavely formed at the upper area of the light guide plate 1920 corresponding to the ineffective display region NB of the LCD device 4000. The first step portion 1921 is extended from the upper surface of the light guide plate 1920, and the second step portion 1923 is extended from the first step portion downward, i.e., toward the lower surface of the light guide plate 1920.

In particular, the first step portion 1921 has a rise extended from a longitudinal edge of the upper surface of the light guide plate 1920 in a direction substantially perpendicular to the upper surface, a first run extended from a longitudinal edge of the first rise, which is opposite to the edge connected to the upper surface, in a direction substantially parallel with the upper surface of the light guide plate 1920. The second step portion 1923 has a second rise extended from a longitudinal edge of the first run, which is opposite to the edge connected to the first rise, in a direction substantially parallel with the first rise, and a second run extended from a longitudinal edge of the second rise, which is opposite to the edge connected to the first run, in a direction substantially parallel with the first run. The rises and runs of the first and second step portions 1921, 1923 constitute the light incident surface of the light guide plate 1920. The first step portion 1921 has a first shoulder at which the first rise and the first run meet each other, and the second step portion 1923 has a second shoulder at which the second rise and the second run meet each other. The first and second shoulders each may have a round shape to avoid light accumulation thereabout. The first and second step portions 1921, 1923 have a slope such that a slope line 1925 connecting the longitudinal axes of the first and second lamps 1851 received in the first and second shoulders, respectively, has an obtuse angle with respect to the upper surface of the light guide plate 1920 and an acute angle with respect to the lower surface of the light guide plate 1920. Also, the light incident surface of the light guide plate 1920 may be embossed to further improve the uniformity of luminance distribution of the light provided by the light guide plate 1920.

The lamp reflector 1953 is combined on the light incident surface to secure the lamps in the step portions 1921, 1923 of the light guide plate 1920. The lamp reflector 1953 has a bottom and first and second opposing sides extended from the bottom in the opposite directions, respectively. The first opposing side of the lamp reflector is extended from the bottom in a direction substantially parallel with the upper surface of the light guide plate 1920 to be in contact with one of the longitudinal edges of the light incident surface, and the second opposing side of the lamp reflector is extended from the bottom in a direction substantially perpendicular to the upper surface to be in contact with the other of the longitudinal edges of the light incident surface. The exterior surface of the first opposing side of the lamp reflector 1953 is in contact with the middle chassis 500, and the exterior surface of the second opposing side of the lamp reflector 1953 is in contact with the mold frame 403. As a result, a space is formed between the bottom of the lamp reflector 1953, the middle chassis 500 and a side wall of the mold frame 403. The electrical line 1755 connected to the lamp unit 1950 is drawn out through the space to be connected to an external power source.

Figure 25:
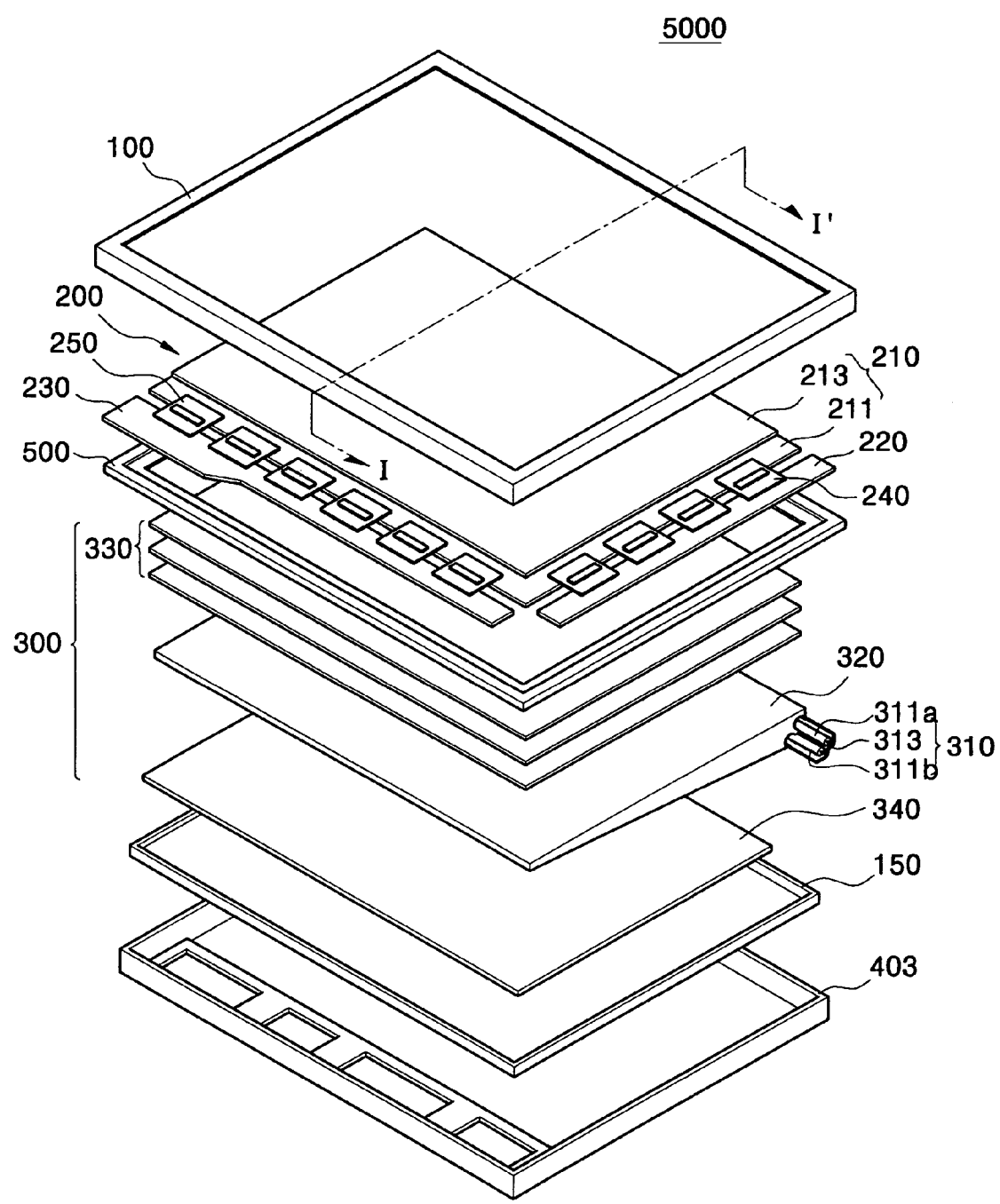
FIG. 25 is an exploded perspective view of an LCD device according to a twelfth embodiment of the present invention.
Figure 26:
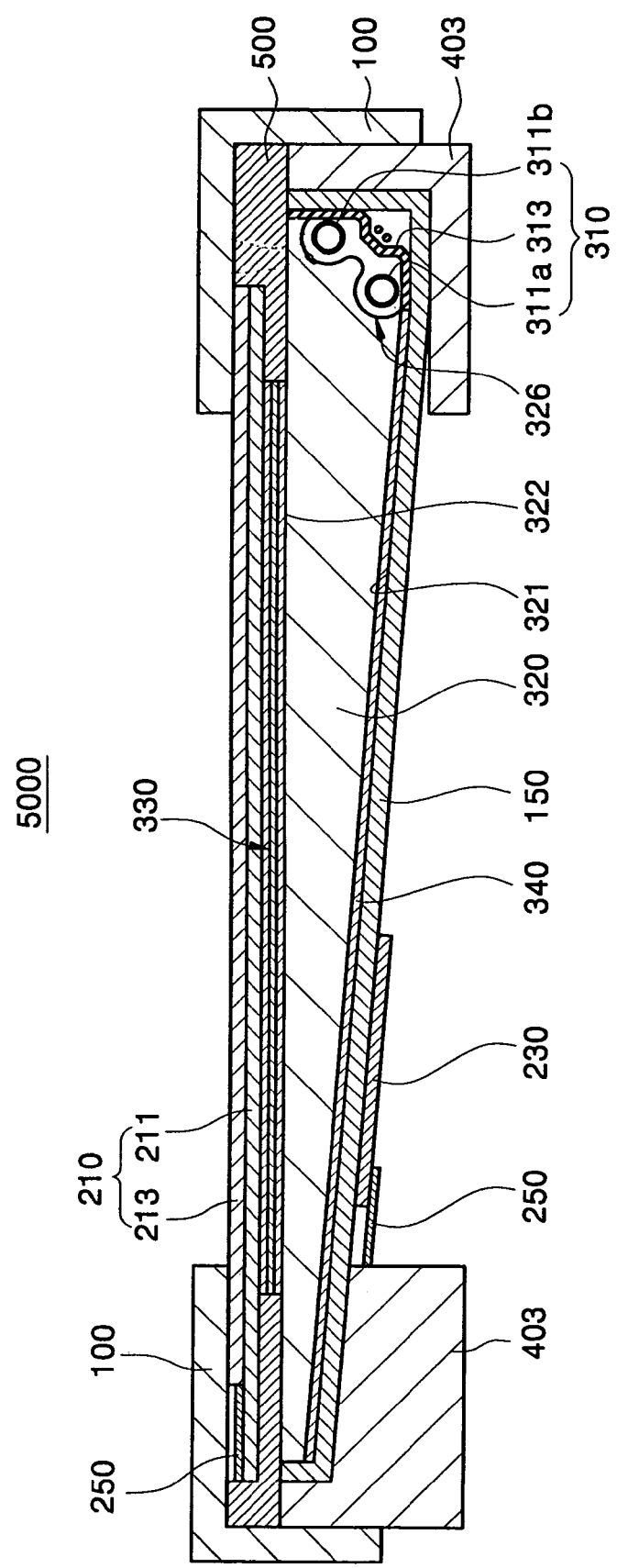
FIG. 26 is a cross-sectional view of the LCD device taken along line I–I' in FIG. 25.

FIG. 25 is an exploded perspective view of an LCD device according to a twelfth embodiment of the present invention, and FIG. 26 is a cross-sectional view of the LCD device taken along line I–I' in FIG. 25. In FIGS. 25 and 26, the parts equivalent to those in FIGS. 18 and 19 are represented with like reference numerals and a description thereof is omitted to avoid description duplication. The LCD device 5000 includes a light guide plate 320 having a stepped edge portion, a light reflect plate 340 disposed under the light guide plate 320, a lamp unit 310 combined on the stepped edge portion, a bottom chassis 150 receiving the light guide plate 320 and the lamp unit 310, a mold frame 403 for receiving the bottom chassis 150, and a top chassis 100 to be combined with the mold frame 403 to secure the components of the LCD device 5000 therebetween.

Figure 27:
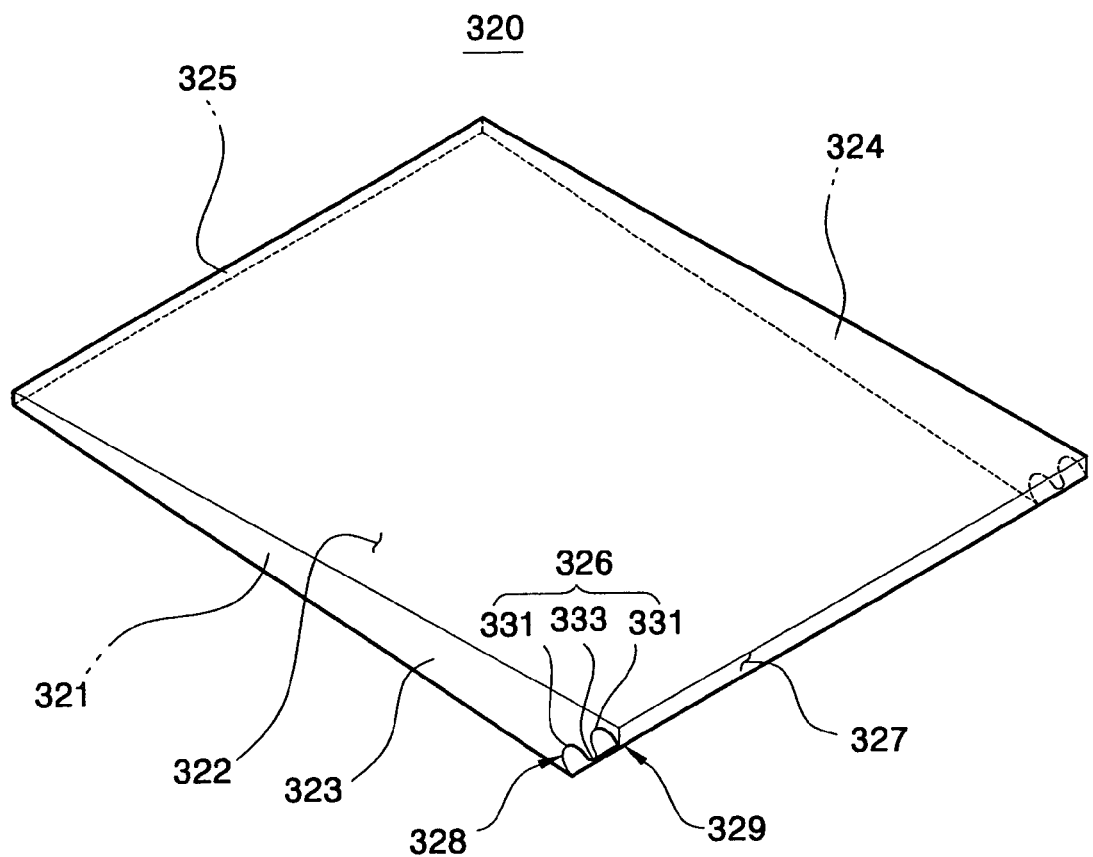
FIG. 27 is a perspective view of the light guide plate in FIG. 25.

FIG. 27 is a perspective view of the light guide plate 320 in FIG. 26. The light guide plate 320 includes a lower surface 321 for reflecting light provided thereto, an upper surface 322 through which the light exits, first and second side surfaces 323, 324 facing each other, a first edge surface 325 connected to the lower, upper, and side surfaces 321–324, a light incident surface 326 onto which light provided from the lamp unit 310 is incident, and a second edge surface 327 connected to the upper, light incident, and side surfaces. The lower and upper surfaces 321, 322 are facing each other and substantially parallel with each other, and the first and second edge surfaces 325, 327 are facing each other and substantially parallel with each other. For example, the light guide plate 320 has a wedge shape such that the first and second side surfaces 323, 324 are tapered down from the area proximate the light incident surface 326 to the area proximate the first edge surface 325. The second edge surface 327 is connected between the upper surface 322 and the light incident surface 326 to guide the light incident on the light incident surface 326 toward the upper surface 322.

The light guide plate 320 includes the stepped edge portion having a first step portion 328 and a second step portion 329. In this embodiment, the first and second step portions 328, 329 are corrugated to each have a valley 331 in which at least one lamp is disposed. The stepped edge portion also has a peak 333 formed between the valleys 331 of the first and second step portions 328, 329. The corrugated step portions 328, 329 are formed concavely inward the light guide plate 320. In this embodiment, the step portions 328, 329 are U-shaped and their valleys 331 and the peak 333 each have a round surface, so that the rounded light incident surface 326 improves the uniformity of luminance distribution of the light exiting the light guide plate 320. However, the light guide plate of the present invention may have a different shape, such as V-shape, rectangular shape, etc.

The surfaces of the step portions 328, 329 constitute the light incident surface 326. When lamps 311a, 311b are disposed in the step portions 328, 329, the light generated from the lamps is incident on the light incident surface 326. In this embodiment, the light incident surface 326 (or the step portions) is slant such that a slope line connecting longitudinal axes of the lamps 31a, 311b received in the step portions 328, 329 forms an obtuse angle with respect to the lower surface 321 and an acute angle with respect to the upper surface 322.

Figure 28:
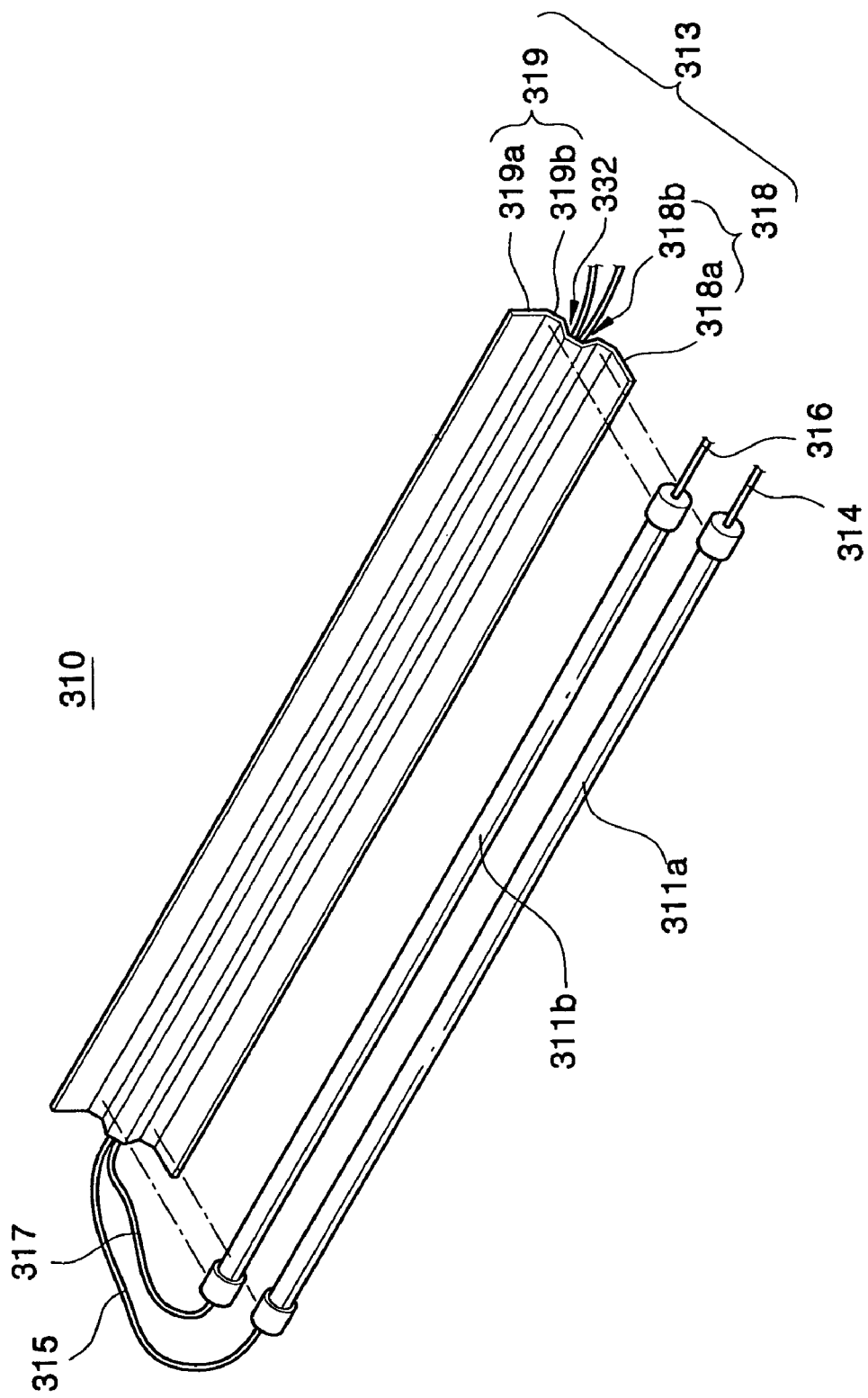
FIG. 28 is an exploded perspective view of the lamp unit in FIG. 25.

FIG. 28 is a perspective view of the lamp unit 310 in FIG. 26. Referring to FIGS. 26 and 28, the lamp unit 310 includes the lamp reflector 313 having a first reflect portion 318 and a second reflect portion 319, and the first and second lamps 3111a, 3111b received in the first and second reflect portions 318, 319, respectively. The lamp reflector 313 is corrugated such that the first and second reflect portions 318, 319 are formed corresponding to the first and second step portions 328, 329, respectively, of the light guide plate 320, and that the first reflect and step portions 318, 328 and the second reflect and step portions 319, 329 each form a space for securely receiving a lamp therein.

The lamp reflector 313 also has a flat peak 332 formed between the first and second reflect portions 318, 319. In this embodiment, the first and second reflect portions 318, 319 each form a valley for receiving corresponding one of the lamps 311a, 3111b, and the flat peak 332 is formed between the first and second reflect portions 318, 319 such that a channel space is formed under the flat peak 332 in the longitudinal direction of the lamp reflector 313. Although the valley of the respective reflect portions 318, 319 is formed with angled surfaces in this embodiment, the lamp reflector 313 of the present invention may have reflect portions formed with rounded valleys.

As shown in FIG. 28, the first reflect portion 318 has first opposing sides 318a and a first bottom 318b connected between the first opposing sides 318a, and the second reflect portion 319 has second opposing sides 319a and a second bottom 319b connected between the second opposing sides 319a. The first opposing sides 318a are extended from the longitudinal edges, respectively, of the first bottom 319b in the opposite directions, respectively. The second opposing sides 319a are extended from the longitudinal edges, respectively, of the second bottom 319b in the opposite directions, respectively. One of the first opposing sides 318a is extended substantially parallel with the upper surface 322 to be in contact with an edge of the bottom chassis 150 and in offset contact with a longitudinal edge of the light incident surface 326, and the other of the first opposing sides 318a is extended from the first bottom 318b to be connected with a longitudinal edge of the flat peak 332. One of the second opposing sides 319a is extended substantially perpendicular to the upper surface 322 to be in contact with the other longitudinal edge of the light incident surface 326 and the bottom of the middle chassis 500 (referring to FIG. 26), and the other of the second opposing sides 319a is extended from the second bottom 319b to be connected with the other longitudinal edge of the flat peak 332.

Since the lamp reflector 313 has a corrugated shape, a channel space is formed under the flat peak 332 and between the first and second reflect portions 318, 319. Thus, the electrical lines 315, 317 are disposed in the channel space to be drawn out to an external power source. In this embodiment, the first and second electrical lines 314, 315 are respectively connected to the electrodes of the first lamp 311a, and the third and forth electrical lines 316, 317 are respectively connected to the electrodes of the second lamp 311b. By having such configuration where the electrical lines are drawn out through the channel space under the lamp reflector 313, the LCD 5000 of the present invention may have a slimmer size.

Referring to FIGS. 27 and 28, the two step portions 328, 329 of the stepped edge portion are slant with respect to the lower or upper surface 321, 322, and the lamp reflector 313 is also slant as the substantially same slope as that of the step portions 328, 329. When the two lamps 311a, 311b are respectively received in the two step portions 328, 329, the step portions 328, 329 are slant such that a slop line connecting the longitudinal axes of the lamps received in the step portions 328, 329 forms an obtuse angle (e.g., between 90° and 180°) with respect to the lower surface 321 and an acute angle (e.g., between 30° and 60°) with respect to the upper surface 322. Also, the lamp reflector 313 (in particular, the surface of the flat peak 332) has the substantially same slop line as that of the step portions 328, 329.

Figure 29:
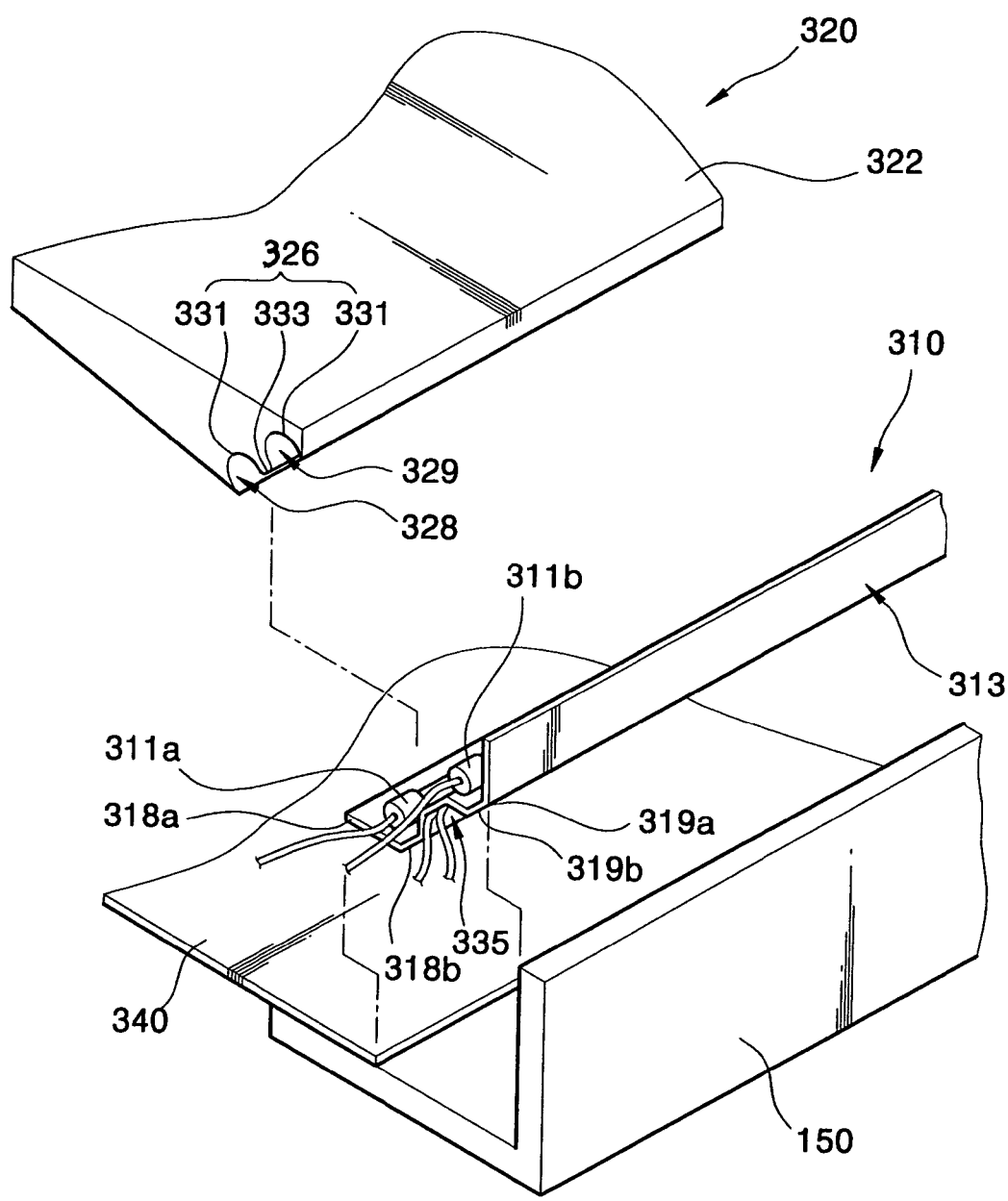
FIG. 29 is an exploded perspective view illustrating the lamp unit and the light guide plate in FIG. 25.

FIG. 29 is an exploded perspective view illustrating the structure of the lamp unit 310 and the light guide plate 320 in FIG. 26. As described above, the lamp reflector 313 is combined on the light incident surface 326 such that the first and second reflect portions 318, 319 are disposed corresponding to the first and second step portions 328, 329, respectively, so that first and second receiving spaces are formed and the first and second lamps are securely received in the first and second receiving spaces, respectively. The lamp reflector 313 is corrugated to have the channel space 335 under the flat peak 332 of the lamp reflector 313, through which the electrical lines are drawn out.

The lamp reflector 313 combined on the stepped edge of the light guide plate 320 is also combined with the light reflect plate 340 and the bottom chassis 150. The outer first opposing side 318a of the first reflect portion 318 has the end portion in contact with a longitudinal edge of the light reflect plate 340. The outer first opposing side 318a of the first reflect portion 318 is also in contact with the bottom chassis 150. The outer second opposing side 319a of the second reflect portion 319 has the end portion in contact with the bottom of the middle chassis 500. The outer second opposing side 319b of the second reflect portion 319 is also in contact with the second edge surface 327 of the light guide plate 320 and a side wall of the bottom chassis 150. By combining the lamp reflector 313 with the light guide plate 320 and the bottom chassis 150 as described above, the channel space is formed between the lamp reflector 313 and the bottom chassis 150.

Figure 30:
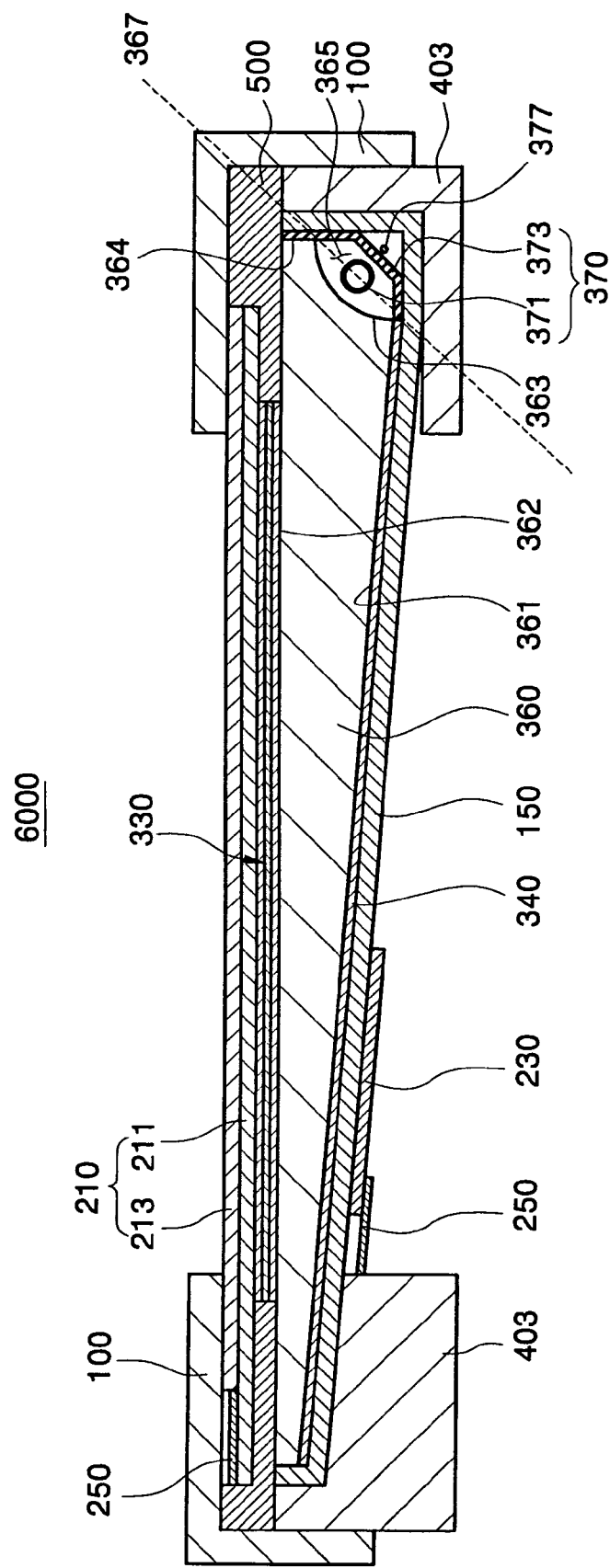
FIG. 30 is a cross-sectional view of an LCD device according to a thirteenth embodiment of the present invention.
Figure 31:
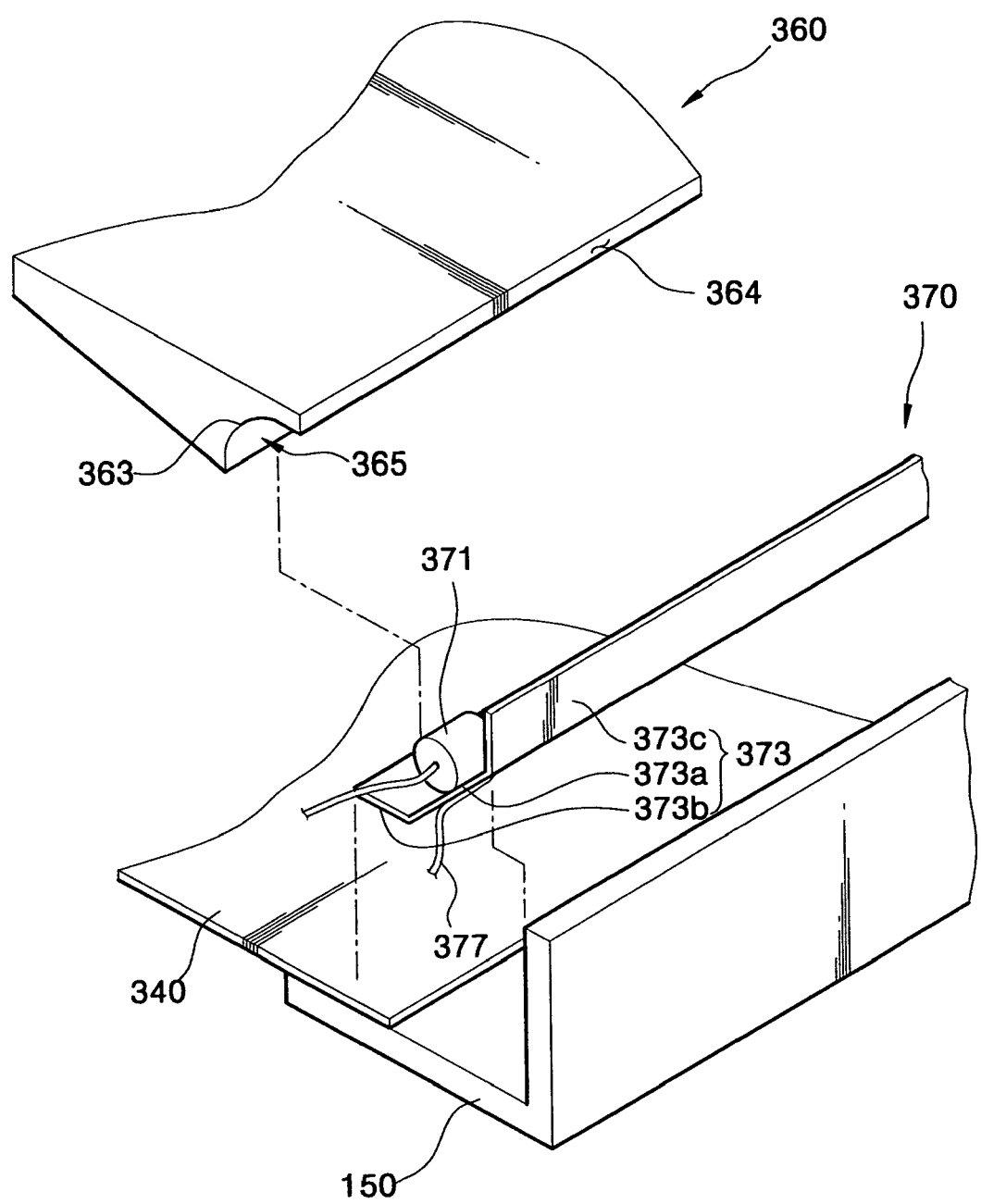
FIG. 31 is an exploded perspective view illustrating the lamp unit and the light guide plate in FIG. 30.

FIG. 30 is a cross-sectional view of an LCD device according to a thirteenth embodiment of the present invention, and FIG. 31 is an exploded perspective view illustrating the structure of the lamp unit 370 and the light guide plate 360 in FIG. 30. In FIGS. 30 and 31, the parts equivalent to those in FIG. 26 are represented with like reference numerals and a description thereof is omitted to avoid description duplication. The LCD device 6000 includes a light guide plate 360 having a lower surface 361 and an upper surface 362 that are facing each other, and a light incident surface 363 on which the light provided from a lamp unit 370 is incident.

The light guide plate 360 has at its marginal area a stepped edge portion for receiving at least one lamp 371. The stepped edge portion of this embodiment has a single step portion that is formed concavely inward the light guide plate 360 and has a rounded shoulder. Thus, the rounded surface of the step portion constitutes the light incident surface 363. In this embodiment, the light incident surface 363 is slant such that a slope line 367 connecting the longitudinal edges of the light incident surface 363 forms an obtuse angle with respect to the lower surface 361 and an acute angle with respect to the upper surface 362.

The lamp reflector 373 is combined on the stepped edge portion to form a lamp receiving space 365 in which the lamp 371 is securely received. In particular, the lamp reflector 373 has a bottom 373a, and first and second opposing sides 373b, 373c extended from the bottom 373a in the opposite directions. The first opposing side 373b is extended substantially parallel with the upper surface 362 from one longitudinal edge of the bottom 373a, and the second opposing side 373c is extended substantially perpendicular to the upper surface 362 from the other longitudinal edge of the bottom 373a. The first opposing side 373b has the end portion in contact with an edge of the light reflect plate 340 and in offset contact with one longitudinal edge of the light incident surface 363. The second opposing side 373b of the lamp reflector 373 has the end portion in contact with the bottom of the middle chassis 500, an inner surface in contact with the second edge surface 364 of the light guide plate 360, and an outer surface in contact with a side wall of the bottom chassis 150. By having such configuration, a longitudinal space is formed between the lamp reflector 373 and the bottom chassis 150. An electrical line 371 for providing power to the lamp unit 370 is drawn out through the longitudinal space to be connected to an external power source.

Figure 32:
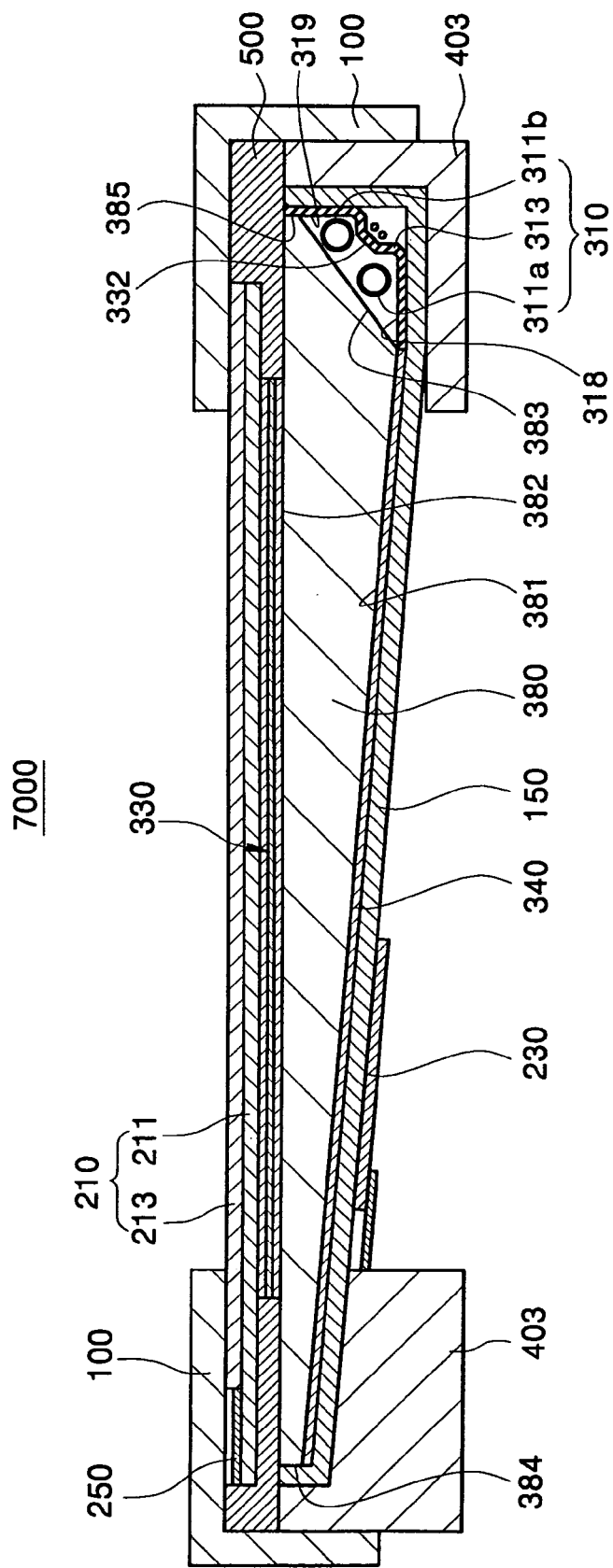
FIG. 32 is a cross-sectional view of an LCD device according to a fourteenth embodiment of the present invention.

FIG. 32 is a cross-sectional view of an LCD device according to a fourteenth embodiment of the present invention. In FIG. 32, the parts equivalent to those in FIGS. 26 and 28 are represented with like reference numerals and a description thereof is omitted to avoid description duplication. The LCD device 7000 includes a light guide plate 380 having a lower surface 381 for reflecting light provided thereto, an upper surface 382 through which the reflected light exits the light guide plate 380, and a light incident surface 383 on which the light provided from a lamp unit 310 is incident. The light guide plate 380 has a wedge shape such that both ends of the light guided plate 380 are tapered down. In other words, as shown in FIG. 32, the light guide plate 380 has a first edge surface 384 and a second edge surface 385 and is tapered down as more proximate the first and second edge surfaces 384, 385.

The light guide plate 380 has a stepped edge portion formed with the light incident surface 383, the second edge surface 385, and the marginal area of the upper surface 382. In the stepped edge portion of the light guide plate 380, the second edge surface 385 is extended from an edge of the upper surface 382 to be connected to a longitudinal edge of the light incident surface 383 in a direction substantially parallel with the first edge surface 384.

The light incident surface 383 is a flat surface slanting such that a slope line perpendicularly connecting the longitudinal edges of the light incident surface 383 has an obtuse angle with respect to the lower surface 381 and an acute angle with respect to the upper surface 382. For example, the obtuse angle between the light incident surface 383 and the lower surface 381 is between 90° and 180°, and the acute angle between the light incident surface 383 and the upper surface 382 is between 30° and 60°.

The lamp unit 310 is combined on the stepped edge portion and includes a lamp reflector 313 having opposing sides that are respectively in content with the longitudinal edges of the light incident surface 383. The lamps 311 of the lamp unit 310 are disposed on the light incident surface 383 and securely received by the lamp reflector 313. The lamp reflector 313 has a first reflect portion 318 and a second reflect portion 319 for receiving the first and second lamps 311a, 311b, respectively. The lamp reflector 313 is also slant such that a slope line connecting the longitudinal axes of the lamps 311 has an obtuse angle with respect to the lower surface 381 and an acute angle with respect to the upper surface 382. In other words, the lamp reflector 313 has a slope substantially same as that of the light incident surface 383.

The lamp reflector 313 has first and second opposing sides at the first and second reflect portions 318, 319, respectively. The first opposing side at the first reflect portion 318 has a end portion in contact with an end of the bottom chassis 150 and in offset contact with a longitudinal edge of the light incident surface 383, and the second opposing side at the second reflect portion 319 has a end portion in contact with the bottom of the middle chassis 500. In particular, the second opposing side at the second reflect portion 319 also has an inner surface in contact with the second edge surface 385 and an outer surface in contact with a side wall of the bottom chassis 150. The lamp reflector 313 also includes the flat peak 332 formed between the first and second reflect portions 318, 319. The flat peak 332 and the first and second reflect portions 318, 319 are formed with the angled surfaces such that the first and second reflect portions 318, 319 provide spaces for receiving the first and second lamps 311a, 311b, respectively, and the flat peak 332 also provides a channel space underneath for carrying the electrical line.

Figure 33:
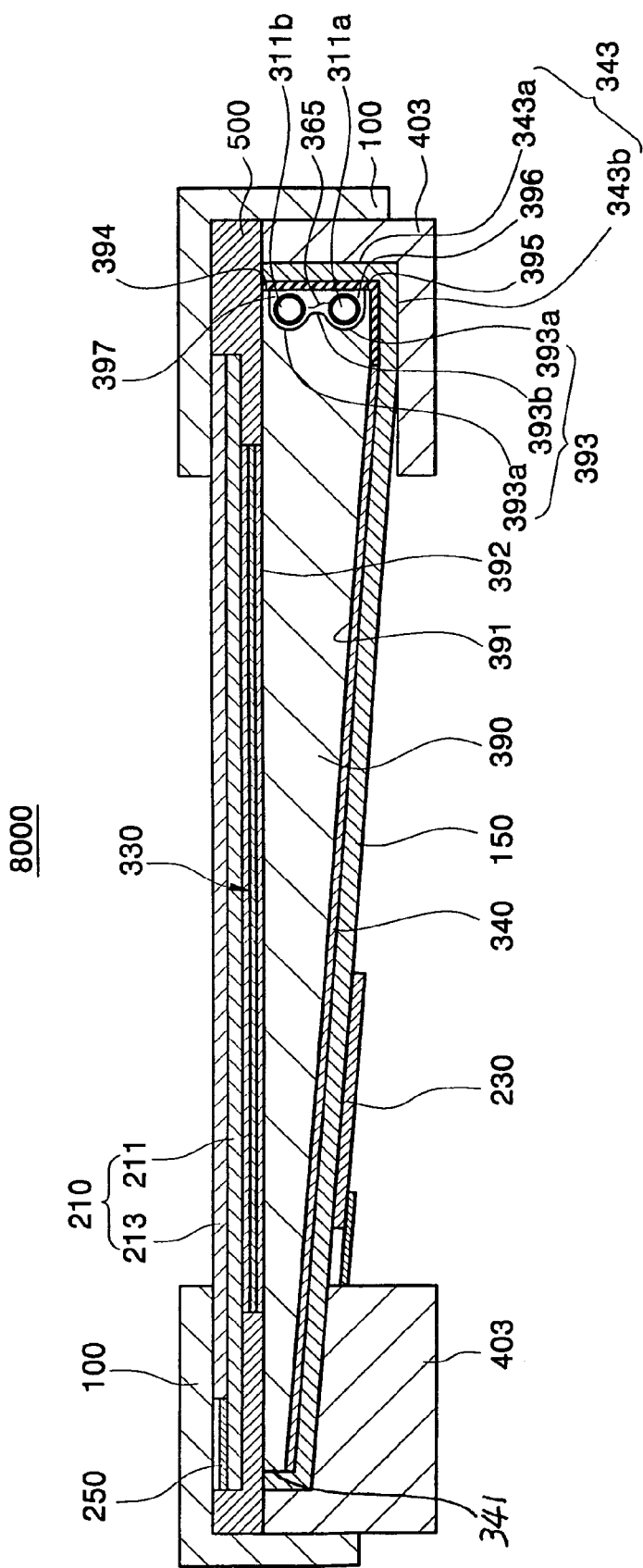
FIG. 33 is a cross-sectional view of an LCD device according to a fifteenth embodiment of the present invention.

FIG. 33 is a cross-sectional view of an LCD device according to fifteen embodiment of the present invention. In FIG. 33, the parts equivalent to those in FIG. 26 are presented with the like reference numerals and a description thereof is omitted to ovoid description duplication. The LCD device 8000 includes a light guide plate 390 having a lower and upper surfaces 391, 392 facing each other and a stepped edge portion at the ineffective display area of the LCD device. The step edge portion of the guide light plate 390 includes a light incident surface 393 on which the light provided from a lamp unit is incident. The stepped edge portion has first and second step portions 396, 397 that are corrugated to each have a round valley and receive the first and second lamps 311a, 311b, respectively. The first and second step portions 396, 397 are formed concavely inward the light guide plate and adjacent to each other. The stepped edge portion also has a peak 393b with a round surface between the first and second step portions 396, 397. The round surfaces of the valleys 393a, 393a' of the first and second step portions 396, 397 and the peak 393b therebetween constitute the light instant surface 393 of the light guide plate 390.

In this embodiment, the first and second step portions 396, 397 have a slope substantially perpendicular to the upper surface 392. In other words, when the first and second lamps 311a, 311b are received in the first and second step portions 396, 397, respectively, a line connecting the longitudinal axes of the lamps is substantially perpendicular to the upper surface 392. The light guided plate 390 also has the first edge surface 341 having the longitudinal edges respectively connected to the lower and upper surfaces 391, 392 of the light guide plate, and second and third edge surfaces 394, 395 formed at the side of the light guided plate 390 opposite to the first edge surface 341. The second edge surface 394 is extended from the longitudinal edge of the light incident surface 393 to be connected to an edge of the upper surface 392, and the third edge surface 395 is extended from the other longitudinal edge of the light incident surface 393 to be connected to the lower surface 391.

The LCD device 8000 also includes a lamp reflector 343 having first and second reflect panels 343a, 343b to be combined on the stepped edge portion of the light guide plate 390. The first reflect panel 343a is disposed between the stepped edge portion of the light guide plate 390 and the side wall of the bottom chassis 150 such that the lamps 311 are securely received between the light incident surface 393 and the first reflect panel 343a. The second reflect panel 343b is extended from a longitudinal edge of the first reflect panel 343a under the lower surface 391 in a direction substantially perpendicular to the first reflect panel 343a. The first reflect panel 343a has an inner surface that is in contact with the second and third edge surfaces 394, 395 of the guide light plate 390 and an outer surface that is in contact with the sidewall of the bottom chassis 150. In this embodiment, the first reflect panel 343a is substantially parallel with the slope line connecting longitudinal axes of the lamps 311.

Figure 34:
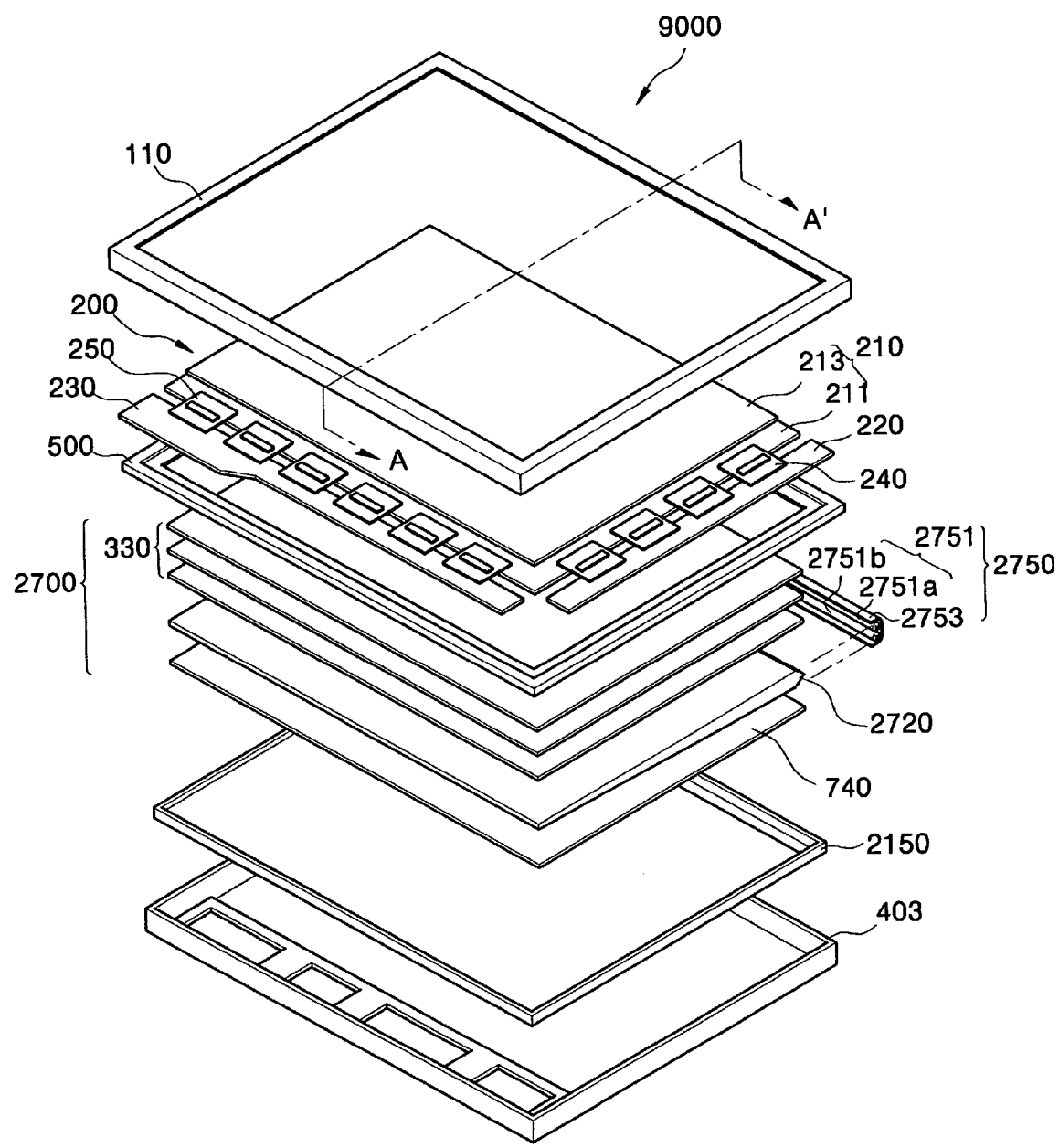
FIG. 34 is an exploded perspective view of an LCD device according to a sixteenth embodiment of the present invention.
Figure 35:
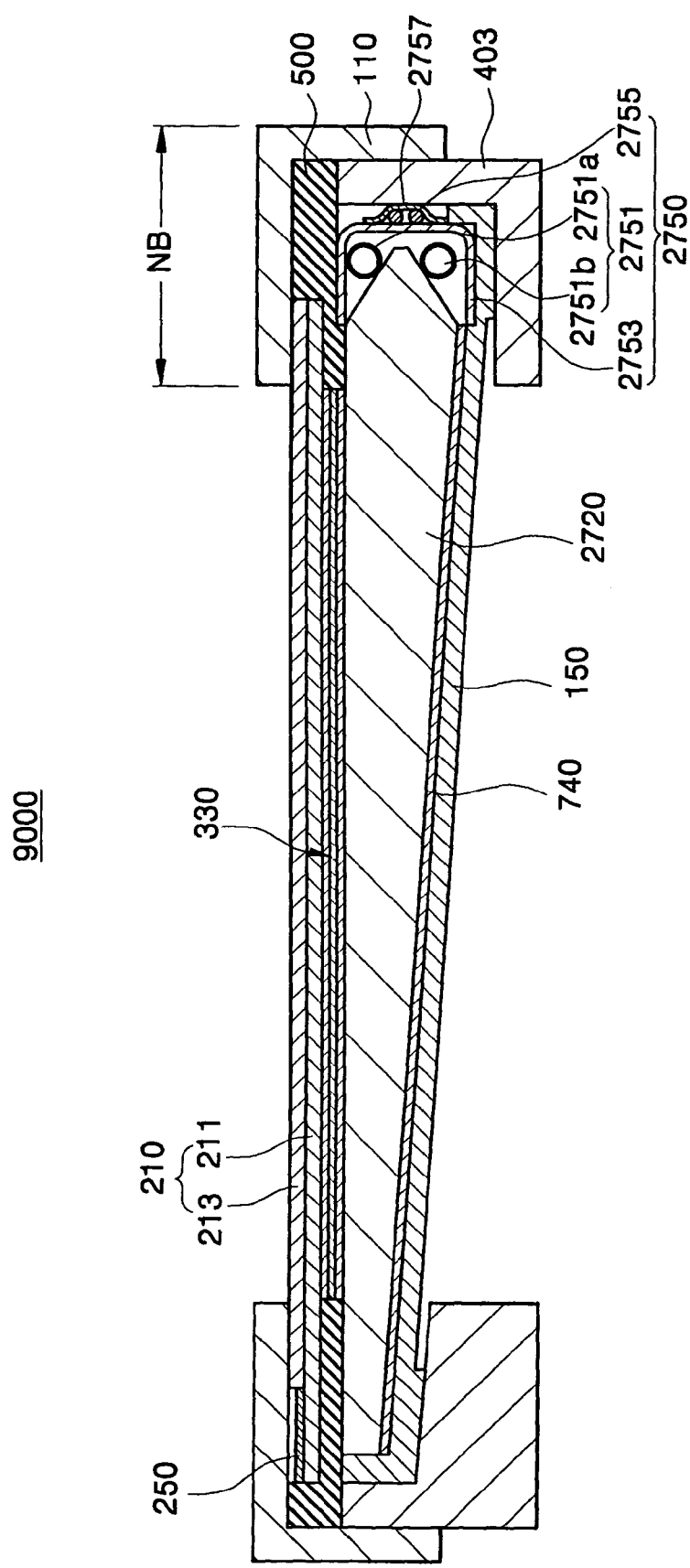
FIG. 35 is a cross-sectional view of the LCD device taken along line A–A' in FIG. 34.

FIG. 34 is an exploded perspective view of an LCD device according to a sixteenth embodiment of the present invention, and FIG. 35 is a cross-sectional view of the LCD device taken along line A–A' in FIG. 34. The LCD device 9000 includes a backlight assembly 2700 having a light guide plate 2720 with a stepped edge portion and a lamp unit 2750. The stepped edge portion of the light guide plate 2720 has a convex edge and is formed at an area corresponding to the ineffective display region NB of the LCD device 9000. The light guide plate 2720 will be described in detail below. The lamp unit 2750 combined on the stepped edge portion includes first and second lamps 2751a, 2751b disposed on the surfaces of the convex edge, and a lamp reflector 2753 combined on the stepped edge portion such that the lamps 2751 are securely received between the lamp reflector 2753 and the surfaces of the convex edge.

The LCD device 9000 also includes a channel bar 2757 disposed on the outer surface of the bottom of the lamp reflector 2753. The channel bar 2757 is formed with angled surfaces such that a channel space is formed between the bottom of the lamp reflector 2753 and the channel bar 2757. The electrical lines 2755 connected to the lamp unit 2750 are drawn out through the channel space. The channel bar 2757 is securely combined on the bottom of the lamp reflector 2753 by the mold frame 403.

Figure 36:
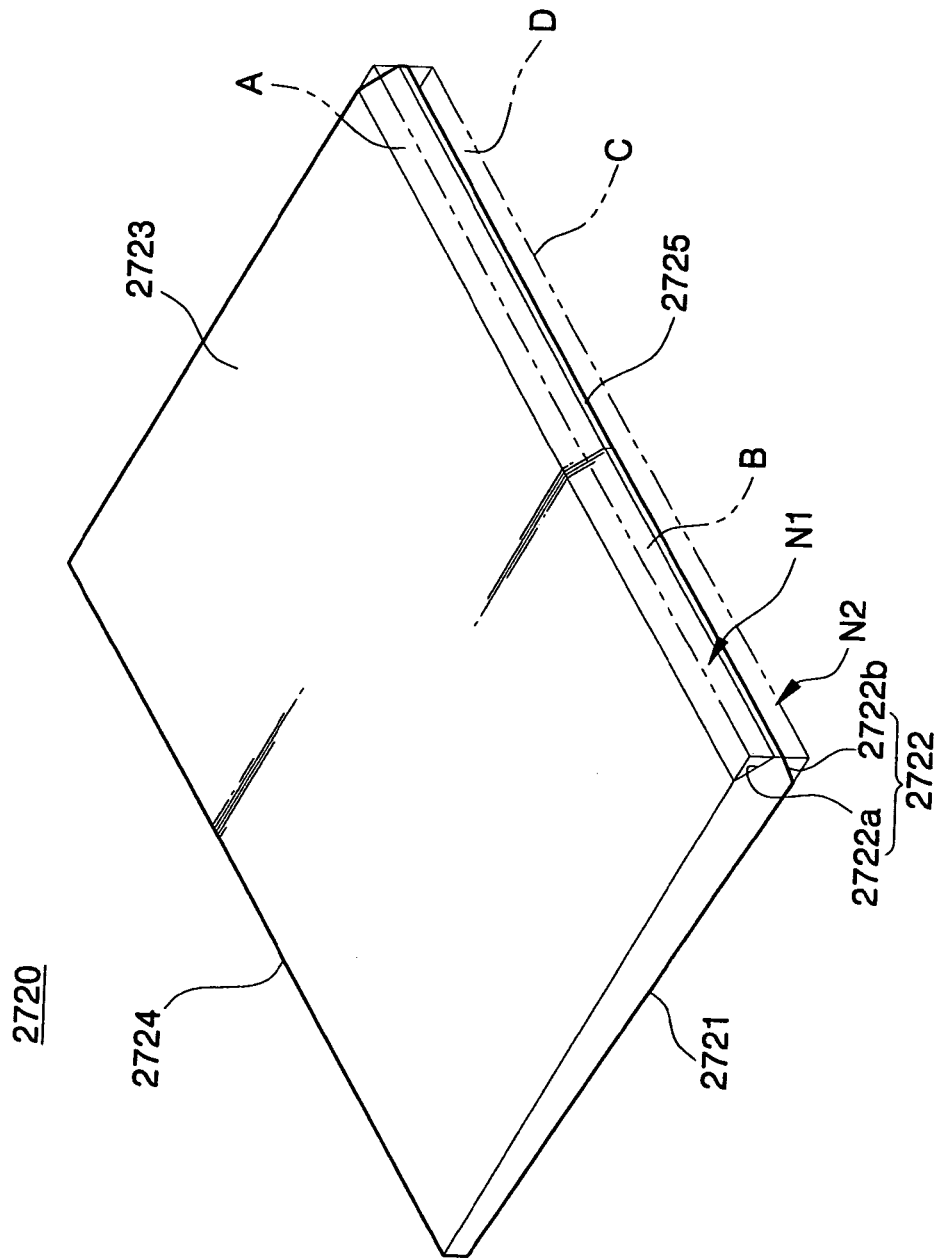
FIG. 36 is a perspective view of the light guide plate in FIG. 34.

FIG. 36 is a perspective view of the light guide plate 2720 in FIG. 34. The light guide plate 2720 includes a lower surface 2721 for reflecting light provided from the lamp unit 2750, an upper surface 2723 facing the lower surface 2721, a first edge surface 2724 with longitudinal edges connected to the lower and upper surfaces 2721, 2723, a light incident surface 2722 having two inclined surfaces 2722a, 2722b extended respectively from edges of the lower and upper surfaces 2721, 2723, and a second edge surface 2725 formed between the inclined surfaces 2722a, 2722b. The light guide plate 2720 has opposing side surfaces that are tapered down to each have a relatively smaller thickness as more proximate the first edge surface 2724. The inclined surfaces 2722a, 2722b of the light incident surface 2722 are each a flat surface slanting with respect to the lower and upper surfaces 2721, 2723 of the light guide plate 2720. The first inclined surface 2722a is slant such that a slope line perpendicularly connecting the longitudinal edges of the first inclined surface 2722a has an obtuse angle with respect to the upper surface 2723 and an acute angle with respect to the lower surface 2721, and the second inclined surface 2722b is also slant such that a slope line perpendicularly connecting the longitudinal edges of the second inclined surface 2722b has an obtuse angle with respect to the lower surface 2721 and an acute angle with respect to the upper surface 2723.

Assuming that the light guide plate 2720 has a rectangular edge at the side opposite to the first edge surface 2724 such that extended surface "A" from the upper surface 2723 and extended surface "B" from the second edge surface 2725 form a first triangular column N1 and extended surface "C" from the lower surface 2721 and extended surface "D" from the second edge surface 2725 form a second triangular column N2, the convex edge of the light guide plate 2720 is formed by removing the first and second triangular columns N1, N2 from the rectangular edge of the assumed light guide plate. By removing the first and second triangular columns N1, N2, a space is formed on each of the inclined surfaces 2722a, 2722b of the light guide plate 2720, and the lamps 2751 are respectively disposed on the inclined surfaces 2722a, 2722b of the light guide plate 2720. The light guide plate 2720 with the stepped edge portion having the above-described structure thus reduces the overall size of the LCD device 9000.

Figure 37:
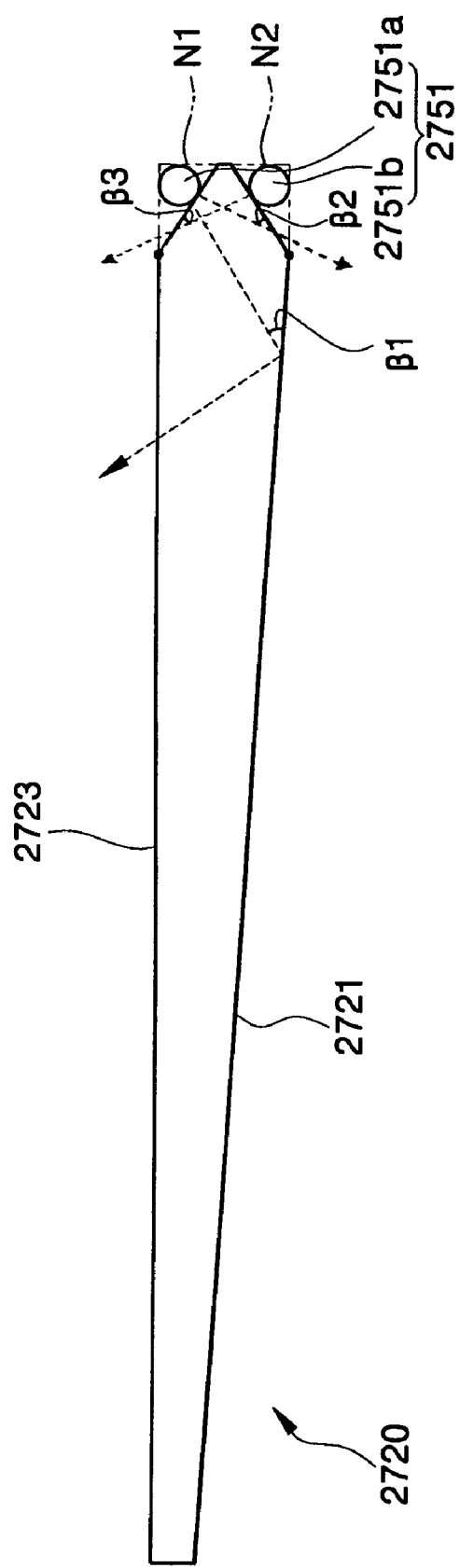
FIG. 37 is a cross-sectional view of the light guide plate in FIG. 34.

FIG. 37 is a cross-sectional view illustrating paths of the light in the light guide plate 2720 of this embodiment. As shown in FIG. 37, the light incident on the light incident surface 2722 of the light guide plate 2720 is reflected on the lower surface 2721 and exits the upper surface 2723. When the light is incident on the lower or upper surface 2721, 2723, the light has an incident angle $\beta_1$, $\beta_2$ or $\beta_3$ with respect to the lower, upper, or inclined surface 2721, 2723, 2722a, 2722b. A value of the incident angle is a factor of determining whether or not the light exits the upper surface 2723 of the light guide plate.

For example, when the light guide plate 2720 is made of poly methyl meth acrylate (PMMA) of which refraction index is "1.49", the value of the critical angle for light to exit the light guide plate 2720 to the air is "42.15°". This critical angle may be obtained from the laws of light refraction and reflection using the refraction indexes 1.49 and 1.0 of the light guide plate 2720 and the air. Under such conditions, the light exits the light guide plate 2720 only when the incident angle $\beta_1$, $\beta_2$ or $\beta_3$ is equal to or larger than "42.15°".

Referring again to FIG. 36, in a conventional light guide plate having the triangular columns N1, N2, the light entered into the light guide plate 2720 is incident on the lower or upper surface 2721, 2723 at an incident angle larger than a critical angle, for example "42.15°" in case of the light guide plate made of PMMA, at the area corresponding to the stepped edge portion of the light guide plate. Thus, the light incident on the lower or upper surface 2721, 2723 at the incident angle larger than the critical angle does not exit the light guide plate 2720 but is reflected to travel within the light guide plate 2720. Accordingly, the reflection of the light within the rectangular edge of the conventional light guide plate deteriorates the luminance on the light guide plate. Therefore, the removal of the triangular columns N1, N2 to form the stepped edge of the light guide plate according to the present invention prevents the deterioration of the luminance as well as reduces the overall size of the LCD device.

Figure 38:
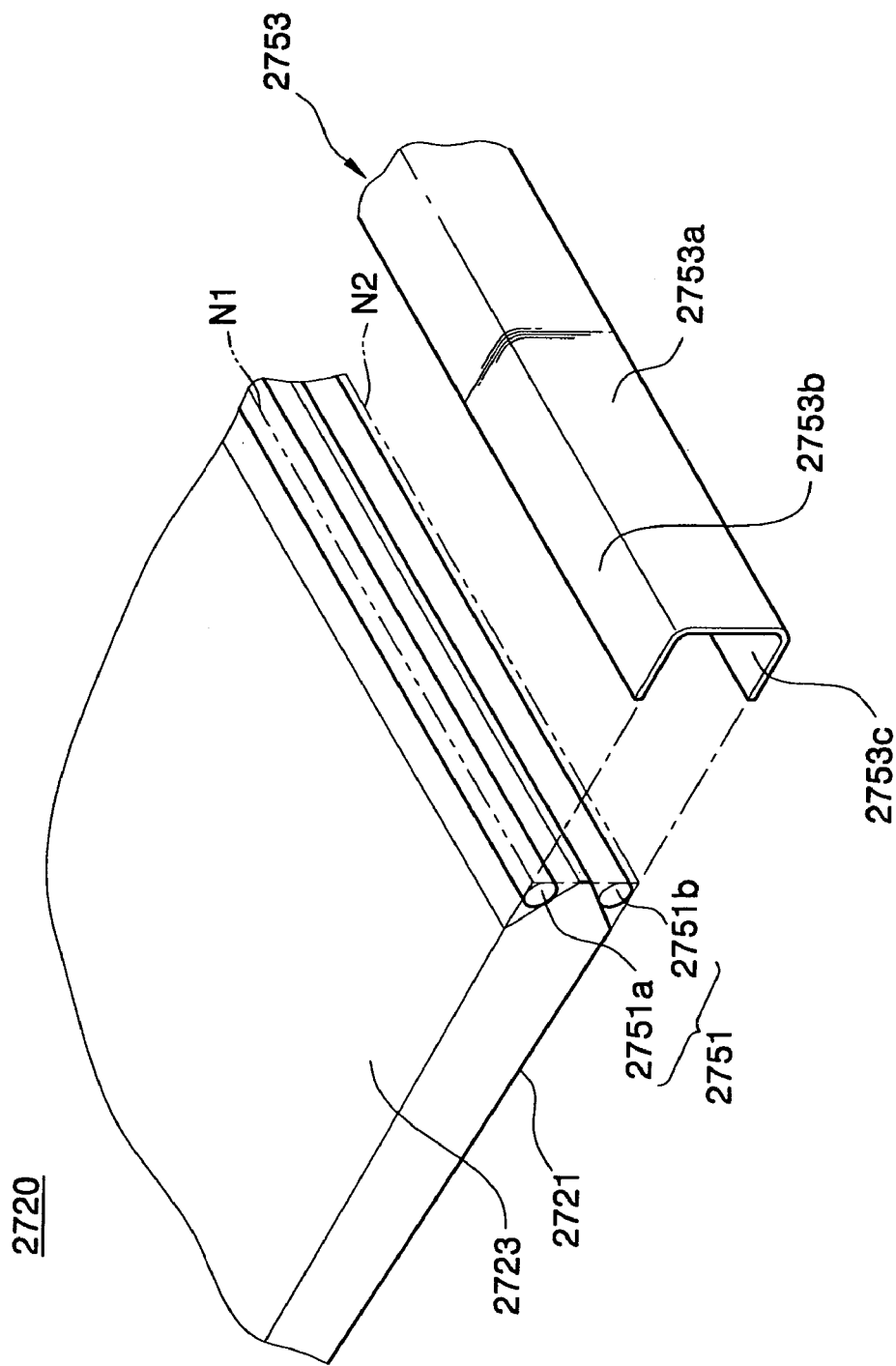
FIG. 38 is an exploded perspective view illustrating the light guide plate and the lamp unit in FIG. 34.

FIG. 38 is an exploded perspective view illustrating the light guide plate 2720 and the lamp unit 2750 in FIG. 35. The first and second lamps 2751 of the lamp unit are disposed on the first and second inclined surfaces, respectively, of the stepped edge portion of the light guide plate. The lamp reflector 2753 is combined on the stepped edge portion to secure the lamps 2751 on the light incident surface. The lamp reflector 2753 has a bottom 2753a and first and second opposing sides 2753b, 2753c respectively extended from the longitudinal edges of the bottom 2753a in a direction substantially perpendicular to the bottom 2753a. The lamp reflector 2753 is combined on the stepped edge portion such that the longitudinal edge of the first opposing side 2753b is in contact with the longitudinal edge of the first inclined surface proximate the upper surface 2723, and the longitudinal edge of the second opposing side 2753c is in contact with the longitudinal edge of the second inclined surface proximate the lower surface 2721. By combining the lamp reflector 2753 on the stepped edge of the light guide plate 2720 in such a manner, the lamps 2751 are securely disposed on the light incident surface of the light guide plate 2720.

Figure 39:
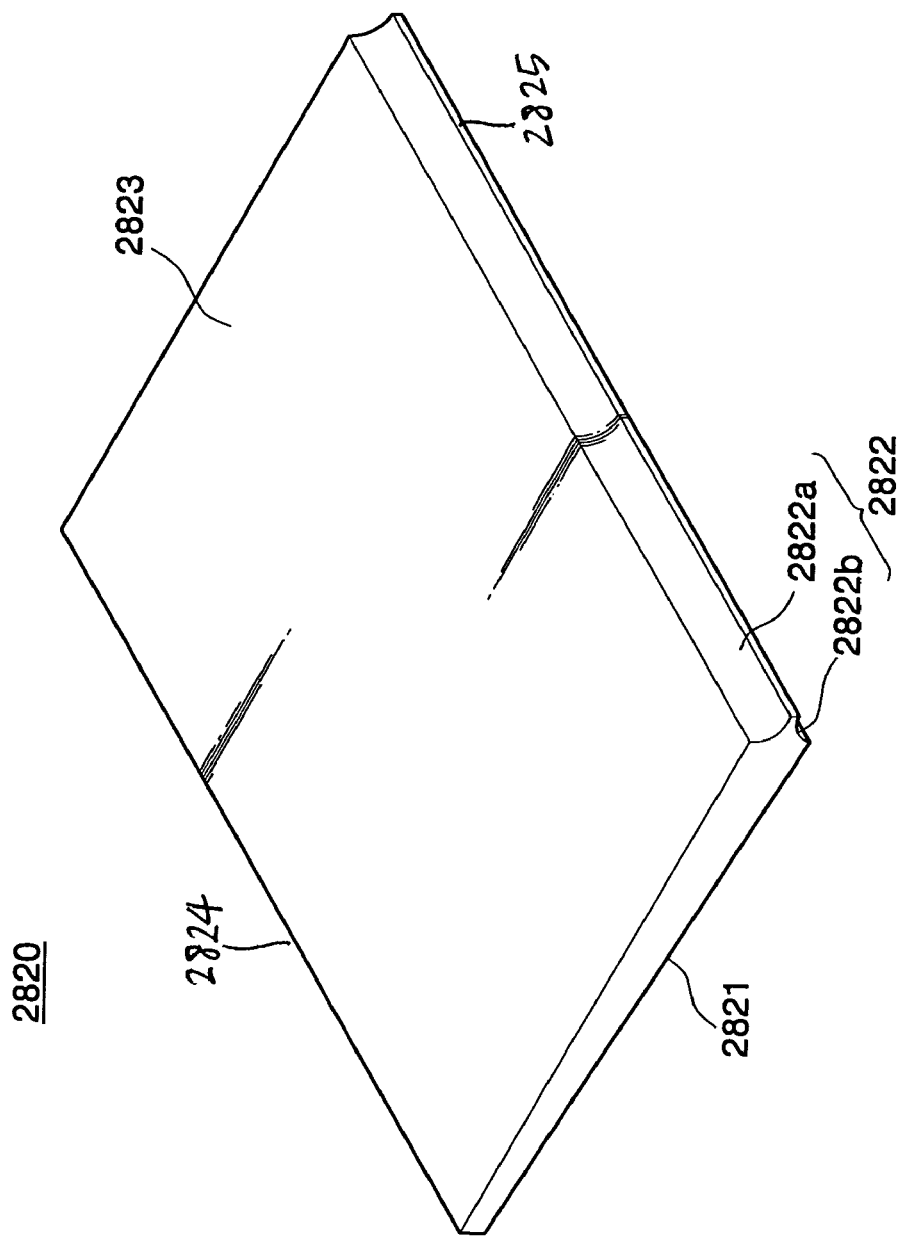
FIG. 39 is a perspective view of a light guide plate according to a seventeenth embodiment of the present invention.

FIG. 39 is a perspective view of a light guide plate according to a seventeenth embodiment of the present invention. The light guide plate 2820 includes a lower surface 2821 for reflecting light provided from a lamp unit, a light incident surface 2822 on which the lamp unit is disposed to provide the light, an upper surface 2823 through which the light reflected by the lower surface 2821 exits the light guide plate 2820, and a first edge surface 2824 having longitudinal edges connected to the lower and upper surfaces 2821, 2823, respectively.

In this embodiment, the light incident surface 2822 has a first inclined surface 2822a and a second inclined surface 2822b that are each a concave arcuate surface. Lamps of the lamp unit are respectively disposed on the concave arcuate surfaces of the light incident surface 2822. The light guide plate 2820 also has a second edge surface 2825 formed between the concave arcuate surfaces 2822a, 2822b. The second edge surface 2825 has the longitudinal edges connected to the first and second concave arcuate surfaces 2822a, 2822b, respectively.

Figure 40:
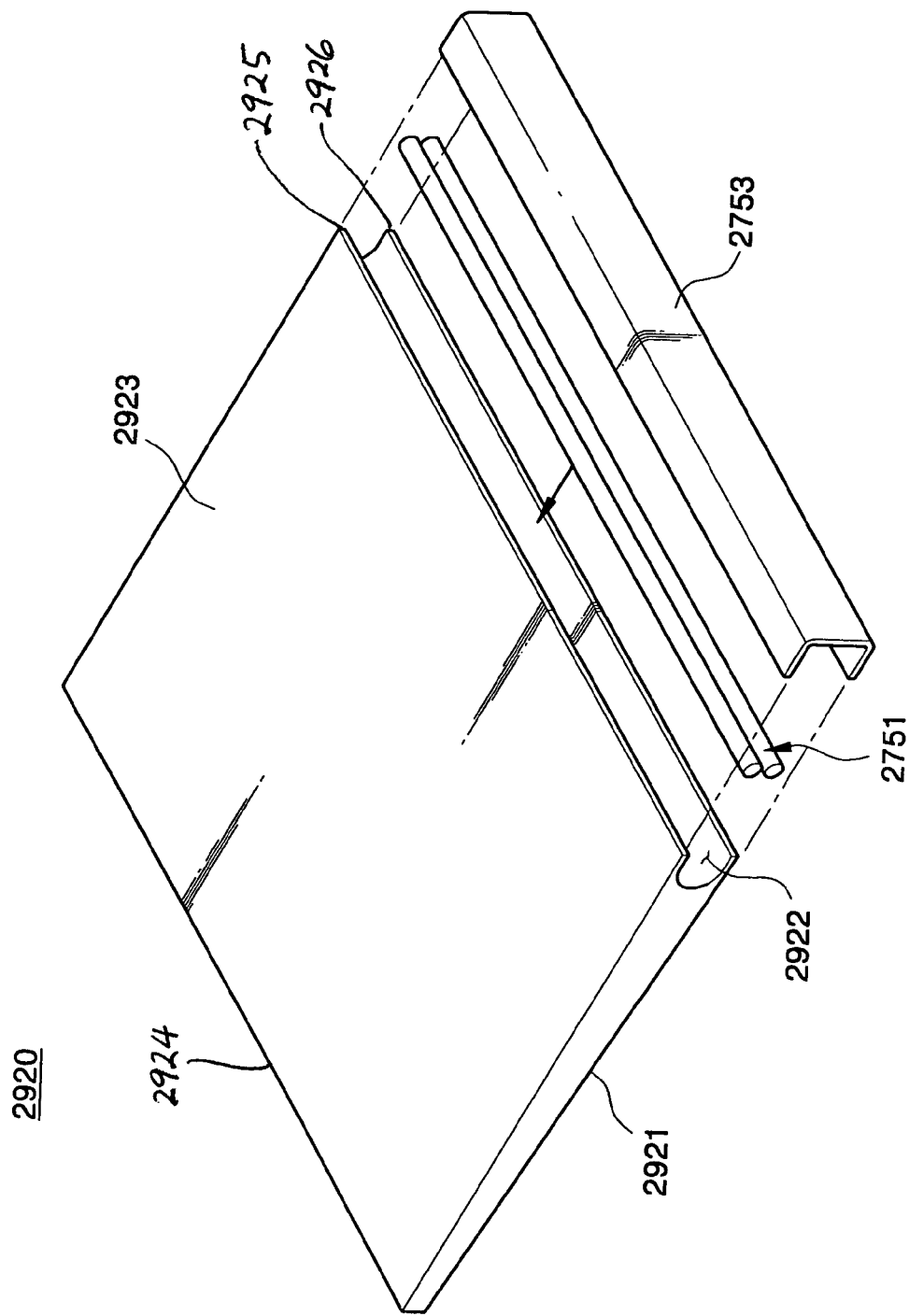
FIG. 40 is an exploded perspective view of a light guide plate and a lamp unit according to an eighteenth embodiment of the present invention.

FIG. 40 is an exploded perspective view of a light guide plate according to an eighteenth embodiment of the present invention. The light guide plate 2920 includes a lower surface 2921 for reflecting light, a light incident surface 2922 on which the light is incident, an upper surface 2923 through which the reflected light exits the light guide plate 2920, and a first edge surface 2924 having the longitudinal edges respectively connected to the lower and upper surfaces 2921, 2923. In this embodiment, the light guide plate 2920 has a stepped edge portion at the side opposite to the first edge surface 2924, and the stepped edge portion has a U-shaped groove in which the lamps 2751 are disposed. It should be noted that the groove of the stepped edge portion may have a different shape, such as V-shape, rectangular shape, etc. The inner surface of the groove constitutes the light incident surface 2922 of the light guide plate 2920.

The light guide plate 2920 may also have a second edge surface 2925 connected between the upper surface 2923 and the light incident surface 2922 and a third edge surface 2926 connected between the lower surface 2921 and the light incident surface 2922. The second edge surface 2925 is extended from one of the longitudinal edges of the groove to the upper surface 2923, and the third edge surface 2926 is extended form the other of the longitudinal edges of the groove to the lower surface 2921. The lamp reflector 2753 for reflecting the light generated from the lamps 2751 is combined on the stepped edge portion such that the lamp reflector 2753 receives the groove and the second and third edge surfaces 2925, 2926. Thus, the lamps 2751 are securely received between the groove and the lamp reflector 2753.

By having such configuration of the light guide plate and the lamp unit, the LCD device may have a narrower bezel. In other words, since the lamp unit is disposed on a marginal area of the bottom surface of the light guide plate or in the stepped edge portion of the light guide plate, the size of a bezel of the LCD device may be effectively reduced.

Having described the exemplary embodiments of the light guide plate and the LCD device employing the same according to the present invention, modifications and variations can be readily made by those skilled in the art in light of the above teachings. For example, the above embodiments of the stepped edge portion may be implemented on a light guide plate having upper and lower surfaces parallel with each other. Also, although the exemplary embodiments described above employ a single lamp unit, the LCD device of the present invention may have two or more lamp units each having the substantially same structure and function as those of the embodiments. The lamp unit may have more than two lamps, and accordingly the stepped edge portion or the light incident surface of the light guide plate may have additional lamp receiving portions. In the backlight assembly of the present invention, the light reflect plate and the lamp reflector may be integrally formed in a single body. The light guide plate may also have rounded corners and edges instead of angled ones.

It is therefore to be understood that, within the scope of the appended claims, the present invention can be practiced in a manner other than as specifically described herein.

What is claimed is:

1. A light guide plate for adjusting paths of light provided from a light source, comprising:
   a first surface having:
      a light incident surface on which the light source is disposed and the light is incident; and
      a light reflect surface for reflecting the light provided through the light incident surface;
   a second surface facing the first surface, the light reflected by the light reflect surface exiting the second surface;
   a first edge surface connected between edges of the light reflect surface and the second surface; and
   a second edge surface connected between edges of the light incident surface and the second surface, the second edge surface being opposite to the first edge surface.

2. The light guide plate of claim 1, wherein the light guide plate has a wedge shape such that a thickness at an area proximate the light incident surface is larger than a thickness at an area proximate the first edge surface.

3. The light guide plate of claim 1, wherein the light guide plate includes:
   rounded edges where the first surface respectively meets the first edge surface, the second edge surface, a first side surface and a second side surface of the light guide plate, and the second surface respectively meets the first edge surface, the second edge surface, the first side surface and the second side surface; and
   rounded corners where the first surface respectively meets the first edge and first side surfaces, the first edge and second side surfaces, the first side and second edge surfaces, and the second edge and side surfaces, and the second surface respectively meets the first edge and first side surfaces, the first edge and second side surfaces, the first side and second edge surfaces, and the second edge and side surfaces.

4. The light guide plate of claim 1, wherein the light incident surface is substantially parallel with the second surface, and the first and second edge surfaces are substantially parallel with each other.

5. A backlight assembly for providing light, comprising:
   a light guide plate including:
      a first surface having:
         a light incident surface on which the light source is disposed and the light is incident; and
         a light reflect surface for reflecting the light provided through the light incident surface;
      a second surface facing the first surface, the light reflected by the light reflect surface exiting the second surface;
      a first edge surface connected between edges of the light reflect surface and the second surface; and
      a second edge surface connected between edges of the light incident surface and the second surface, the second edge surface being opposite to the first edge surface;
   a lamp unit disposed on the light incident surface, the lamp unit including:
      at least one lamp for generating the light; and
      a lamp reflector for reflecting the light from the at least one lamp; and
   a mold frame including:
      a channel space for receiving the lamp unit; and
      a groove for receiving an electrical line electrically connected to the lamp unit.

6. The backlight assembly of claim 5, wherein the light guide plate has a wedge shape such that a thickness at an area proximate the light incident surface is larger than a thickness at an area proximate the first edge surface, and the light incident surface is substantially parallel with the second surface, the first and second edge surfaces being substantially parallel with each other.

7. The backlight assembly of claim 5, further including a bottom chassis for receiving the light guide plate and the lamp unit, wherein the bottom chassis includes:
   a first receiving portion disposed under the light reflect surface of the light guide plate; and
   a second receiving portion for receiving the lamp unit, the second receiving portion being disposed in the channel space of the mold frame.

8. The backlight assembly of claim 5, wherein the mold frame has a bottom, a first wall extended from a longitudinal edge of the bottom along the second edge surface of the light guide plate, and a second wall opposing to the first wall and extended from the other longitudinal edge of the bottom toward the light reflect surface of the light guide plate, wherein the groove for receiving the electrical line is formed at the bottom of the mold frame.

9. A liquid crystal display device comprising:
   a display unit for displaying images by processing image data externally provided; and
   a backlight assembly for providing light to the display unit, the back light assembly including:
      a light guide plate including:
         a first surface having:
            a light incident surface on which the light source is disposed and the light is incident; and
            a light reflect surface for reflecting the light provided through the light incident surface;
         a second surface facing the first surface, the light reflected by the light reflect surface exiting the second surface;
         a first edge surface connected between edges of the light reflect surface and the second surface; and
         a second edge surface connected between edges of the light incident surface and the second surface, the second edge surface being opposite to the first edge surface;
      a lamp unit disposed on the light incident surface, the lamp unit including:
         at least one lamp for generating the light; and
         a lamp reflector for reflecting the light from the at least one lamp; and
      a mold frame including:
         a channel space for receiving the lamp unit; and
         a groove for receiving an electrical line electrically connected to the lamp unit.

10. The liquid crystal display device of claim 9, wherein the light incident surface is a marginal area of the first surface of the light guide plate and the light source is a lamp unit disposed on the marginal area of the first surface so that a size of a bezel of the liquid crystal display device is reduced.

* * * * *